TAPE FEEDING MACHINE

Filed Nov. 15, 1954

INVENTORS
WALTER S. BUSLIK
THOMAS L. VINSON
BY
Murray Nanes
ATTORNEY

INVENTORS
WALTER S. BUSLIK
THOMAS L. VINSON
BY
Murray Nanes
ATTORNEY

Dec. 29, 1959 W. S. BUSLIK ET AL 2,919,076

TAPE FEEDING MACHINE

Filed Nov. 15, 1954 31 Sheets-Sheet 3

INVENTORS
WALTER S. BUSLIK
THOMAS L. VINSON
BY Murray Nanes
ATTORNEY

Dec. 29, 1959 W. S. BUSLIK ET AL 2,919,076

TAPE FEEDING MACHINE

Filed Nov. 15, 1954 31 Sheets-Sheet 5

INVENTORS
WALTER S. BUSLIK
THOMAS L. VINSON
BY
Murray Nanes
ATTORNEY

*INVENTORS*
WALTER S. BUSLIK
THOMAS L. VINSON
*BY*
Murray Nanes
ATTORNEY

Dec. 29, 1959 W. S. BUSLIK ET AL 2,919,076

TAPE FEEDING MACHINE

Filed Nov. 15, 1954 31 Sheets-Sheet 7

INVENTORS
WALTER S. BUSLIK
THOMAS L. VINSON
BY
Murray Nanes
ATTORNEY

Dec. 29, 1959 W. S. BUSLIK ET AL 2,919,076

TAPE FEEDING MACHINE

Filed Nov. 15, 1954 31 Sheets-Sheet 8

INVENTORS
WALTER S. BUSLIK
THOMAS L. VINSON
BY
Murray Nanes
ATTORNEY

Dec. 29, 1959 | W. S. BUSLIK ET AL | 2,919,076

TAPE FEEDING MACHINE

Filed Nov. 15, 1954 | 31 Sheets-Sheet 9

INVENTORS
WALTER S. BUSLIK
THOMAS L. VINSON

BY

Murray Nanes
ATTORNEY

Dec. 29, 1959 W. S. BUSLIK ET AL 2,919,076

TAPE FEEDING MACHINE

Filed Nov. 15, 1954 31 Sheets-Sheet 10

INVENTORS
WALTER S. BUSLIK
THOMAS L. VINSON
BY
Murray Nanes
ATTORNEY

INVENTORS
WALTER S. BUSLIK
THOMAS L. VINSON
BY
Murray Nanes
ATTORNEY

INVENTORS
WALTER S. BUSLIK
THOMAS L. VINSON
BY
Murray Nanes
ATTORNEY

INVENTORS
WALTER S. BUSLIK
THOMAS L. VINSON
BY
Murray Nanes
ATTORNEY

INVENTORS
WALTER S. BUSLIK
THOMAS L. VINSON
BY Murray Nanes
ATTORNEY

INVENTORS
WALTER S. BUSLIK
THOMAS L. VINSON
BY
Murray Nanes
ATTORNEY

INVENTORS
WALTER S. BUSLIK
THOMAS L. VINSON
BY
Murray Nanes
ATTORNEY

INVENTORS
WALTER S. BUSLIK
THOMAS L. VINSON
BY
Murray Nanes
ATTORNEY

INVENTORS
WALTER S. BUSLIK
THOMAS L. VINSON
BY
Murray Nanes
ATTORNEY

INVENTORS
WALTER S. BUSLIK
THOMAS L. VINSON
BY
Murray Nanes
ATTORNEY

Dec. 29, 1959 W. S. BUSLIK ET AL 2,919,076

TAPE FEEDING MACHINE

Filed Nov. 15, 1954 31 Sheets-Sheet 20

INVENTORS
WALTER S. BUSLIK
THOMAS L. VINSON

BY

Murray Nanes

ATTORNEY

INVENTORS
WALTER S. BUSLIK
THOMAS L. VINSON
BY
Murray Nanes
ATTORNEY

INVENTORS
WALTER S. BUSLIK
THOMAS L. VINSON
BY
Murray Nanes
ATTORNEY

INVENTORS
WALTER S. BUSLIK
THOMAS L. VINSON
BY
Murray Nanes
ATTORNEY

UNLOAD

INVENTORS
WALTER S. BUSLIK
THOMAS L. VINSON
BY Murray Nanes
ATTORNEY

LOAD- REWIND OPERATION
STARTING LOADED AND IN BACKWARD AREA

Dec. 29, 1959 W. S. BUSLIK ET AL 2,919,076

TAPE FEEDING MACHINE

Filed Nov. 15, 1954 31 Sheets-Sheet 26

LOAD-REWIND OPERATION
STARTING UNLOADED AND IN BACKWARD AREA

Dec. 29, 1959 W. S. BUSLIK ET AL 2,919,076

TAPE FEEDING MACHINE

Filed Nov. 15, 1954 31 Sheets-Sheet 28

INVENTORS
WALTER S. BUSLIK
THOMAS L. VINSON
BY
Murray Nanes
ATTORNEY

Dec. 29, 1959 W. S. BUSLIK ET AL 2,919,076

TAPE FEEDING MACHINE

Filed Nov. 15, 1954 31 Sheets-Sheet 30

2,919,076
Patented Dec. 29, 1959

2,919,076

TAPE FEEDING MACHINE

Walter S. Buslik and Thomas L. Vinson, Poughkeepsie, N.Y., assignors to International Business Machines Corporation, New York, N.Y., a corporation of New York Application November 15, 1954, Serial No. 468,832
25 Claims. (Cl. 242—55.12)

This invention relates to a machine for feeding tape.

More particularly, the invention relates to means for automatically loading, unloading and rapidly rewinding record tape on a machine that feeds the tape past a record reading and/or reproducing head.

With the advent of electronic data processing machines such as that described in the copending application on a File Maintenance Machine by M. Femmer, et al., Serial No. 472,144, filed November 15, 1954, a need has arisen for rapid data input and data recording. Machines have been designed which are capable of feeding record tape through a reading and recording head at very high speeds, with the ability to reverse the direction of the tape feed in very short periods of time, all without imposing any substantial stresses on the tape. In such machine, rotating capstans are used to drive the tape, and the tape is wound around these capstans, through the read/record head, and around idlers. At these high speeds, vacuum columns, through which the tape passes, are used to control the speed of the reeling and unreeling of the tape from the reels, so as to reel and unreel tape as fast as the drive capstans feed it, without putting undue tension on the tape. It therefore becomes exceedingly difficult to load the machine with the speed and ease required for use in these data processing machines, where the tape is to be manually threaded around the capstans and idlers and through the head and vacuum columns. Novel means have been provided for automatically loading the tape in the tape feed machine, in which the only requirement is that the tape be manually connected between two reels. It can also be understood that the tape could be rewound faster in this directly connected position, where means are provided to move the tape away from the capstans, idlers, head, and columns. Such rapid rewinding is necessary when it is desired to re-read or re-record, starting at the beginning of the tape.

It is therefore the principal object of the invention to provide, in a high speed tape feeding machine, means for automatically loading and rapidly rewinding the tape.

Another object of the invention is to provide automatic means for loading a tape in a tape feed machine around capstans and idlers and through ahead and vacuum columns so that it is only necessary to directly manually connect the tape between the two reels.

Still another object of the invention is to provide means for rapidly rewinding a tape in a tape feed machine, including means for automatically removing the tape from contact with the capstans, idlers, head and vacuum columns.

A further object is to provide means for retracting capstans so as to permit the tape to be automatically moved to its load or unload position.

A still further object is to provide means for separating the tape from the read/record head so as to permit rapid manual threading and rapid automatic rewinding.

Another object is to provide means for automatically inserting and withdrawing tape from a vacuum column.

Still another object is to provide in a tape feed machine, means for providing a small steady flow of air into a vacuum control column, under control of flapper valves, for drawing the tape into the column when automatically loading the machine.

A further object is to provide, in a tape feed machine, flapper valves which change function when the tape enters a control column to indicate the presence of the tape therein.

A still further object is to provide in a tape feed machine, means for determining at any point along the tape if a rapid rewind operation is feasible or whether it is faster to rewind by performing a normal backward operation.

Another object is to provide, in a tape feed machine, means for rotating the tape reels in unlike directions to slacken the tape and thereby permit a flow of air to draw tape into columns.

Still another object is to provide, in a tape feed machine, means for rotating the tape reels in unlike directions to pull tape out of columns.

A further object is to provide, in a tape feed machine, a motor which controls the separating of the head from the head cover and also the feeding of the tape loops in and out of the columns.

A still further object is to provide, in a tape feed machine, means for rotating one reel at very high speeds to provide for rapid rewind.

Another object is to provide, in a tape feed machine, means for indicating a tape break when the tape loops are in the vacuum columns.

Still another object is to provide, in a tape feed machine, means for indicating a tape break when the tape loops are out of the vacuum columns.

A further object is to provide, in a tape feed machine, means for sensing the start and end points of the tape.

A still further object is to provide, in a tape feed machine, means for returning the tape to the start point and stop the tape thereat.

Another object is to provide, in a tape feed machine, arm means riding on a reel to effect a transfer of its contacts when the tape moves from the backward area to rapid rewind area, and vice versa.

Other objects of the invention will be pointed out in the following description and claims and illustrated in the accompanying drawings, which disclose, by way of example, the principle of the invention and the best mode, which has been contemplated, of applying that principle.

Figure 31A:
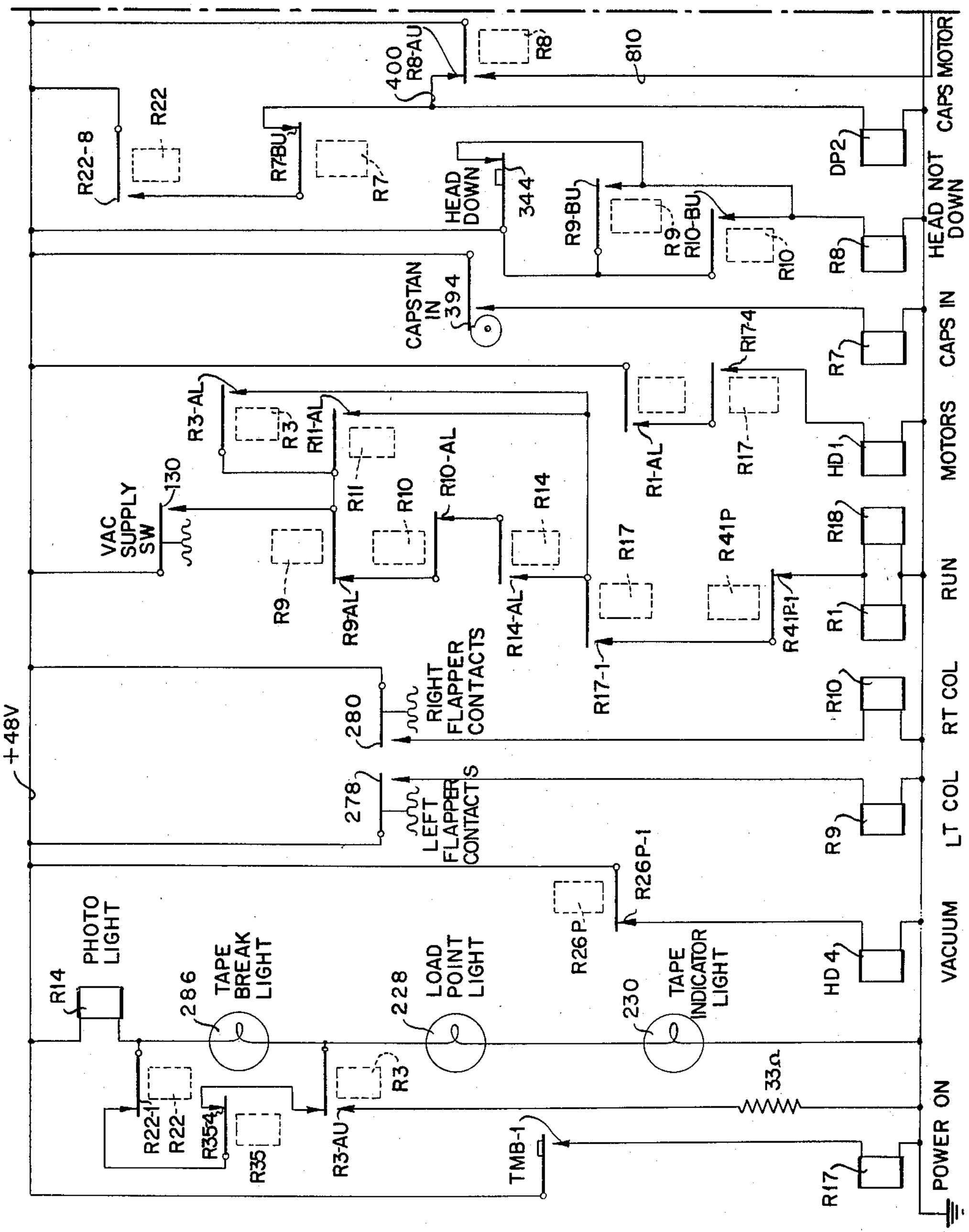
Figure 31B:
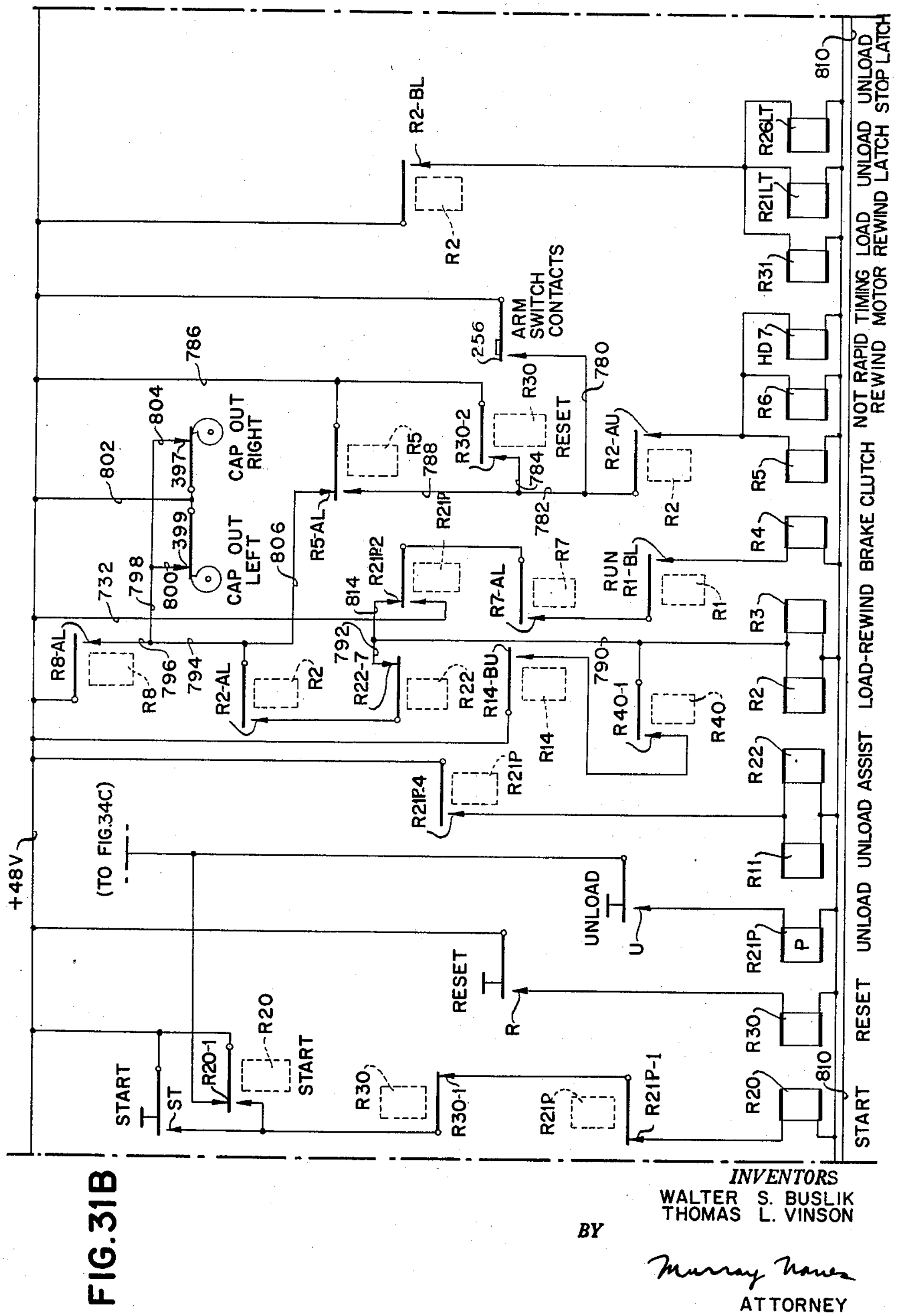
Figure 31C:
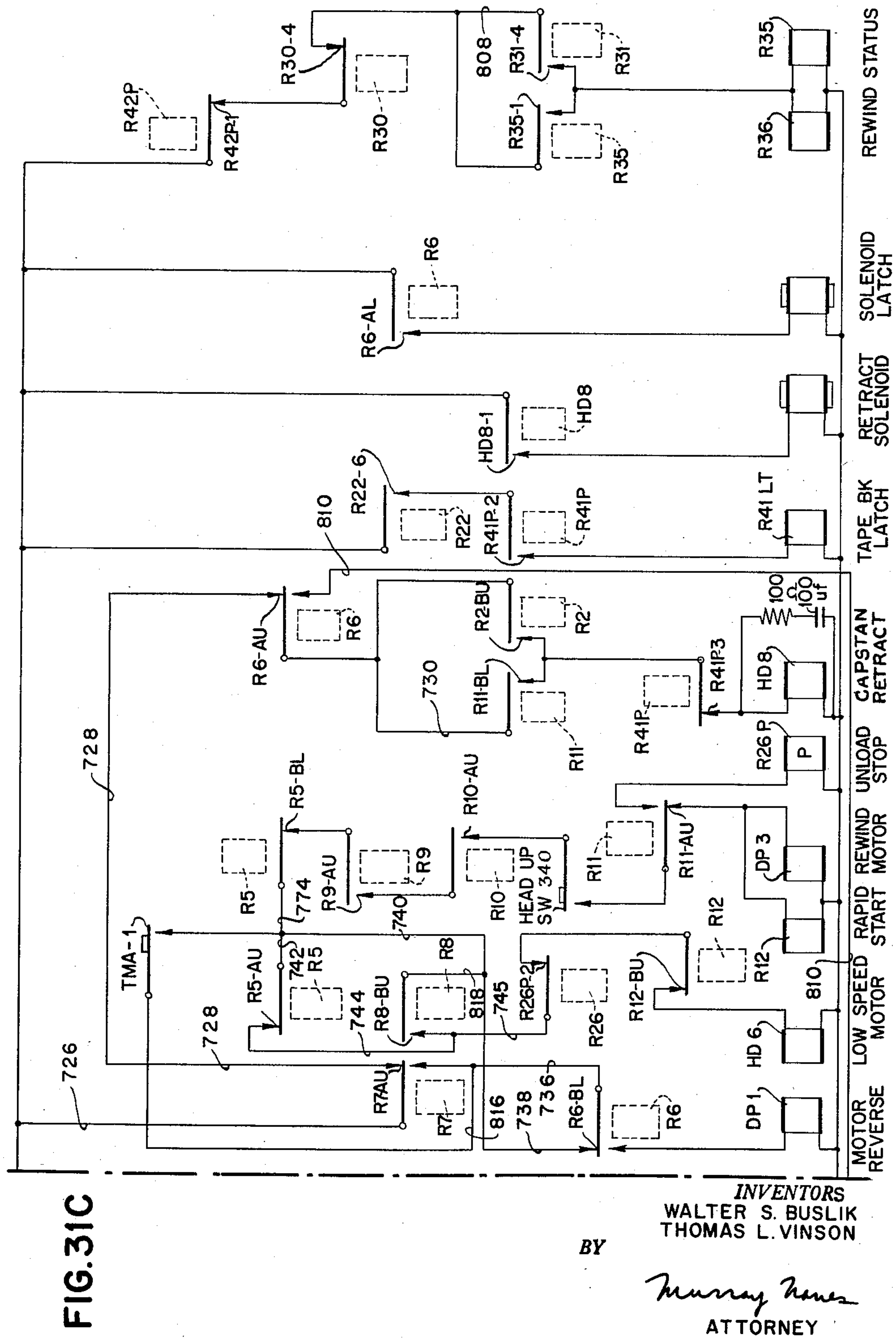

Figs. 31A, 31B, and 31C arranged end to end in a horizontal sequence from left to right in that order, comprise a diagram of the electrical relay circuits for controlling the load, unload, and rapid rewind of the tape.

Figures 32, 33:
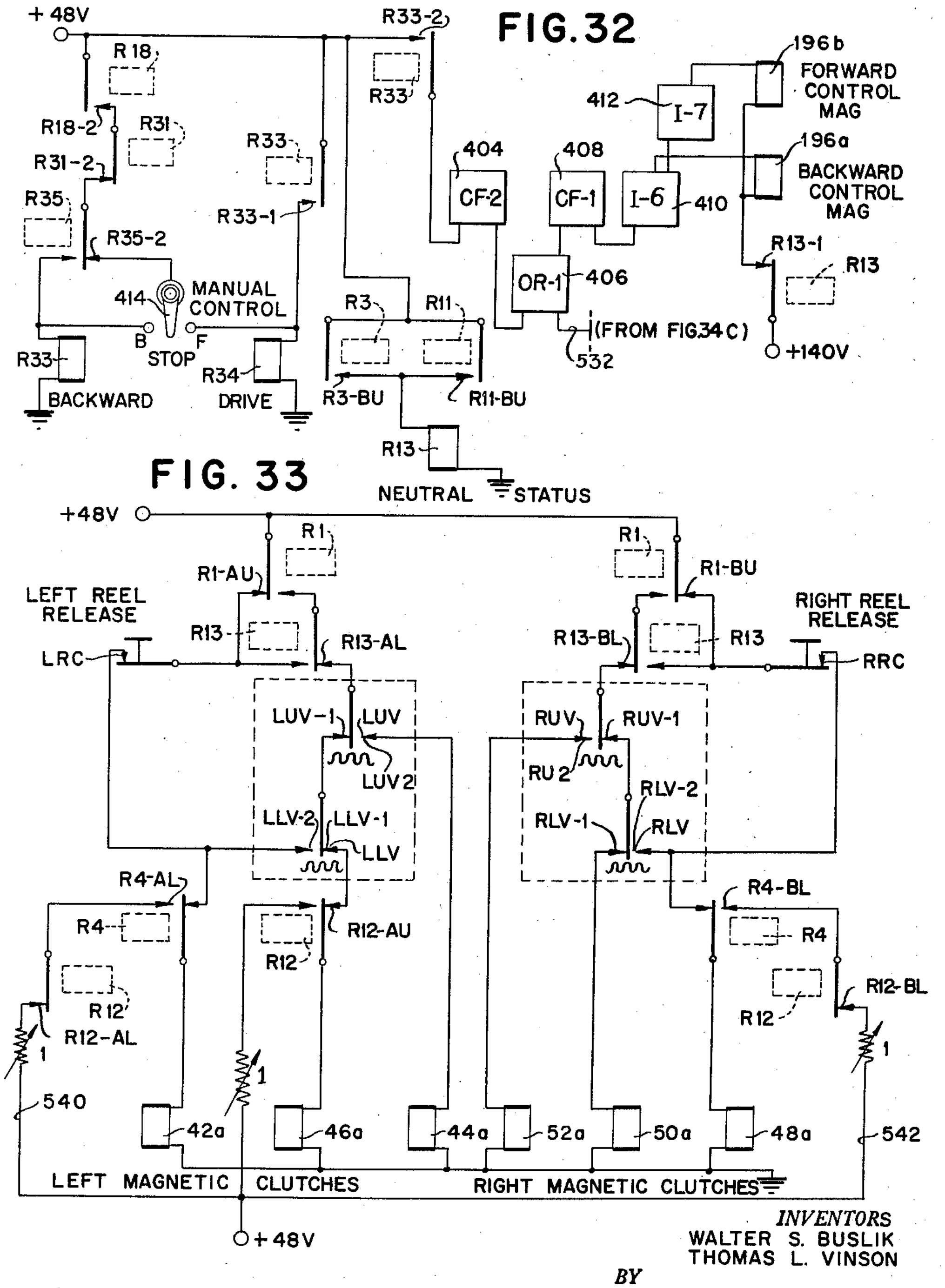

Fig. 32 is a diagram of the electrical control circuits, for biasing the tape feed mechanism for forward-backward operations.

Fig. 33 is a diagram of the electrical control circuit by which rotations of the tape reels are controlled.

Figure 34A:
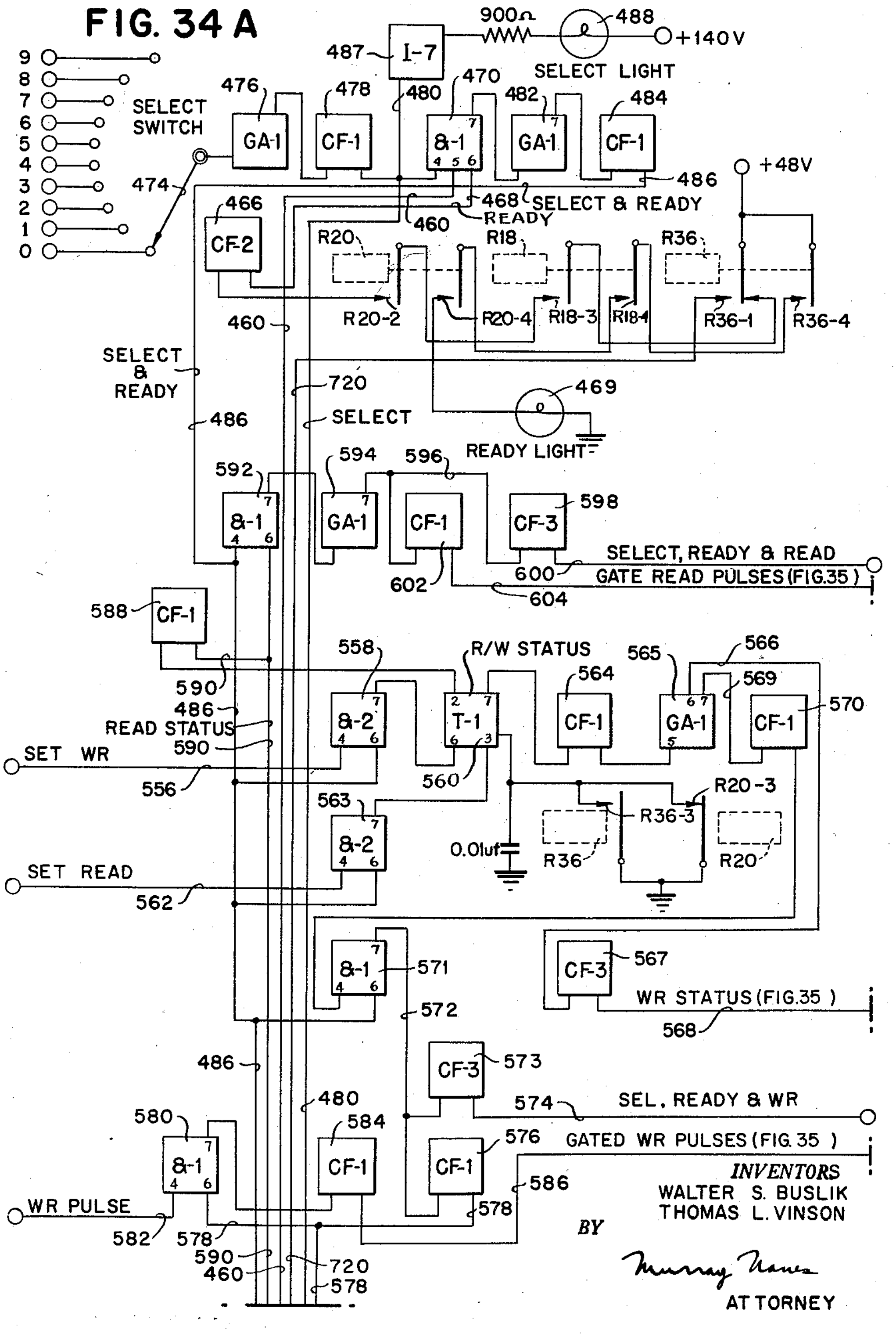
Figure 34B:
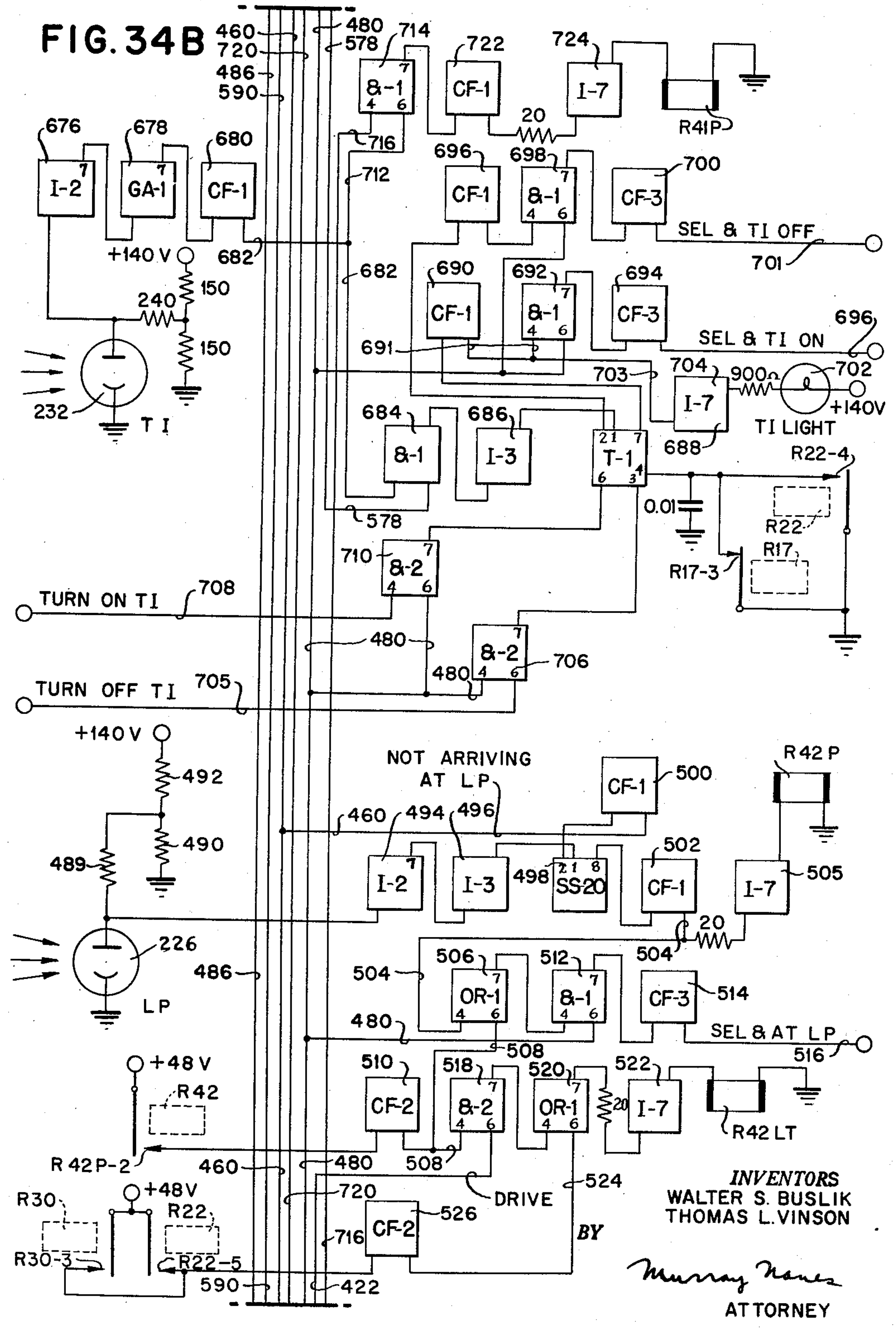
Figure 34C:
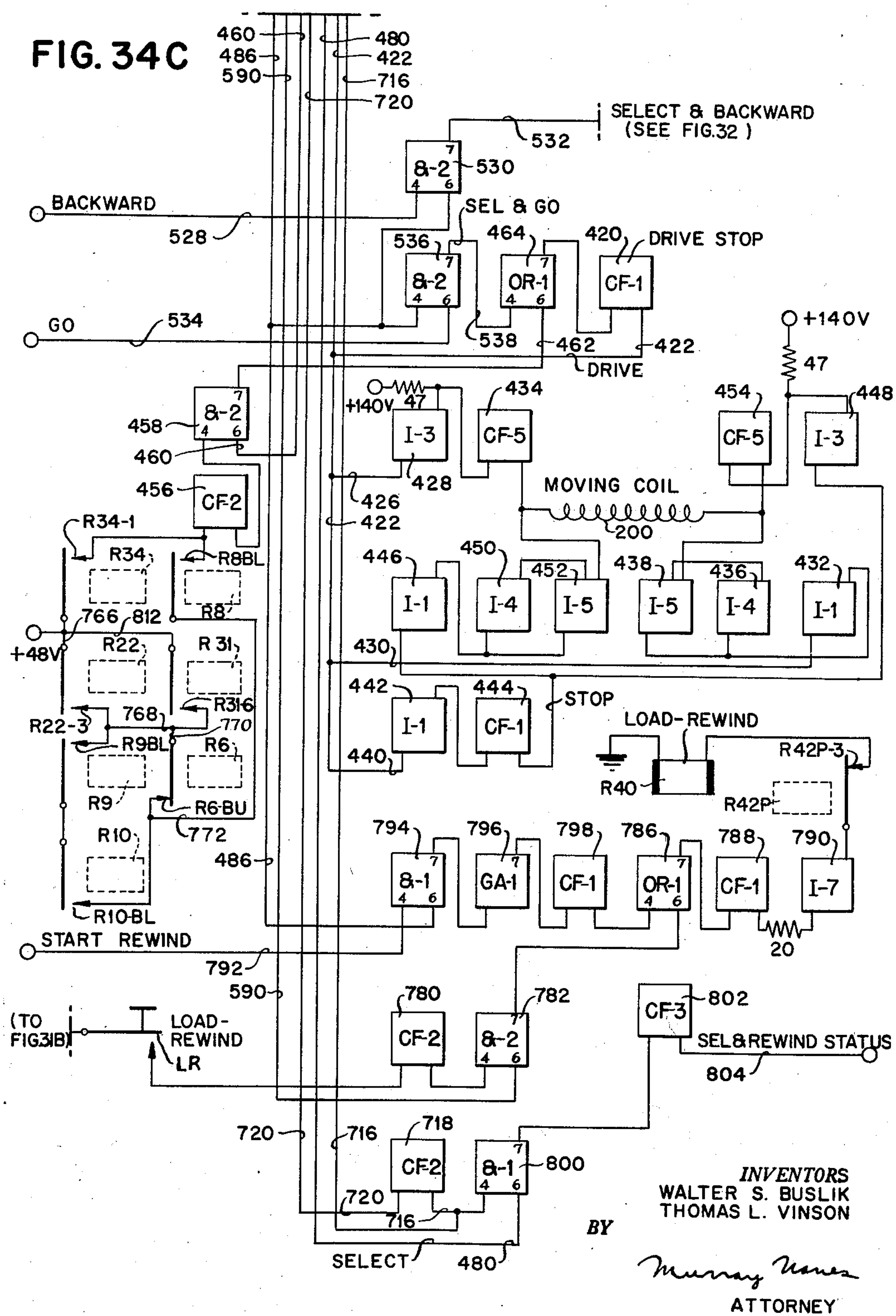

Fig. 34A, 34B, and 34C arranged vertically are block diagrams of the electrical control circuits including circuits for biasing the tape feed mechanism for drive-stop operations.

Figure 35:
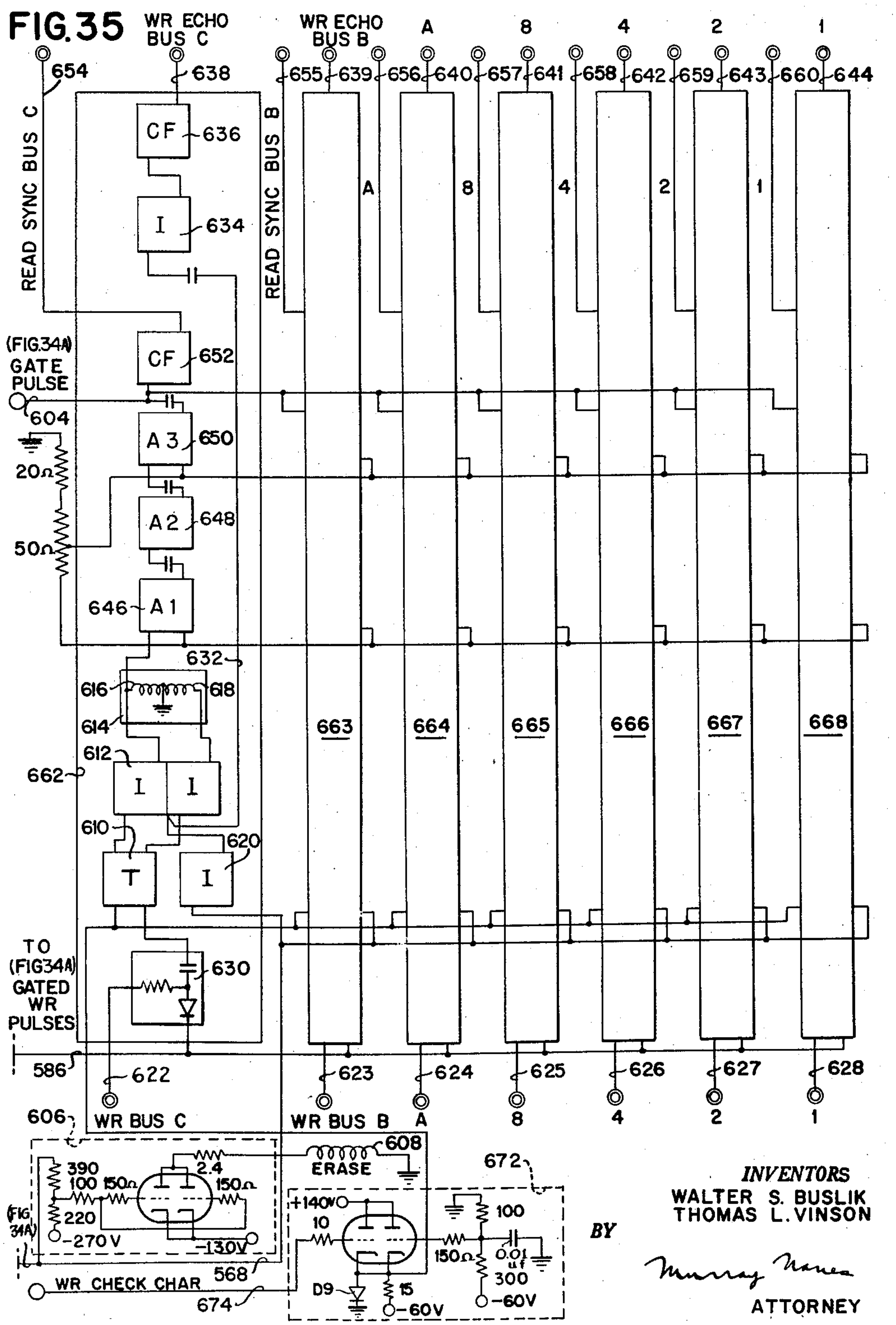

Fig. 35 is a block diagram of the read/write and the erase circuits.

Figure 36:
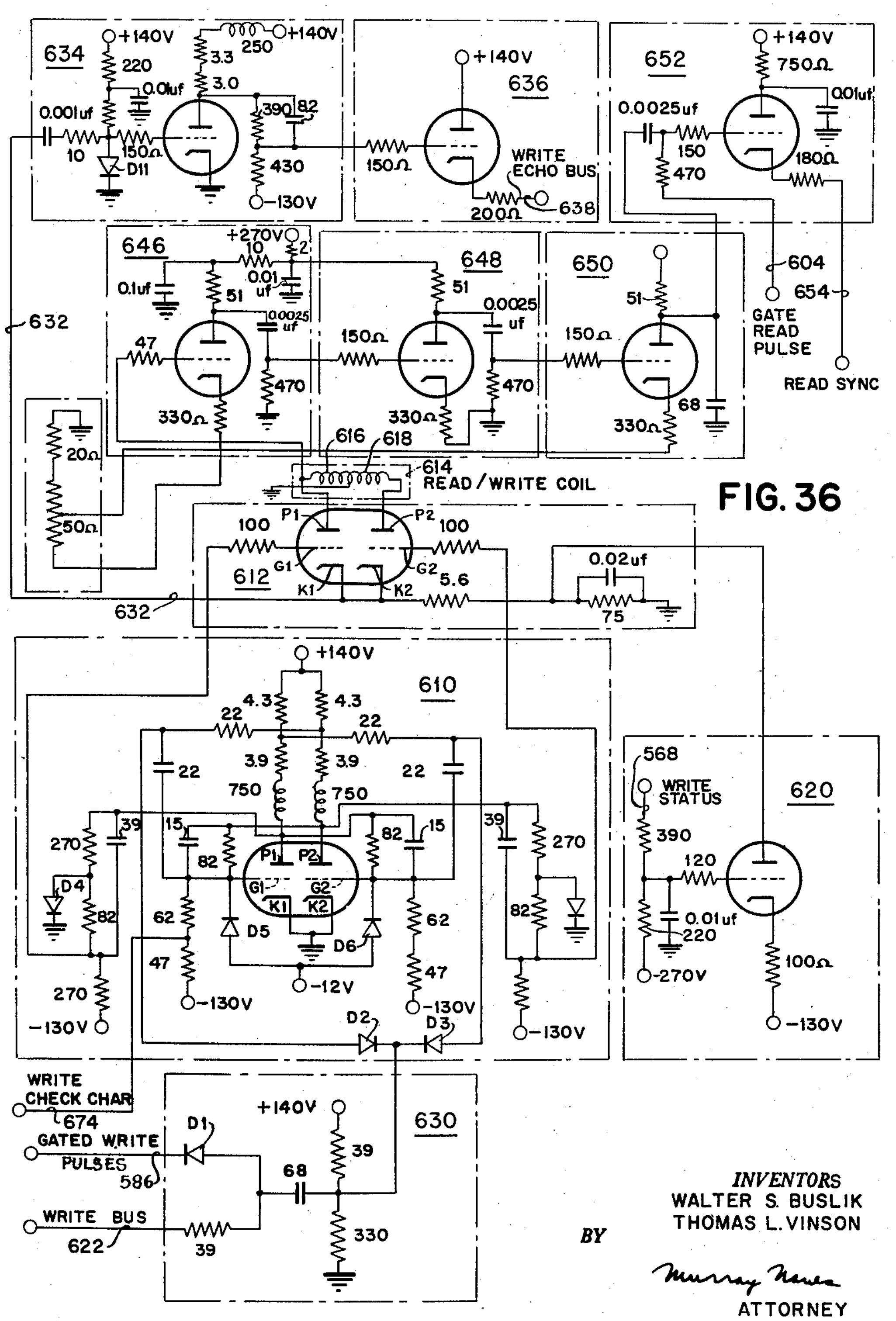

Fig. 36 is a wiring diagram of the read/write circuit of Fig. 35.

Figure 37:
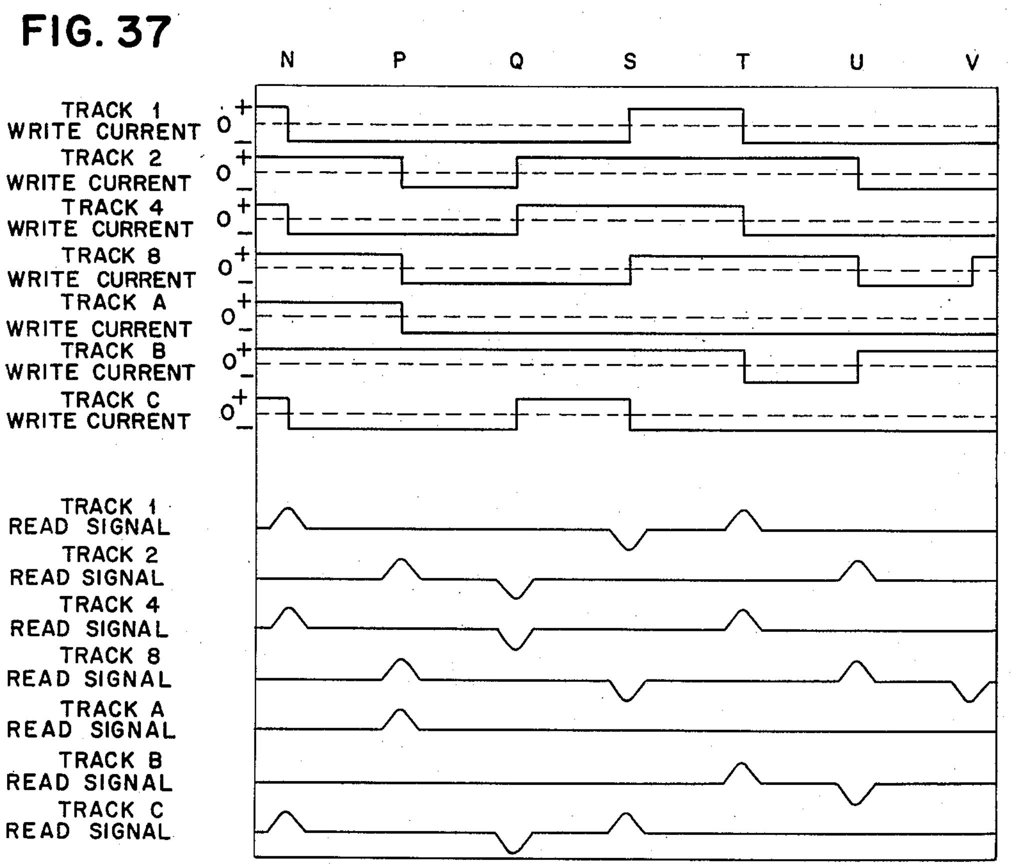

Fig. 37 is a plot and diagram illustrating recording, representative of a non-return to zero method of recording.

Figures 38, 39:
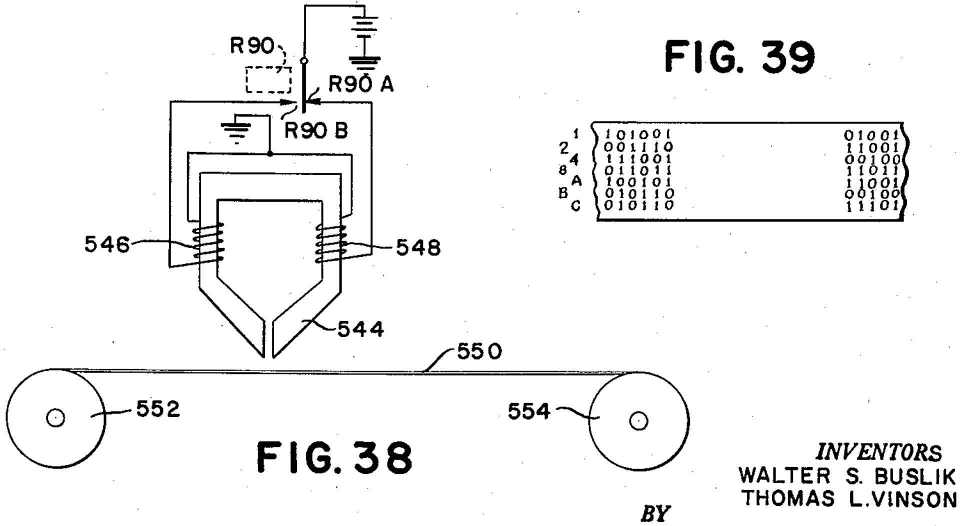

Fig. 38 represents a schematic circuit for a non-return to zero recording.

Fig. 39 is a diagram of a sample magnetic tape showing schematically positions of the various characters.

Figure 40:
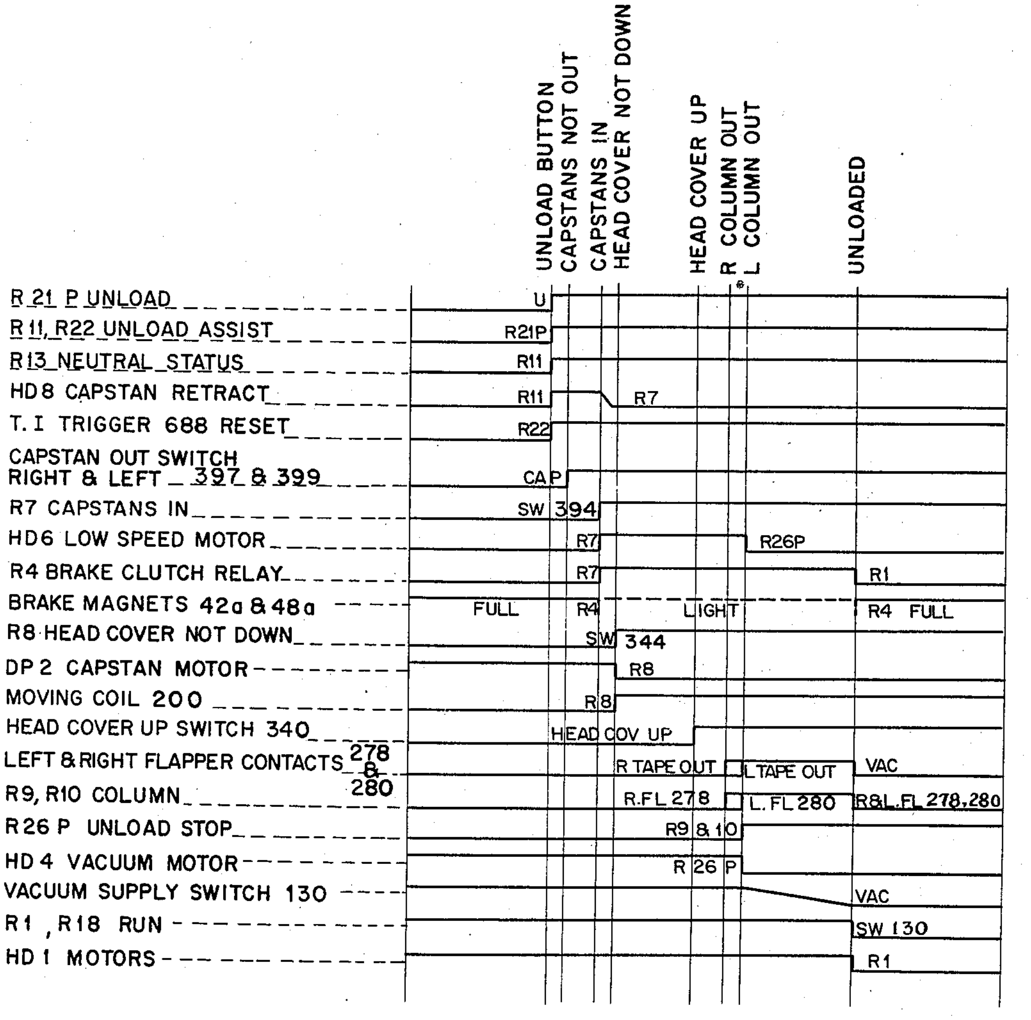

Fig. 40 is a timing diagram of the action of relays and other controls during an unload operation.

Figure 41A:
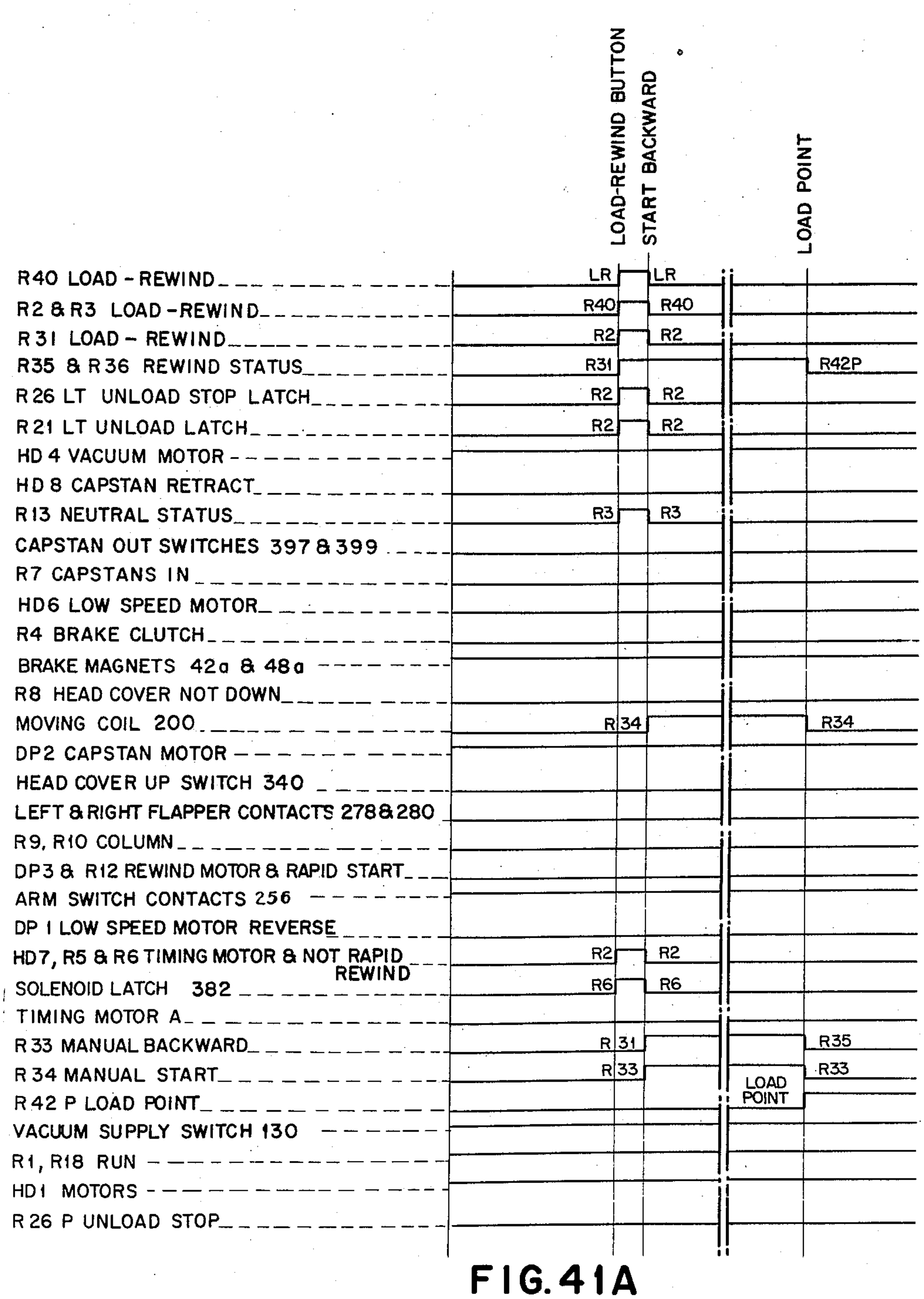

Fig. 41A is a timing diagram of the action of necessary relays and other controls during a load-rewind operation, starting with the tape in a loaded condition and in the rapid rewind area.

Figure 41B:
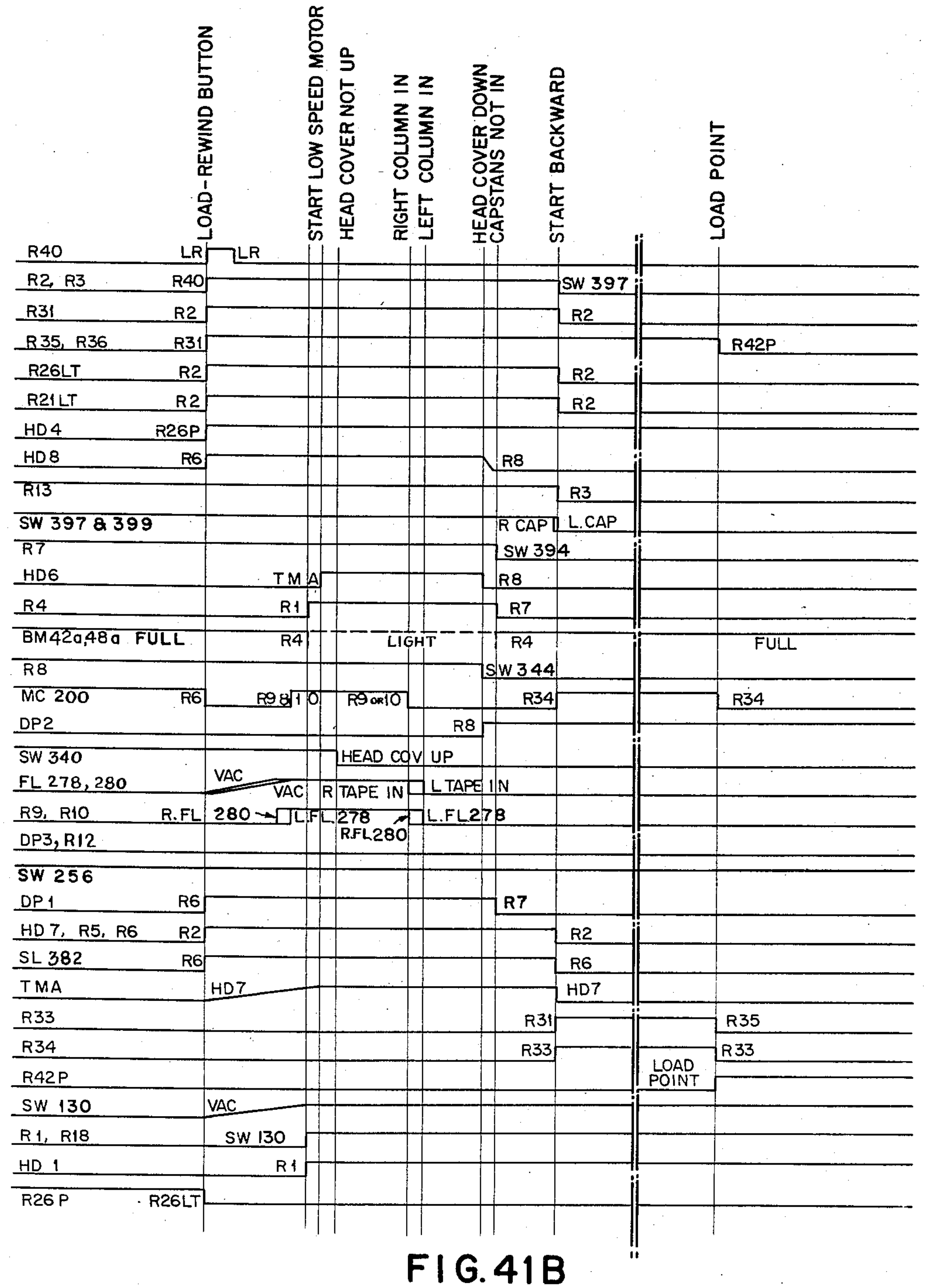

Fig. 41B is a timing diagram of the relays and other controls of Fig. 41A during a load-rewind operation, starting with the tape in an unloaded condition and in the rapid rewind area.

Figure 41C:
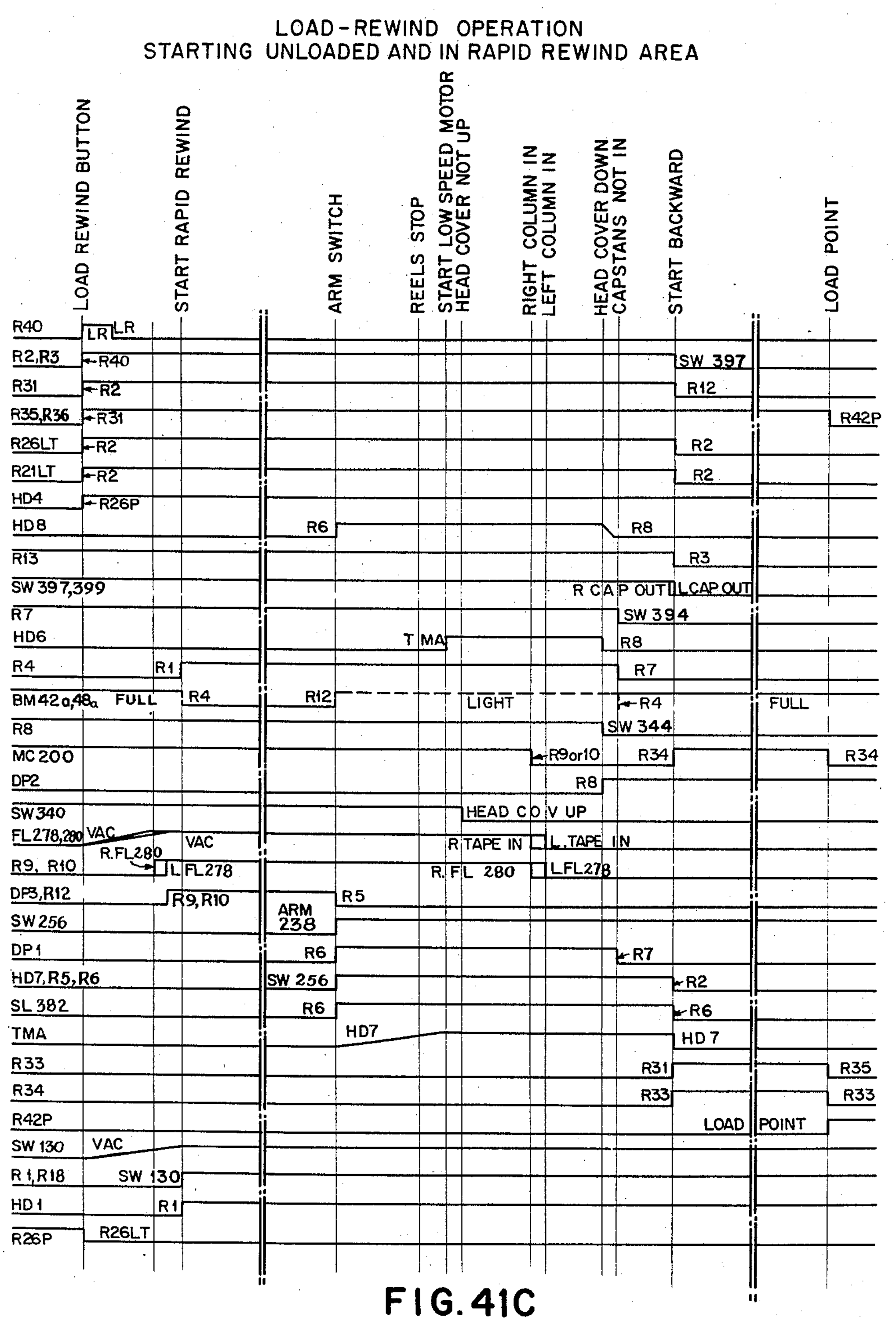

Fig. 41C is a timing diagram of the relays and other controls of Fig. 41A during a load-rewind operation, starting with the tape in an unloaded condition and in the backward area.

Figure 41D:
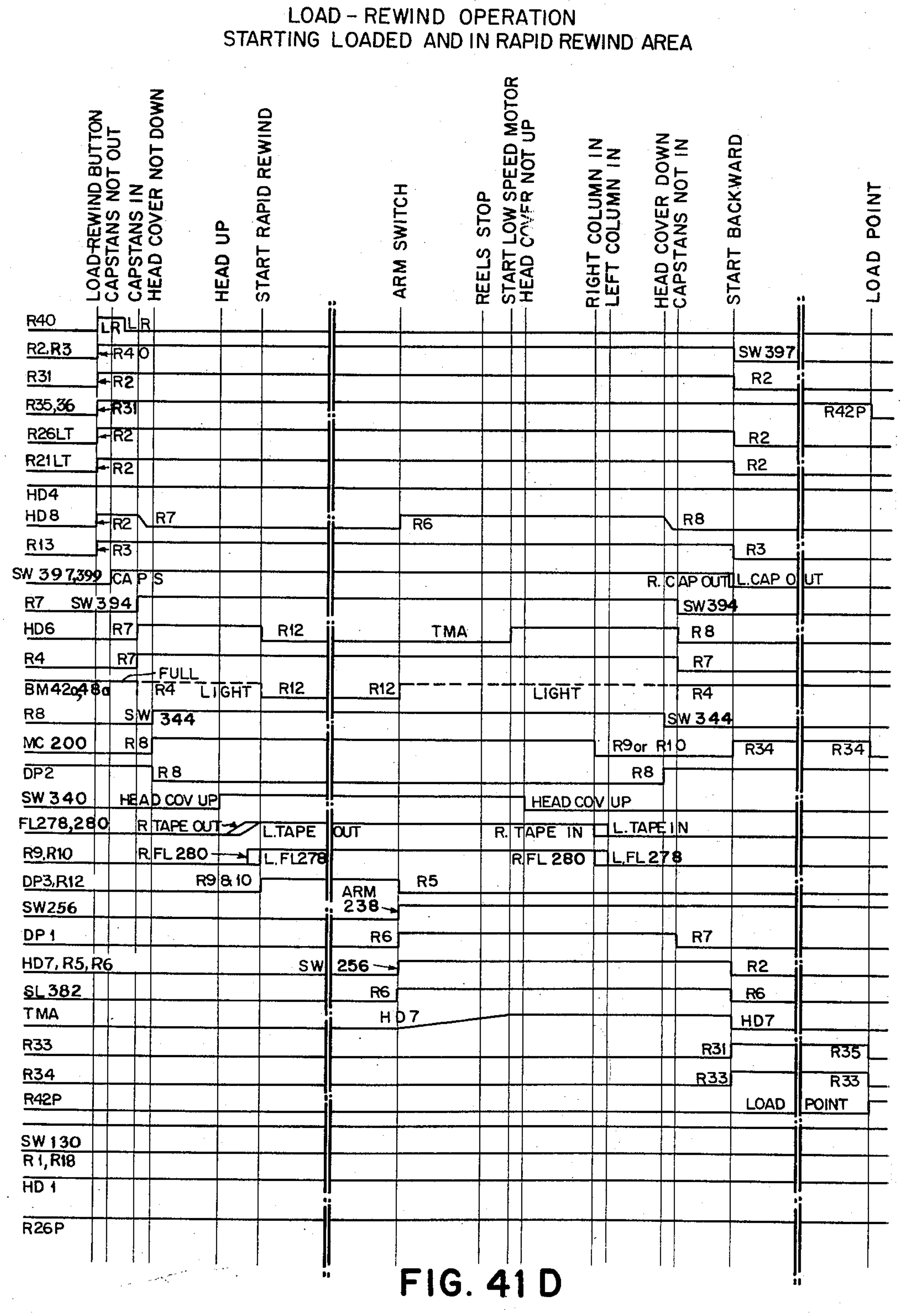

Fig. 41D is a timing diagram of the relays and other controls of Fig. 41A during a load-rewind operation, starting with the tape in a loaded condition and in the backward area.

Figure 42:
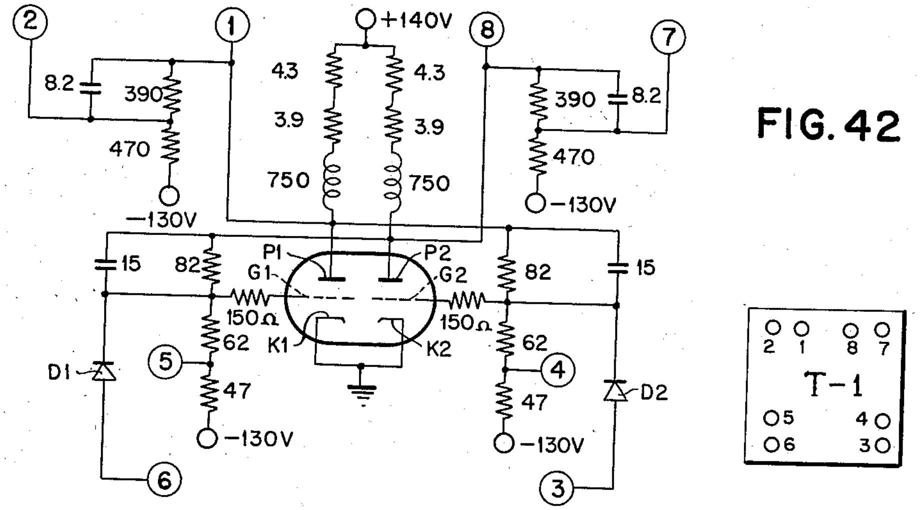

Fig. 42 is a detailed circuit diagram and corresponding block representation of an electronic trigger employed in the invention.

Figure 43:
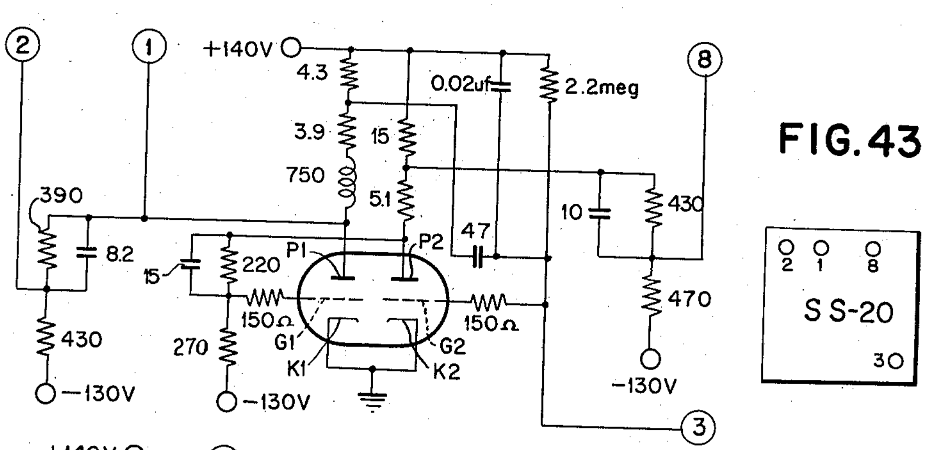

Fig. 43 is a detailed circuit diagram and corresponding block representation of a single shot multivibrator employed in the invention.

Figure 44:
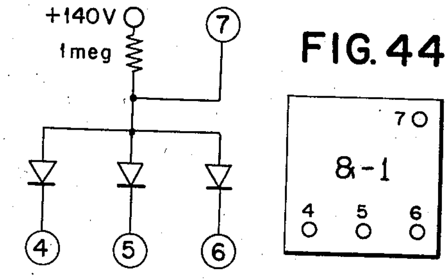
Figure 45:
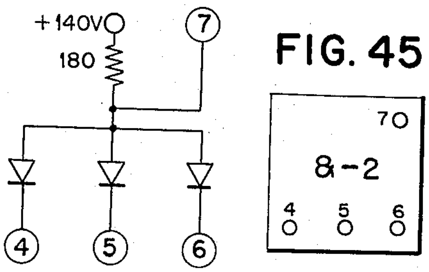

Figs. 44 and 45 are detailed circuit diagrams and the respective block representations of AND circuits employed in the invention.

Figure 46:
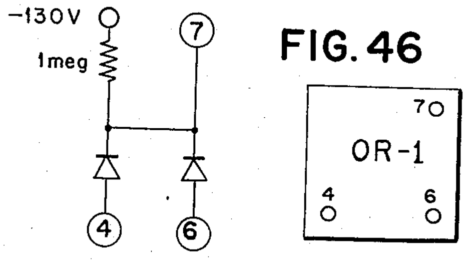
Figure 47:
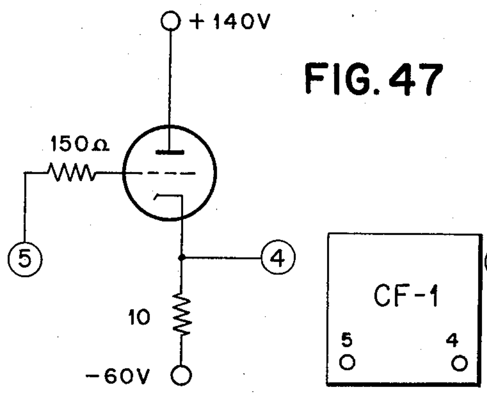
Figure 48:
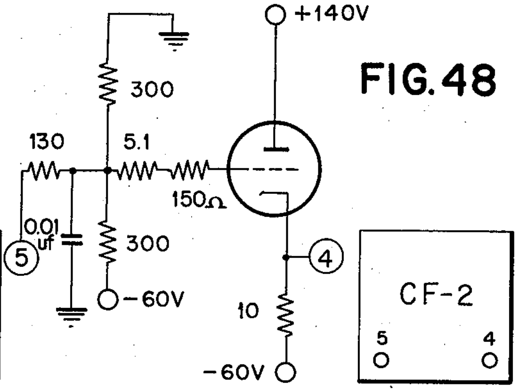
Figure 49:
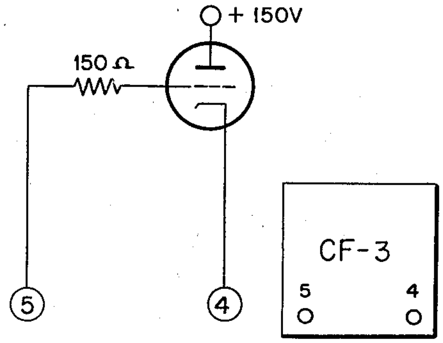
Figure 50:
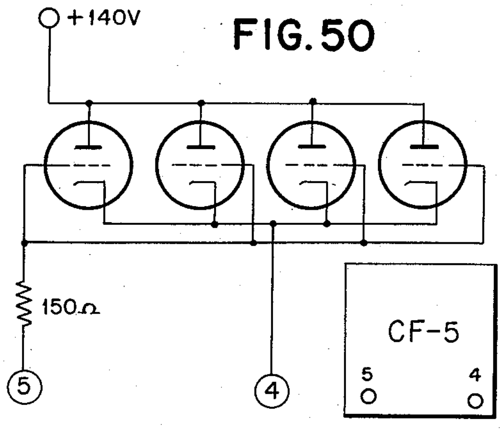
Figure 51:
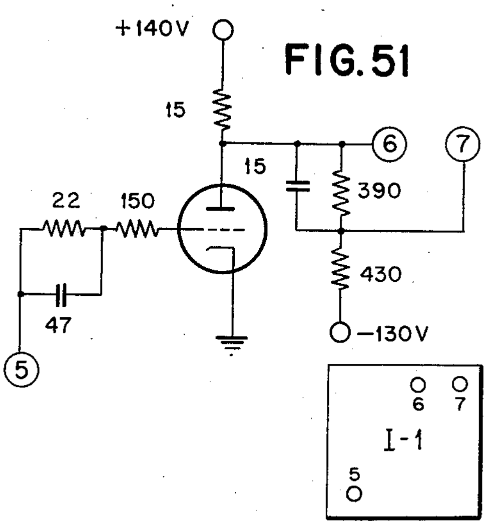
Figure 52:
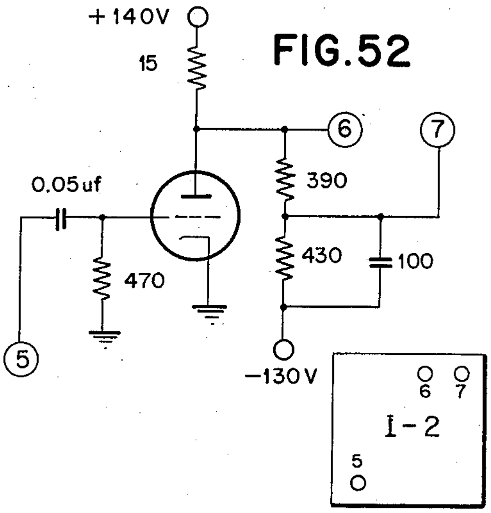
Figure 53:
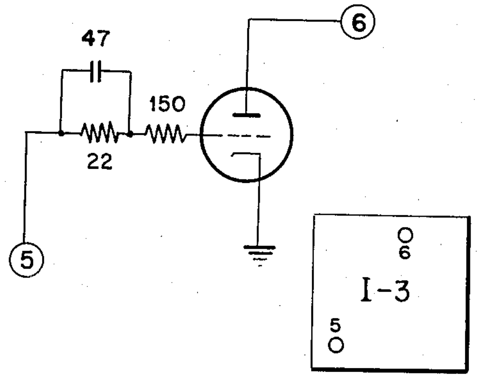
Figure 54:
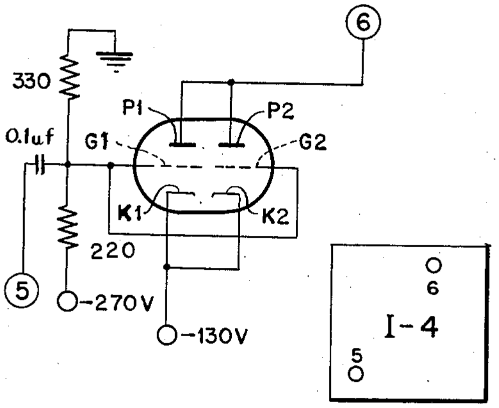

Fig. 46 is a detailed circuit diagram and the corresponding block representation of an OR circuit employed in the invention.

Figs. 47 to 50 inclusive are detailed circuit diagrams and the respective block representations of cathode followers employed in the invention.

Figs. 51 to 57 inclusive are detailed circuit diagrams and the respective block representations of inverters employed in the invention.

Figures 55, 56, 57, 58:
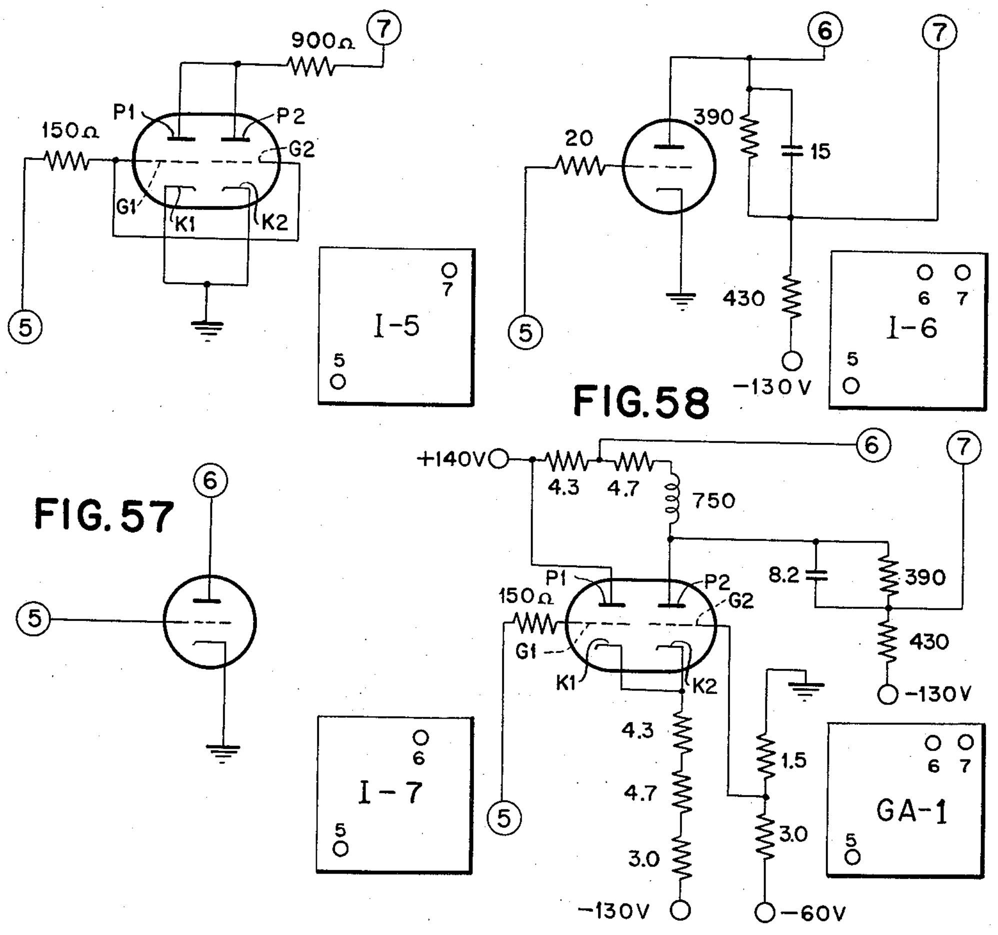

Fig. 58 is a detailed circuit diagram and the corresponding block representation of a grounded grid amplifier employed in the invention.

Before proceeding to the description of the operation of the automatic loading, unloading and rapid rewinding in the tape feed machine, per se, a description will be given of the tape feed machine which utilizes this invention as a part thereof. First the description will be limited to a condition where the tape is already loaded in the machine, and means for stopping and driving the tape in a forward and backward direction will be given. Basically, the tape feed machine used is the one fully described in the patent to J. A. Weidenhammer and W. S. Buslik, 2,792,217, with certain changes made to allow for direct incorporation of this invention. The invention was conceived to improve the tape feed machine of said Weidenhammer et al. patent, but may be usefully employed in other environments where automatic loading, unloading and rapid rewinding are required. The subject invention is also an improvement over the tape feed machine of the Blakely application of common assignee, Serial No. 645,770, which is a divisional application of Blakely, Serial No. 357,607, now Patent No. 2,818,322.

Figure 1:
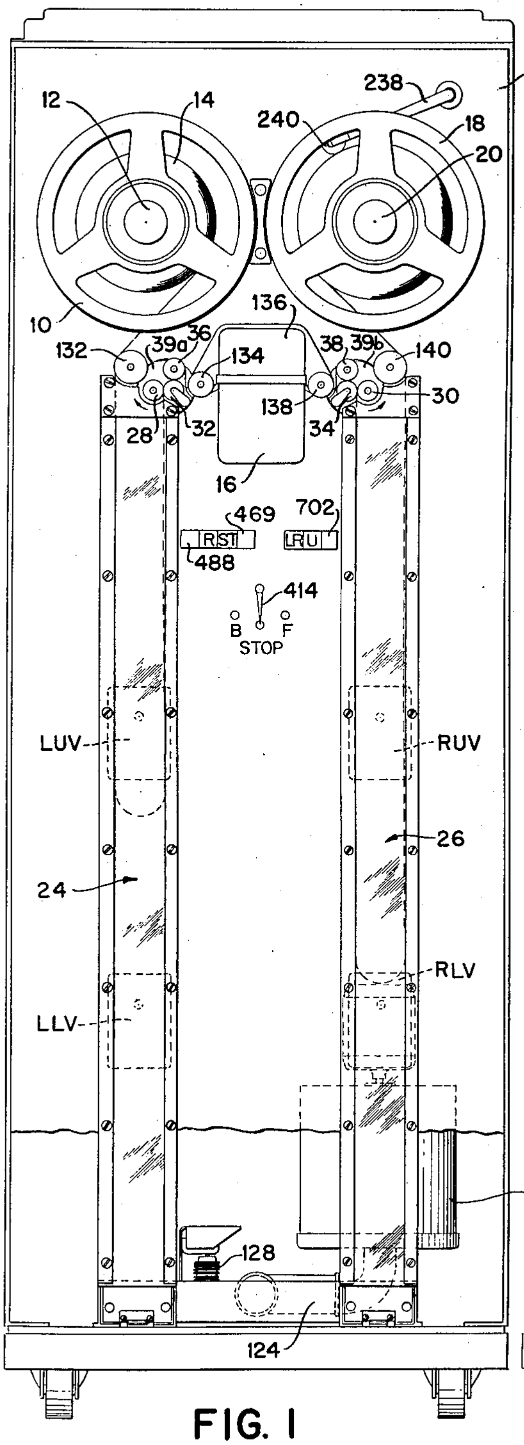
Fig. 1 is a front elevational view of the tape feeding machine.
Figure 2:
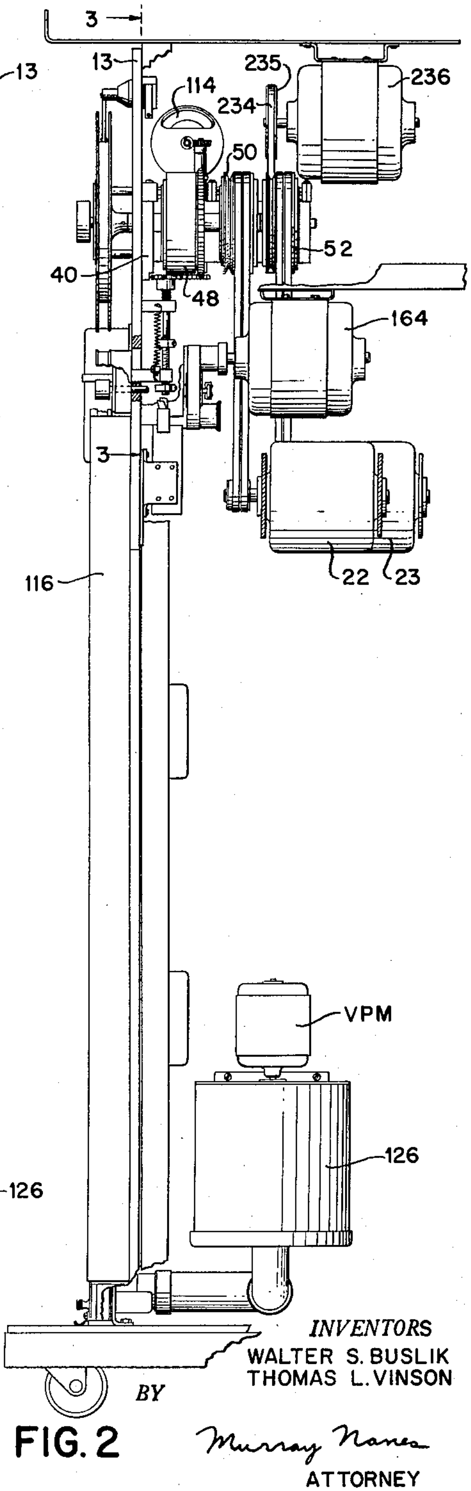
Fig. 2 is a side elevational view of the tape feeding machine.

A general understanding of the machine and its function may be attained by reference to Figs. 1 and 2 of the drawings. A pair of tape reels adapted to hold a coil of record tape are intermittently driven to provide a pair of tape loops upon which the mechanism for feeding the tape through the tape sensing head may coil as the tape is fed in either of two directions. A tape reel 10 which we shall designate as a file reel is mounted on a drive spindle 12. It may be assumed that the reel 10 has thereon a coil of tape 14 on which data has been recorded and from which the tape is to be fed through a tape reading and recording head unit 16. In its forward feed direction, the tape will pass through the tape reading head unit 16 and will be coiled on a second reel 18 which may be designated herein as a machine reel. The machine reel 18 is mounted on a drive spindle 20. The file reel drive spindle 12 and the machine reel drive spindle 20 are selectively rotated in either direction by a pair of motors 22 and 23. Motor 22 is known as the forward motor, while motor 23 is the backward motor. The motors 22 and 23 normally impart constant drive to a pair of electromagnetic clutch mechanisms mounted on each of the drive spindles 12 and 20. An electromagnetic brake is mounted on each of the drive spindles to provide, among other things, that the spindles 12 and 20 may be locked against rotation. The nature of the electromagnetic clutches and the electromagnetic brake will be developed in greater detail at a later point herein.

Upon selective clutching of the electromagnetic clutch mechanisms in drive relation to the drive spindles 12 and 20, these spindles and consequently the tape reels attached thereto may be caused to reel or unreel tape from the coil thereon.

Since the machine is designed for high speed feed of tape through the tape head unit 16 and very rapid accelerations (i.e. starting and stopping) it is important that the tape be provided with little load or mass thereon, and to this end the driving mechanism for the reels 10 and 18 provides a pair of tape loops disposed in a pair of tape control vacuum columns 24 and 26. Each of the columns 24 and 26 has therein means responsive to the position of the respective tape loops for maintaining a relatively stable position of these loops within the columns. The loop sensitive means within the vacuum columns 24 and 26 control the reel drive mechanism in such manner that the loops, so to speak, are self-compensating. The tape reel drive mechanism for each reel operates independently of the other, and both reels are driven independently of feed tape through the tape head unit 16.

Tape from the loop supply in the vacuum columns 24 and 26 is driven through the tape head unit 16 by means of a pair of normally constantly rotating tape drive capstans. In Fig. 1 a tape drive capstan 28 may be deemed to be constantly rotated in a clockwise direction, and may consequently be designated as the backward drive capstan. A similar constantly rotating capstan 30 may be deemed to be constantly driven in a counterclockwise direction and may, therefore, be designated as the forward drive capstan. In connection with the drive capstans 28 and 30, there are provided a pair of tape moving idler pulleys 32 and 34. The pulley 32 is adapted to move a tape trained thereabout into driving contact with the backward drive capstan 28, while the tape moving pulley 34 is adapted to move a tape trained thereabout into driving contact with the forward drive capstan 30. As will be pointed out more fully as the description hereof proceeds, the tape moving idler pulleys 32 and 34 are mounted on a common linkage system which is so designated as to impart the proper related movement to the pulleys for selectively driving a tape either in a forward or a backward direction through the tape head unit 16.

A non-rotary stop capstan is also associated with each of the tape moving idler pulleys, so that these pulleys may be moved into contact with their related stop capstans to hold the tape stationary. Thus the idler pulley 32 has associated therewith a stop capstan 36 which we shall designate herein as the forward stop capstan, and the tape moving idler pulley 34 has associated therewith a stop capstan 38 which we shall designate as the backward stop capstan.

To make alignment easier, drive capstan 28, idler pulley 32 and stop capstan 36 are all mounted on one cylinder **39*a* which in turn is mounted in the main plate 13. For the same reason drive capstan 30, idler pulley 34 and stop capstan 38 are all mounted on a cylinder 39*b* in the main plate 13**.

*Clutches and brakes*

Figure 3:
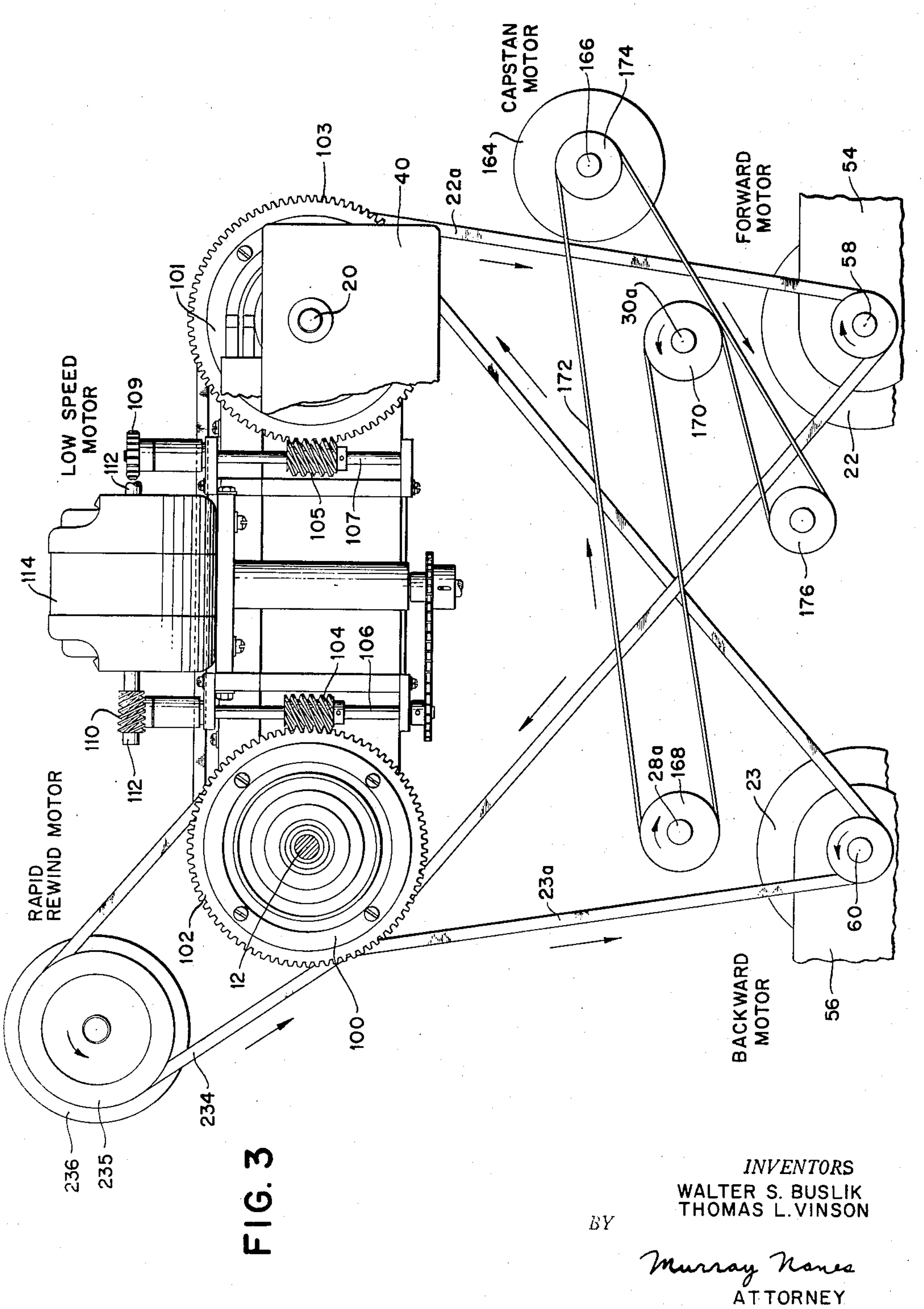
Fig. 3 is a view on line 3—3 of Figs. 2 and 4 illustrating the tape feeding machine and certain adjuncts thereto.
Figures 4, 5:
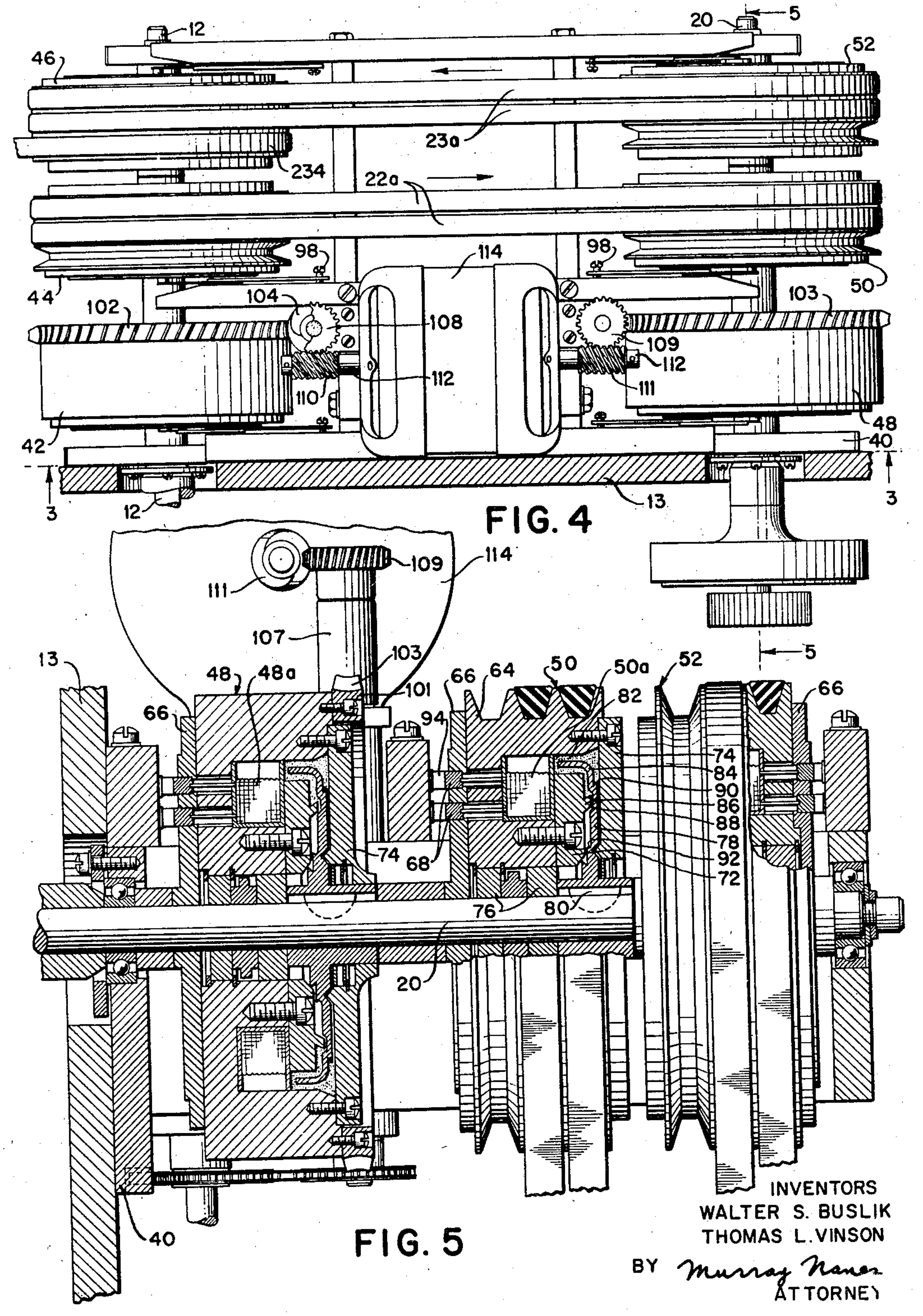
Fig. 4 is a plan view of the tape reel drive mechanism comprising electromagnetic clutches and brakes.
Fig. 5 is a view on line 5—5 of Fig. 4 showing parts in cross section and other parts in full line.

The mechanism for driving the tape reels 10 and 18 may now be referred to in connection with Figs. 3, 4 and 5 of the drawings. The spindles 12 and 20 are mounted for rotation in a frame member 40 which in turn is mounted on the back of the main plate 13. The spindle 12 has mounted thereon an electromagnetic file reel brake 42 (Fig. 4), an electromagnetic unreeling clutch 44 and an electromagnetic reeling clutch 46.

The machine reel spindle 20 has mounted thereon an electromagnetic machine reel brake 48 (Figs. 2 and 4), an electromagnetic reeling clutch 50 and an electromagnetic unreeling clutch 52.

The drive rings of the clutch elements 44—52 are adapted for continuous rotation under the influence of the drive motors 22 and 23.

By referrence to Fig. 3 of the drawings it will be seen that the forward and backward drive motors 22 and 23 are mounted on supporting structures 54 and 56 respectively, in such position that the motor shafts 58 and 60 respectively extend forwardly into substantially vertical alignment with their related magnetic clutch structures.

By reference to Fig. 3 of the drawings it will be seen that the first pair of clutches 44 and 50 are in substantial, transverse alignment on their respective shafts and that the second pair of clutches 46 and 52 are also in substantial, transverse alignment on their respective shafts. The clutches 44 and 50 are driven in a clockwise direction by the motor 22 through a drive belt **22*a* while the clutches 46 and 52 are driven in a counterclockwise direction by the motor 23 through a drive belt 23*a*, the motor shaft 58 having a normal counterclockwise rotation and the motor shaft 60** having a normal clockwise rotation.

Noting Fig. 1 of the drawings, it may be seen that the file reel 10 is disposed for reeling tape thereon when driven in a counterclockwise direction, while the machine reel 18 is disposed for tape winding upon clockwise rotation. In light of this arrangement, the clutch 46 operates as a reeling clutch for the file reel 10 while the clutch 52 operates as an unreeling clutch for the machine reel 18. By the same token the clutch 44 operates as an unreeling clutch for the file reel 10, while the clutch 50 operates as a reeling clutch for the machine reel 18.

The file reel brake 42 and the machine reel brake 48 perform dual functions. They act as brakes to lock their respective shafts against rotation and also act to feed tape slowly during load-rewind and unload operations as will be described hereinafter.

Fig. 5 of the drawings illustrates the specific nature of the brake and clutch units. These units are of identical structure, and a description of the clutch 50 will therefore suffice as a description of all. A driving member 64, including the ring or shell 50, is mounted on the shaft 20 for free rotation thereon. The driving member includes an end plate 66 in which is mounted a pair of commutator rings 68 which provide a current path for an electromagnetic coil **50*a* mounted within an annular recess in the driving member 64 and held therein by an annular plate 72. The opposite face of the structure has fixed thereto a closure plate 74. Suitable hub rings 76 support the driving member for rotation on the shaft 20**.

A driven member 78 is spaced from and disposed between the annular plate 72 and the closure plate 74, The driven member 78 is keyed to the shaft 20 by means of a suitable keying structure 80.

It will be apparent now that when the driving member 64 and the driven member 78 are caused to rotate in unison, drive will be imparted to the shaft 20. Such drive coupling is achieved through the use of iron powder disposed between the driving member 64 and the driven member 78. The circumference of the annular plate 72 is such that its periphery is spaced from the inner wall of the recess formed in the driving member 64. This in effect forms an annular channel adapted to receive an inturned flange 84 of the driven member 78. The inturned flange 84 is so positioned as to provide a substantially equal space on opposite faces thereof in reference to the oppositely disposed walls of the annular channel. Iron powder in a sufficient amount to substantially fill the remaining space of the channel will serve to "freeze" the iron powder and thereby clutch the inturned flange 84 of the driven member 78 to the driving member 64 of the clutch structure whenever the coil 50*a* is energized.

Centrifugal force acting on the iron powder ordinarily maintains the powder in the channel adjacent the inturned end 84 of the driven member 78. However, in order to avoid possibility of the loss of the powder into the bearing structure of that assembly, the annular plate 72 is provided with an annular rib 86—88 which extends into an annular groove 88—84 on the inner face of the driven members 78. The annular rib 86—88 is outwardly slanted to provide a trough for powder that may find its way inwardly along the clutch structure. A similar rib and trough is forced on the outer face of the driven member 78 for preventing passage of powder inwardly along the outer face of the driven member. Any residual particles of powder will be caught in a groove 92 that is formed in the inner face of the driven member near the axial portion thereof.

The commutator rings 68 are in contact with a brush 94 carried on the end of a resilient contact strip 96 which is connected into the control circuit by means of terminal screws 98 (Fig. 4).

The clutches at the rear end of the spindles 12 and 20 are of the same construction as that described hereinabove, and their mounting on their respective shafts is the same except that they are reversed so that the end plate 66 is oppositely disposed to present the commutator rings in a more accessible position. It now follows that the energization of the coils 44*a*—52*a* (corresponding to clutches 44—52) will result in the corresponding forward or backward drive of the respective spindles 12 and 20.

The brake assemblies 42 and 48 are also constructed substantially like the clutch assembly just described, and the manner of mounting these on their respective shafts is also the same with the exception that ring gears 100 and 101 carrying gear teeth 102 and 103 respectively are affixed around the closure plates 74 to the brake assemblies 42 and 48 respectively. The gear teeth 102 and 103 mesh with worm gears 104 and 105 respectively (Fig. 3) fixed to shafts 106 and 107 respectively. Fixed to the top end of shafts 106 and 107 are gears 108 and 109 respectively with worm gears 110 and 111 respectively on a shaft 112 of a low speed motor 114. The rotation of low speed motor 114 will cause the rotation of worm gears 110 and 111 which will effect the rotation of worm gears 104 and 105 respectively which in turn will slowly rotate gear plates 100 and 101 respectively. Since the gears 110 and 111 rotate in the same direction because they are on the same shaft 112, gears 110 and 111 with which they mesh will always be rotated in the same direction. Thus if gears 104 and 105 on the shafts 106 and 107 respectively are rotating clockwise, gear plates 100 and 101 will rotate counterclockwise and clockwise respectively. Then energizing the coils 42*a* and 48*a* of the brakes 42 and 48 respectively will cause the shafts 12 and 20 respectively, and therefore the reels 10 and 18 to rotate in the direction of the gear plates 100 and 101. Reversing the direction of rotation of low speed motor 114 will cause reels 10 and 18 to rotate clockwise and counterclockwise respectively. This low speed rotation of the reels is used for feeding tape into and out of the columns during the automatic load-rewind and unload operations of the tape feed machine, as will be more fully described hereinafter.

It is apparent that a worm gear may act as a brake where an attempt is made to rotate the gear with which the worm gear is in mesh. Thus, if the low speed motor 114 is unenergized, worm gear 104 is stationary and it acts to prevent ring gears 100 and 101 from rotating. Therefore, when the coil in the brake assembly associated therewith is energized, the clutch is engaged and the spindles 12 and 20 are held against rotation. As will be seen at a later point herein, the control circuit is such that drive through either of the clutches on a drive spindle will take place only upon deenergization of the associated brake assembly coil, and that ordinarily the coil in the brake assembly will be energized to hold its associated spindle against rotation when the clutch coils are deenergized.

*Control column*

It has been mentioned heretofore that the position of the tape loops in control vacuum columns 24 and 26 is utilized to control the rotary movement of the tape reels. Herein, by way of example, there has been illustrated a vacuum switch control system for achieving this objective. The control columns 24 and 26 are of the same construction, and the specific nature thereof may best be seen in Figs. 6 and 7 of the drawings. In these figures of the drawings is illustrated the control column 24 shown at the left in Fig. 1. However, since the column 26 is of the same construction, a description of Figs. 6 and 7 will serve as a description of both control vacuum columns. The column herein illustrated comprises a pair of side walls 116, a back panel 118, a transparent face panel 120 and a bottom wall 122, all joined together in airtight contact.

At the base of the columns 24 and 26 is a header 124 with which the columns communicate. The header 124 is connected with a vacuum pump 126 (Fig. 1) adapted to be driven by a suitable motor VPM. The foregoing provides a structure by means of which the control columns 24 and 26 may be evacuated when the upper ends thereof are closed against the atmosphere. To detect the presence of a vacuum, a bellows 128 (Figs. 1 and 7) is provided which is adapted to collapse when a vacuum is present in the columns allowing the contacts of a vacuum supply switch 120 to close.

As the tape comes from the file reel 10, it passes over a guide idler 132, down into the control column 24, up around the idler pulley 32, across and under an idler 134 which is mounted on a cover 136 of the head 16. The tape then passes between the read/write head unit 16 and the head cover 136, under an idler 138 on the cover 136, from which it passes over the idler pulley 34, down into the control column 26 and up over a guide idler 140, to machine reel 18. The idlers, pulleys and capstans have been arranged on the machine in the position shown in Fig. 1 so as to best perform automatic loading, unloading and rapid rewind, as will be described hereinafter.

The side walls 116 of the vacuum columns 24 and 26 are of a width substantially equal to the width of the tape 14. When a tape loop is formed, therefore, in either of the vacuum columns 24 or 26, the oppositely disposed marginal edges of the loop will be in substantial contact with the back plate 120 of the respective vacuum columns. The back of the tape in the tape loop is spaced from the side walls of the vacuum columns through substantially the entire length of the loop but the bight of the loop is in substantial contact with the side walls. This disposition of the tape loop within the vacuum columns 24 and 26 is assured by the tape guide structure. The horizontal distance between the outer periphery of the guide idler 132 and the drive capstan 28 is somewhat less than the spacing of the inner faces of the column side walls 116. The same is true of the horizontal spacing of the guide idler 140 and the drive capstan 30 at the right of the structure.

The particular horizontal spacing of the guide idlers and their associated drive capstans determine the spacing of the tape bights at the entrance to the columns, and the back of the tape will be spaced slightly from the column side walls through the major portion of the tape loops, the loops, however, widening out at their lower ends to contact the side walls of the columns, thereby forming an air seal between the lower portion of the tape loop and the column walls.

Figures 6, 7, 8, 9:
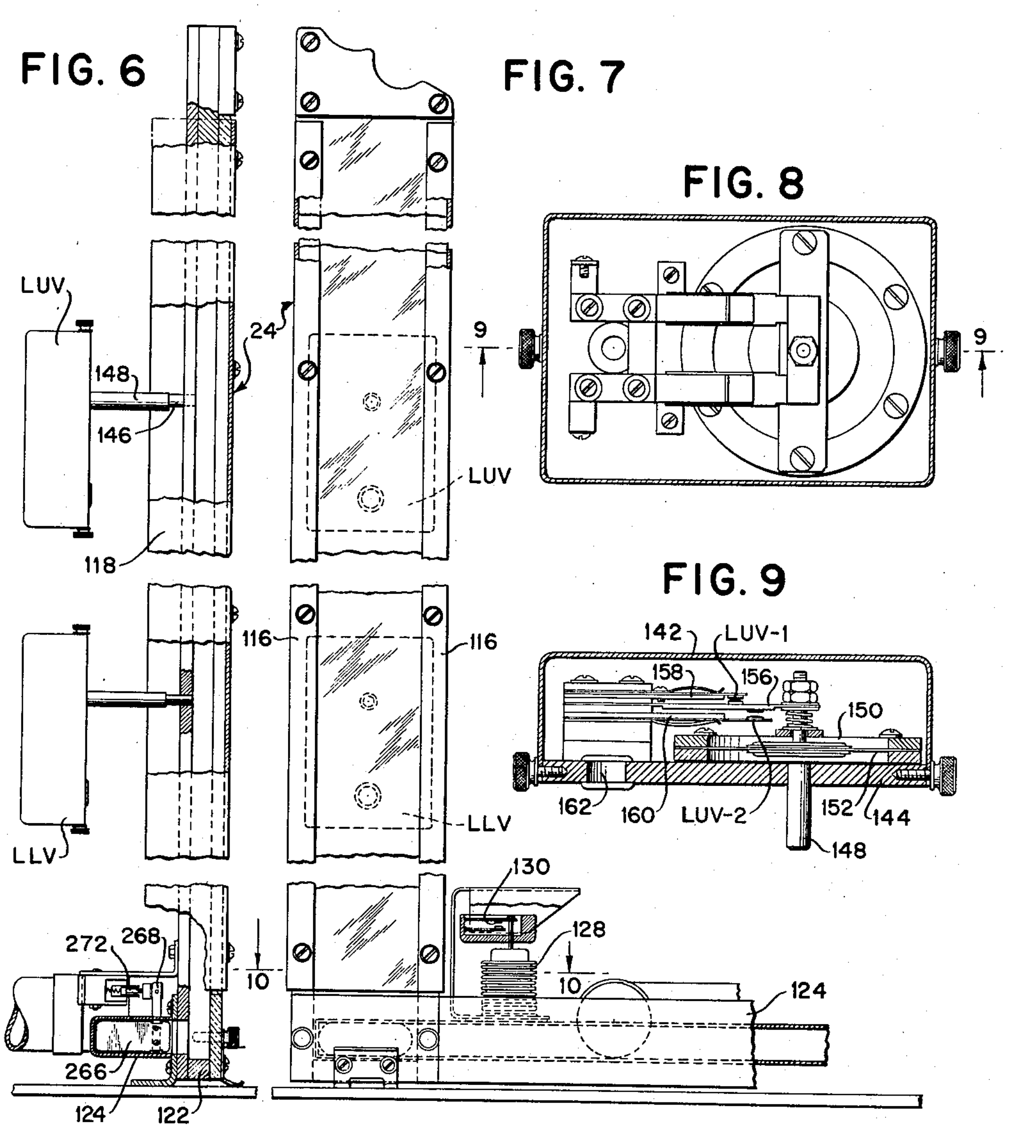
Fig. 6 is a side elevational view of a vacuum column providing for tape loop control.
Fig. 7 is a front elevational view of the vacuum column of Fig. 6.
Fig. 8 is a plan view of a vacuum operated switch used in connection with the vacuum columns of Figs. 6 and 7.
Fig. 9 is a cross sectional view on line 9—9 of Fig. 8.

Spaced along the length of each of the control columns 24 and 26 are two vacuum operated switches, the details of which are shown in Figs. 8 and 9. In Fig. 1 of the drawings the vacuum switch RUV is the right upper vacuum switch, while the switch RLV is the right lower vacuum switch. In similar fashion the control column 24 has a left upper vacuum switch LUV and a left lower vacuum switch LLV.

The vacuum switches each have a normally closed contact point and a normally open contact point. The switches communicate with the interior of their respective control columns through an aperture in the back plate 118 thereof. By reference to Fig. 9 it will be seen that the switch structure is encased in a shell 142 which fits tightly against a base plate 144, the base plate being held behind the back panel 118 of the control column so that a cylindrical aperture 146 of the back panel registers with a cylindrical passage 148 in the base 144 of the switch structure. Within a cavity formed between the base plate 144 of the switch structure and an overlying cover 150 is a pressure responsive diaphragm 152 to which a contact operating shaft 154 is attached, this connection between the diaphragm and the shaft 154 being airtight. Adjustably secured to the opposite end of the contact operating shaft 154 is a spring contact finger 156 having contact points thereof adapted to contact corresponding points on fixed contact fingers 158 and 160. Outward deflection of the diaphragm 152 under the influence of atmospheric pressure when its associated control column is evacuated will cause the points on the contact fingers 158 and 160 to transfer.

For the sake of uniformity herein it may be assumed that the contact carried on the finger 158 is a normally closed contact while the contact on the finger 160 is a normally open contact. Furthermore, the contact on the arm 158 in Fig. 9 may be designated as the LUV—1 contact, whereas the contact on the arm 160 may be designated as the LUV—2 contact. A similar system of numbering will be applied to the other vacuum switches when the circuit description is rendered in connection with Fig. 33 of the drawings.

Under the foregoing conditions, any time that the diaphragm 152 is subjected to vacuum within the vacuum columns, atmospheric pressure on the opposite side of the diaphragm will cause transfer of the switch points, i.e. the points LUV—1 of Fig. 9, for example, will open, while the points LUV—2 will close.

Electrical connections with the switch blades are made through a connecting bushing 162 at one end of the base plate 144.

During normal operation of the machine, the tape loops in columns 24 and 26 will be disposed between switches RUV—RLV and LUV—LLV of the respective column pairs. Under these conditions the switches LUV and RUV are subject to atmospheric pressure only, whereas switches LLV and RLV are influenced by vacuum in the columns 24 and 26, the tape loops constituting a column air seal above the switches LLV and RLV.

The device is designed so that the tape loops in the control columns 24 and 26 are maintained between the respective upper and lower vacuum switches. To this end the vacuum switch LUV is in the control circuit of the magnetic coil 44$a$ in the unreeling clutch 44, while the vacuum switch LLV is in the control circuit for the magnetic coil 46$a$ of the reeling clutch 46. In like manner the vacuum switch RUV is in the control circuit of the unreeling clutch 52, while the vacuum switch RLV is in the control circuit for the reeling clutch 50.

Should either tape loop drop below its lower vacuum switch, such switch will be subject to atmospheric pressure on both sides of its diaphragm 152, causing the contact points thereof to transfer. Consequently, under such conditions the switch LLV will call into action the file reel reeling clutch 46 and the switch RLV will call into operation the machine reel reeling clutch 50.

Such tape loops will be taken up the reeling action of the respective reels, or either thereof, until the bight of the loop is above the lower control column switch, whereupon the switch will again transfer its contact points under influence of vacuum within the column.

In like fashion the upper vacuum switches LUV and RUV which are subjected to atmospheric pressure on both sides during normal operation of the machine will transfer their contact points when the bight of the tape loop rises above these switches. Under these conditions the upper switches will be subject to the vacuums within their respective control columns. The low pressure on the inner side of the diaphragm 152 will thereupon permit atmospheric pressure on the opposite side to transfer the contact points of the upper switch structure. Upon such transfer the switch LUV will serve to energize the coil 44$a$ in the unreeling clutch 44, and the switch RUV will call into action the unreeling clutch 52 whereby the file reel 10 and machine reel 18 respectively, or either one of them, will be rotated to unreel tape therefrom and thereby lengthen the loop in the control columns 24 and 26 respectively until the bight thereof once more drops below the upper switches LUV and RUV.

From the foregoing it will be seen that the operation of the tape reels 10 and 18 is in effect a self-compensating operation whereby the tape loops in the control columns 24 and 26 are maintained in an optimum position. Furthermore, it is apparent that the controls for the reels 10 and 18 are independent one from the other.

The second contact point of each vacuum switch is used to provide a circuit for their respective brake coils. When the control circuit is described, it will appear that a circuit is established through closed points of switches LUV and LLV to energize the coil 42$a$ of the file reel brake 42 and that a circuit is provided through closed points of switches RUV and RLV to energize the coil 48$a$ in the machine reel brake 48. It is intended that the brake coils be energized whenever the reeling and unreeling clutches are deenergized.

*Tape drive*

Figure 12:
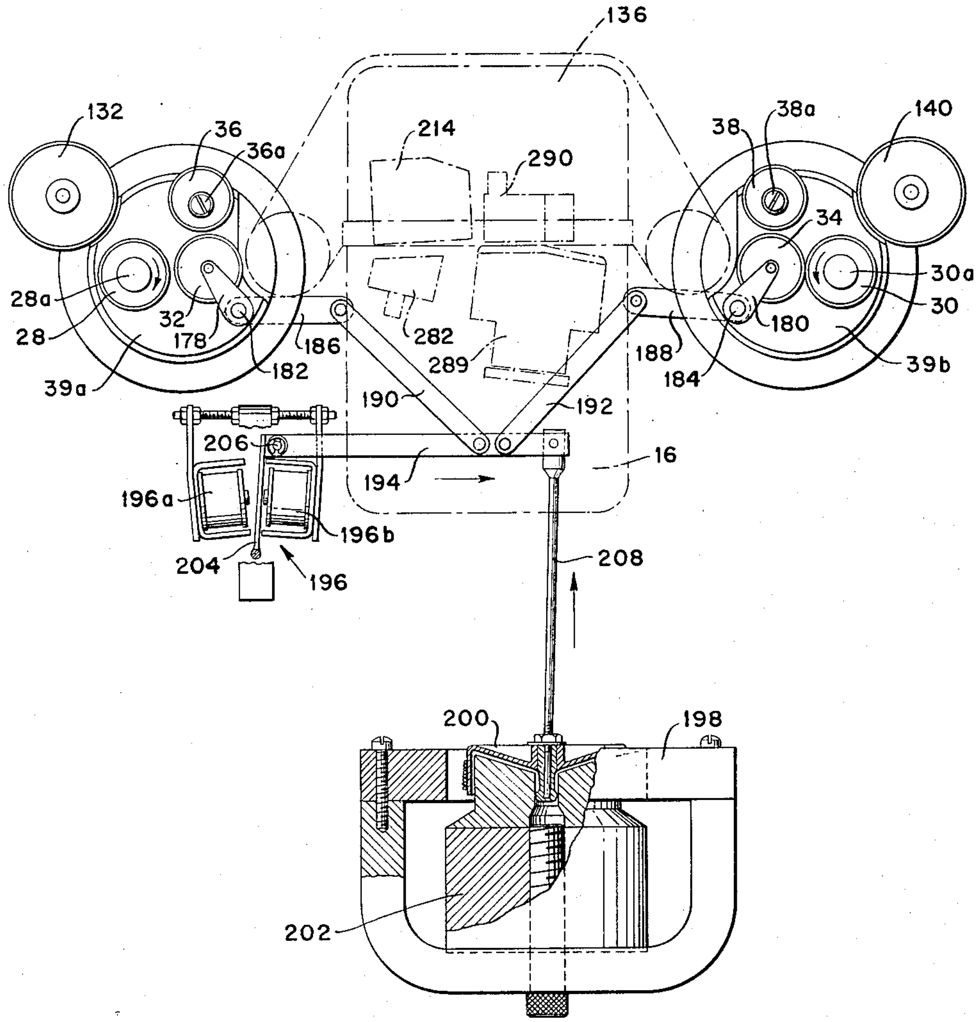
Fig. 12 illustrates the tape drive mechanism and the means for biasing the mechanism into tape driving position, the view showing the parts biased into position for driving the tape in a forward direction.

The mechanism for driving the tape through the tape head 16 in a forward direction is shown in Fig. 12 of the drawings, Figs. 13 through 17 diagrammatically illustrating the other drive and stop positions. The drive capstan 30 is constantly driven by means of a capstan motor 164 (Fig. 3) whose shaft 166 rotates in a clockwise direction. The drive capstans 28 and 30 are journalled for rotation in the main plate 13 of the machine, and the shafts 28$a$ and 30$a$ extend to the rear of the main plate 13 where they have affixed thereto belt pulleys 168 and 170 respectively. A drive belt 172 is trained about the pulley 170, a motor shaft pulley 174 and an idler pulley 176, so that upon clockwise rotation of the motor shaft 166 the capstan shaft 28$a$ will be constantly rotated in a clockwise direction while the capstan shaft 30$a$ will be constantly rotated in a counterclockwise direction.

By reference to Fig. 12 of the drawings it will be seen that the tape moving idler pulleys 32 and 34 are mounted for rotation at the free end of levers 178 and 180 respectively. The inner ends of the levers 178 and 180 are fixed to pivot shafts 182 and 184 respectively. The pivot shafts 182 and 184 are journalled for rocking movement in the main plate 13, and each of these shafts has attached thereto a short link 186 and 188 respectively. The inner, free ends of the links 186 and 188 have pivoted thereto levers 190 and 192 respectively which have their opposite ends pivoted to a common operating lever 194.

With the foregoing structure the tape moving idler pulleys 32 and 34 may be selectively engaged with their related drive capstan and with their stop capstan. Thus the tape moving idler pulley 32 may be brought into contact with the backward drive capstan 28 or with the forward stop capstan 36. The tape moving idler pulley 34 may be selectively engaged with the forward drive capstan 30 or with the backward stop capstan 38. The stop capstans 36 and 38 are eccentrically mounted in the main plate 13 by means of screws **36*a* and 38*a*** about which the capstans may be adjusted to vary their braking effect.

In order to impart controlled movement to the tape moving idler pulleys 32 and 34, there has been provided herein a forward-backward actuator 196 comprising a pair of aligned, high speed relay magnets backward magnet **196*a* and forward magnet 196*b*, and a drive-stop actuator 198 which consists of a drive-stop moving coil 200 in a field of high flux density caused by a permanent magnet 202. The backward and forward magnets 196*a* and 196*b* are mounted on a supporting yoke in axial relation to each other and with the provision of a space between the magnets to accommodate a pivoted armature 204 to the free end of which the operating lever 194 is attached by means of a pivot stud 206**.

The drive-stop moving coil 200 has affixed thereto a rod 208 which is connected to the free end of operating lever 194.

When the drive-stop actuator 198 is energized to repel the drive-stop moving coil 200 thereof, an upward thrust will be delivered to the rod 208. This will move the linkage to force the tape moving idler pulleys 32 and 34 downwardly and outwardly. When the forward magnet **196*b* is energized, the armature 204 will be attracted thereto and the operating lever 194 will be biased to the right (as in Fig. 12) so that the tape moving idler pulley 34 is engaged with the forward drive capstan 30. This will cause the tape 14 to be driven downwardly into the control column 26**.

The foregoing describes one of four stable positions into which the tape moving idler pulleys may be biased during normal forward and backward operations. The three other positions are illustrated in Figs. 13, 14 and 15 of the drawings.

Figure 13:
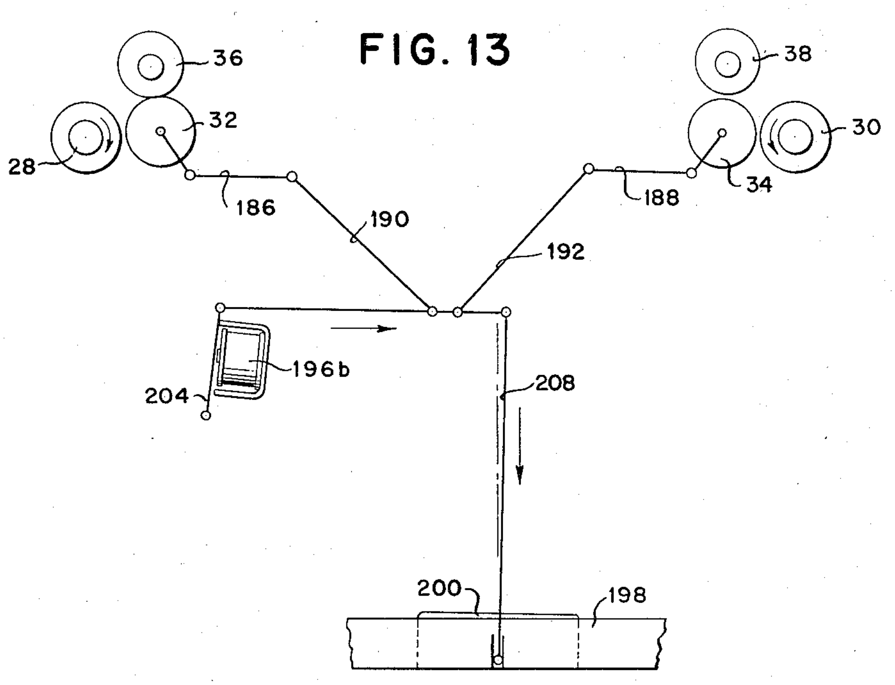
Fig. 13 is a diagrammatic view of the mechanism shown in Fig. 12 with the parts thereof biased into position to stop tape movement following feed of tape in a forward direction.

Fig. 13 shows the position of the tape moving idler pulleys for stopping tape feed following forward feed of the tape. At this point it may be appropriate to mention that the tape is always pulled through the tape head unit 16 and is stopped by braking the tape at a position behind the tape head unit 16. This will insure sufficient tape tension at the tape head unit 16 at all times.

Reverting to Fig. 13 of the drawings, it will be seen that the tape 14 is stopped by engaging the tape between the forward stop capstan 36 and the tape moving idler pulley 32. To achieve this function, the backward magnet **196*b* must remain energized, but the flow of current through the drive-stop moving coil 200 is reversed whereby the coil 200 is attracted to the permanent magnet 202. This results in a downward pull on the rod 208. Such pull on the linkage system will tend to raise both tape moving idler pulleys 32 and 34, but since the tape moving idler pulley 32 in the forward drive position was higher than the pulley 34, the idler pulley 32 engages the forward stop capstan 36 to brake tape movement. Engagement between the tape moving idler pulley 32 and its forward stop capstan 36 results from the upward bias given to the tape moving idler pulley 32 under the influence of the forward magnet 196*b***.

Figure 14:
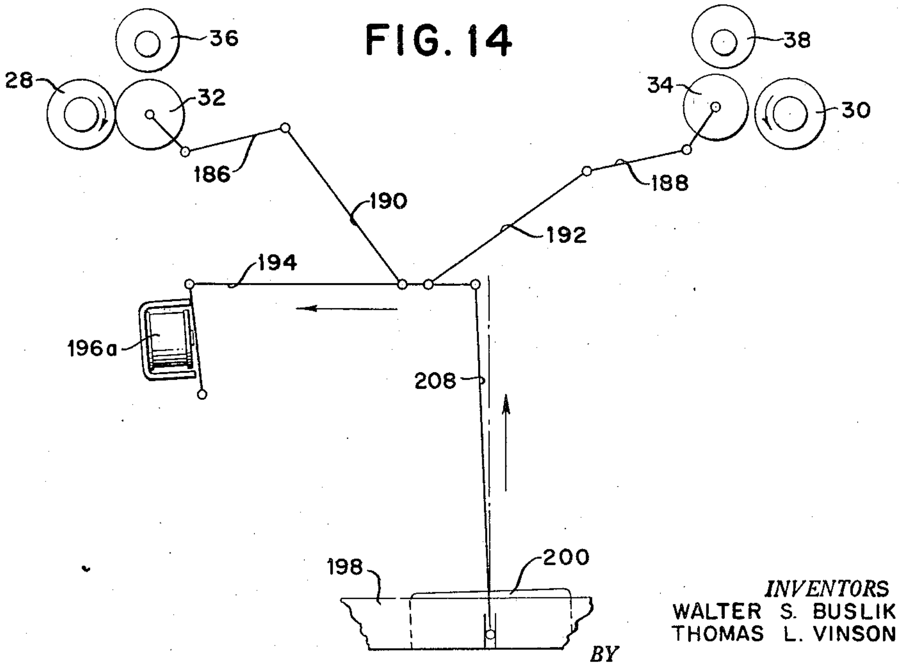
Fig. 14 is a diagrammatic view such as that in Fig. 13 and shows the mechanism biased into position to effect a backward feed of the tape.
Figure 15:
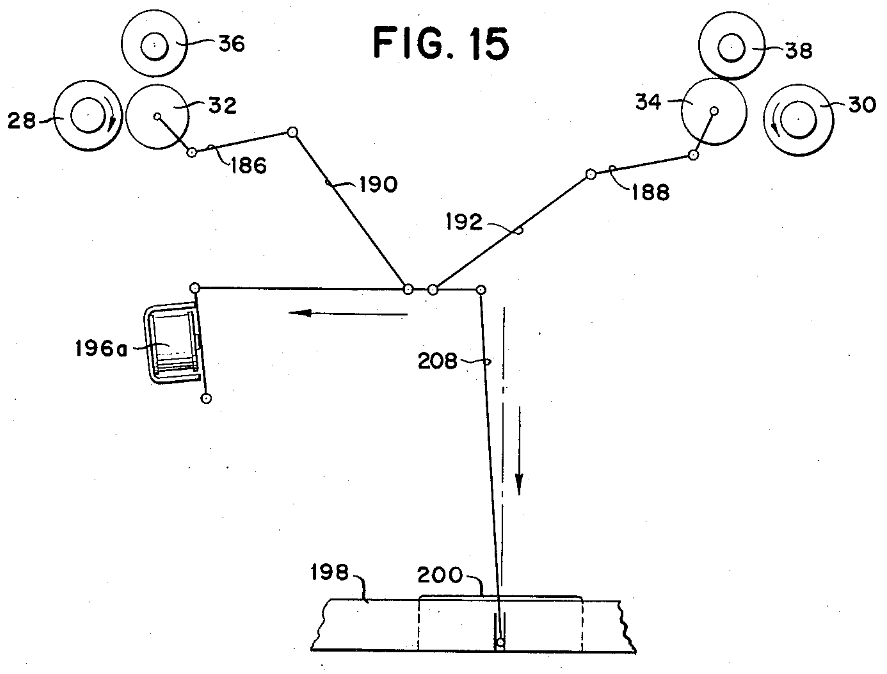
Fig. 15 is a diagrammatic view such as those in Figs. 13 and 14 with the parts biased into position to stop tape feed following the backward feed of the tape.

In Fig. 14 of the drawings, the tape 14 is moving in a backward direction. To bias the tape moving idler pulley 32 into contact with the backward drive capstan 28, it is necessary to energize the drive-stop moving coil 200 to cause an upward movement of the rod 208 which moves the linkage so as to force the pulleys 32 and 34 upwardly and inwardly. When the backward magnet **196*a* is now energized, the armature 204 will be attracted thereto and the operating lever will be biased to the left. Such movement will serve to project the tape moving idler pulley 32 into engagement with the backward drive capstan 28 whereby the tape 14 is driven in a backward direction, i.e., from the machine reel 18 to the file reel 10**.

The backward stop position of the tape drive mechanism is shown in Fig. 15 of the drawings, wherein the tape moving idler pulley 34 is brought into engagement with the backward stop capstan 38. To achieve this engagement, the backward magnet **196*a* must remain energized but the current in the drive-stop moving coil 200 is reversed, whereby the coil is pulled downwardly so that the rod 208 exerts a downward pull on the operating lever 194 with a consequent upward bias on the tape moving idler pulley 34 into contact with the backward stop capstan 38**.

Figure 16:
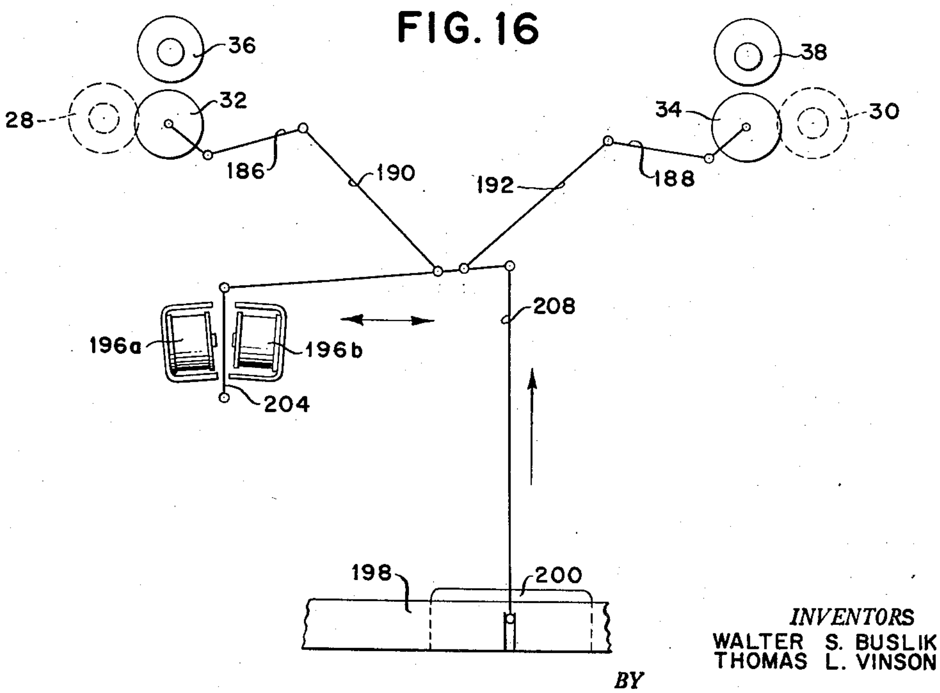
Fig. 16 is a diagrammatic view of the mechanism shown in Fig. 12 with the parts thereof biased into position away from both the drive and stop capstans as when in an unloaded position.
Figure 17:
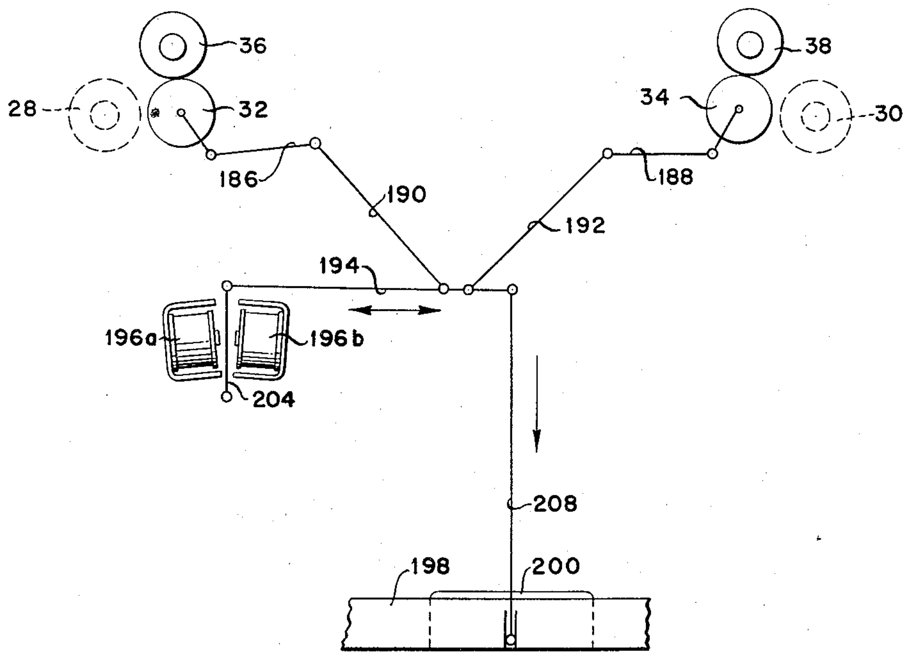
Fig. 17 is a diagrammatic view of the mechanism shown in Fig. 12 with the parts thereof biased into position against both stop capstans to stop tape movement during a load operation.

Two other stable positions into which the tape moving idler pulleys may be biased are illustrated in Figs. 16 and 17 which apply to conditions which arise only during load and unload operations in a manner to be described hereinafter.

Fig. 16 shows the tape moving idlers in the unloaded condition, away from both the drive and stop capstans, in a position to permit easier threading. To achieve this position, the circuit containing both the backward and forward magnets **196*a* and 196*b* must be opened to deenergize both magnets so that armature 204 will be midway between magnets 196*a* and 196*b*. When the drive-stop moving coil 200 is energized to cause an upward movement of the rod 208, the linkage will move to force the tape moving idlers downwardly and outwardly. In Fig. 16, the drive capstans 28 and 30 are shown dotted to indicate that they have been retracted into the frame and are thus out of the way of the idler pulleys 32 and 34** respectively.

In Fig. 17 of the drawings, both the idler pulleys 32 and 34 are shown during a load operation, against the stop capstans 36 and 38 respectively. To achieve this dual engagement, the backward and forward magnets **196*a* and 196*b* must remain unenergized but the current in the drive-stop moving coil 200 is reversed, whereby the coil is pulled downwardly so that the rod 208 exerts a downward pull on the lever 194 with a consequent upward bias on the tape moving idler pulleys 32 and 34 into contact with the backward stop capstans 36 and 38 respectively. In this position, the force exerted by each idler pulley 32 and 34** against the stop capstans is just a fraction (approximately one sixth) of the force exerted by each idler pulley during the normal forward and backward operations, for a reason to be described hereinafter.

*Semi-automatic threading*

The mechanism and circuits just described indicate means for moving tape at normal speed in a forward and backward direction without explaining how the tape is threaded into the machine.

Figure 18:
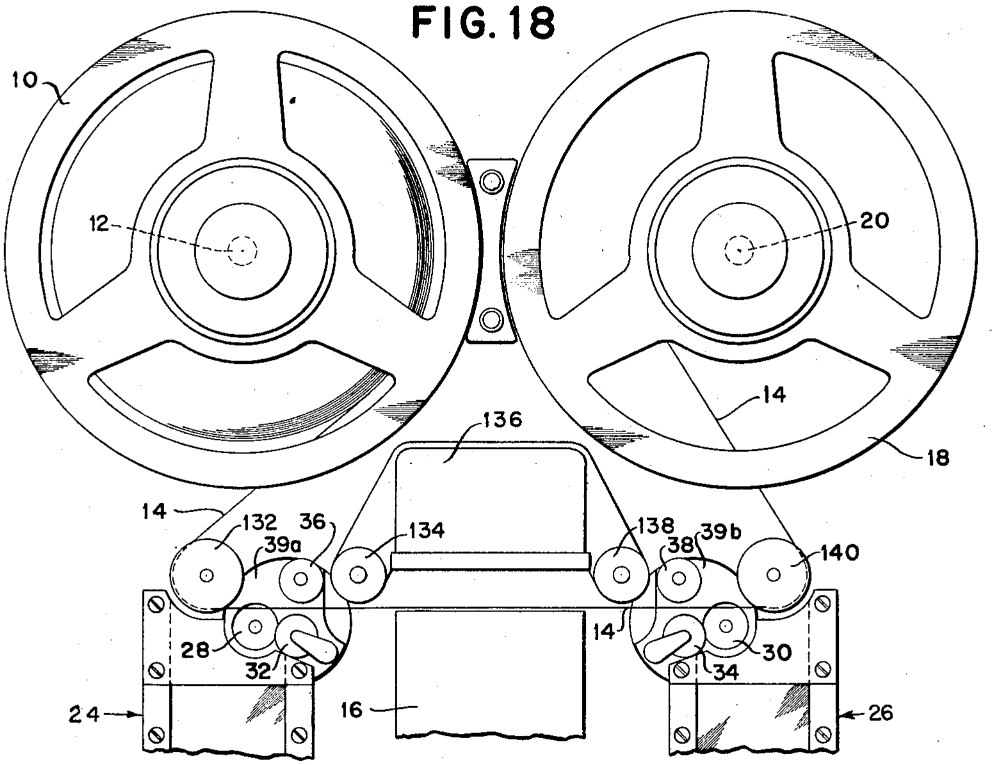
Fig. 18 is an enlarged view of part of Fig. 1 showing the relation of the tape to the columns, capstans, idlers and pulleys when the tape is in the unloaded position.

To thread the tape drive unit, it is only necessary to place the file reel 10 (Fig. 18) on the spindle 12 and manually wind the end of the tape 14 down around the idler 132 straight across around idler 140 up where it is connected to the machine reel 18, as shown in Fig. 18. Comparing Fig. 18, wherein the tape 14 is shown in its unloaded position, with Fig. 1 wherein the tape 14 is shown in its loaded position, it can be observed that in order to remove the obstacles to easy threading, the drive capstans 28 and 30 must be retracted into the frame 13, the head cover 136 and the head idlers 134 and 138 must be raised, and the idler pulleys 32 and 34 must be lowered.

To insure that the tape 14 is not completely unwound from the reel when the tape is being driven, the tape is provided with an aluminum strip fastened close to each end (see Fig. 27) which is sensed to indicate the start point and end point of the tape. The start point is hereafter to be referred to as the load point and the end point as the tape indicator point. A tape indicator point aluminum strip 210 (Fig. 27) is placed far enough away from one end of the tape so that the tape will not unwind from the file reel 10 during a forward operation and a load point aluminum strip 212 is located from the other end of the tape so that the tape will not unwind during a backward operation. The load point aluminum strip 212 and the tape indicator point aluminum strip 210 are sensed, in a manner to be described hereinafter, by photocells in the head cover 136.

In loading the machine, the machine reel is manually rotated clockwise until the load point aluminum strip 212 has moved past the tape head 16.

To start the machine at its load point it is now only required that a load-rewind button LR on the front panel (Fig. 1) be actuated and the low speed motor 114 will slowly rotate the file reel 10 clockwise and the machine reel 18 counterclockwise, thereby feeding tape 14 into each of the columns. The head cover is also lowered and then the drive capstans 28 and 30 are moved forward from their retracted position. An indication is then automatically given by the machine which feeds the tape backward until the load point 212 is reached, at which time the machine stops in its loaded position and signals that it is ready for normal forward operation.

*Photosensing of load and tape indicator points*

A photosensitive device 214 (Fig. 12 and Fig. 27) is located within the head cover 136 (Fig. 12) so as to enable it to detect the load point aluminum strip 212 (Fig. 27), while the tape indicator point aluminum strip 210 is detected by a similar photosensitive device 216. Device 214 comprises a block 218 with two diagonal grooves 220 and 222 cut so as to meet at an opening 224 at the bottom of the block 218. A load point photocell 226 in groove 220 receives light reflected off the surface of the tape 14 through the opening 224 from a load point light bulb 228 in groove 222. Device 216 includes similar mechanisms but used for detecting the tape indicator point, comprising a light bulb 230 and a photocell 232 (not shown in Fig. 27).

The load point and tape indicator point photocells 226 and 232 respectively are photocell devices of the well-known type, wherein a change in light intensity on the photocell changes the electrical conductivity thereof. The tape used in the machine is made of cellulose acetate which is a poor reflector of light in the range of the spectrum in which the photocell is sensitive. The photocells used may be considered variable resistance devices because when the light shining on a photocell is reflected off the tape, the photocell has a high resistance, but when the light shines directly into the photocell or is reflected off the aluminum strips, the photocell resistance is low. When an aluminum strip passes under the photocells, the amount of light received by the photocell reflected off the aluminum strip will increase enough to operate circuits to be described hereinafter.

The sensing of the load point aluminum strip 212 will operate circuits to be described, which stop the tape. The tape indicator point aluminum strip 212 could also operate on circuits to stop the tape, but since circuits will be described which enable the tape feed machine to be part of a data processing machine, the tape indicator point aluminum strip 210 is shown in the drawings as operating a circuit which sends a signal to the data processing machine indicating that the tape indicator point has been reached.

*Rapid rewind*

Another novel feature of the tape feed machine is the ability to rewind tape at a speed much greater than that of the normal backward operation. In order to perform this rapid rewind operation, the tape must be brought to the unload position shown in Fig. 18. This is necessary because since during a rapid rewind operation, constant speed past the magnetic head 16 is not required, the tape can be pulled out of the columns and removed from the capstans and idlers to provide the least possible amount of interference and friction.

From Figs. 2, 3 and 4, it may be seen that the reeling clutch 46 is operatively connected through a drive belt 234 to a pulley 235 of a rapid rewind motor 236 which is selectively rotatable in a counterclokwise direction (Fig. 3). When the tape is in the unload position of Fig. 18, the forward and backward motors 22 and 23 are not running. If a rapid rewind operation is desired, the rapid rewind motor 236 is energized and reeling clutch 46 is lightly energized as will be more fully described hereinafter. The energization of reeling clutch 46 causes the counterclockwise rotation of file reel 10 to effect a rewinding of the tape. Since the sudden starting of the rapid rewind motor 236 will snap the tape, a light energization of reeling clutch 46 is effected, to allow clutch 46 to slip until the tape comes up to the speed of the rapid rewind motor 236.

Figures 26, 27, 28:
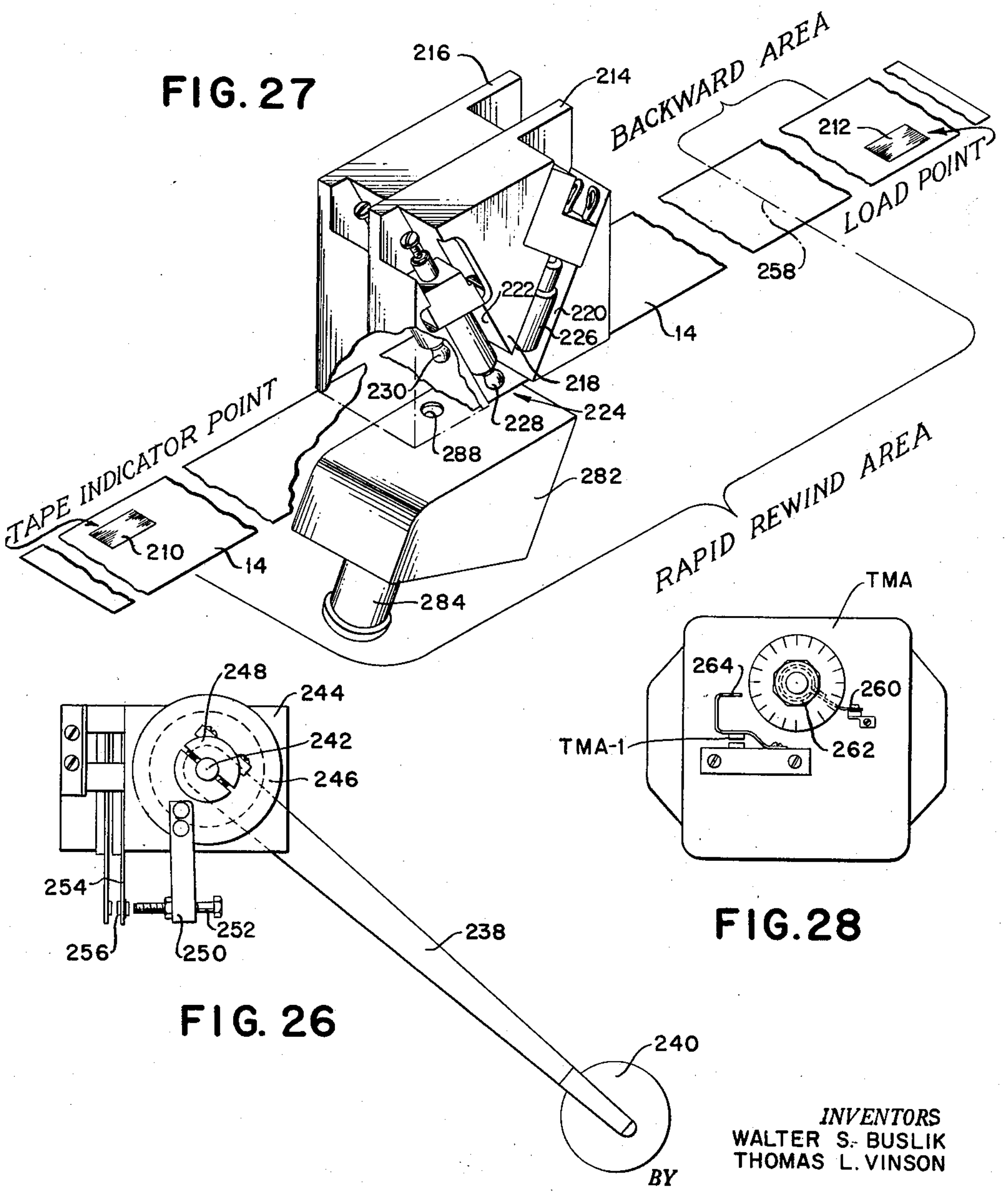
Fig. 26 is a rear elevational view of an arm switch used in rapid rewind operations and also as a means for distinguishing between the tape rapid rewind area and the tape backward area.
Fig. 27 is a view showing the position of the lights and the photocells in the tape head, and a diagrammatic view of the tape (with portions not shown) indicating the load point and tape indicator point aluminum strip, and the tape rapid rewind and backward areas.
Fig. 28 is a front elevational view of a timing motor used in the rapid rewind operation.

During a rapid rewind operation the tape is moving so fast that if an attempt is made to stop it by use of the load point aluminum strip 212, the tape will snap. Means have been provided which indicate when the load point is approaching, and which act to shut off the rapid rewind motor 236 and apply a light brake to bring the tape to a gradual stop. The machine then goes automatically into a normal backward operation until the load point aluminum strip 212 is sensed at which time the tape will stop at the load point, ready for normal forward operation. This indicating means includes an arm 238 (shown in Fig. 1 and also a rear view is shown in Fig. 26) carrying a roller 240 which rides on the tape 14 wound around the machine reel 18. The arm 238 is fastened to a pin 242 pivoted in the main plate 13. The pin 242 extends through the main plate 13 through a support member 244 (Fig. 26) and through a disc 246 having a hub 248 which is fastened to the pin 242. Fastened to the disc 246 is a lever arm 250 which extends from it so that the flat end of an adjusting screw 252 can cooperate with a contact arm 254 of the arm contacts 256.

When the tape is at the load point, arm contacts 256 are closed. As the tape is wound around machine reel 18, the roller 240 will be raised, rocking arm 238 clockwise (counterclockwise in rear view Fig. 26) until arm contacts 256 open. The point at which the arm contacts 256 transfer, is known as the transfer point 258, and is indicated in Fig. 27, as the dividing line between a rapid rewind area and a backward area. When the arm contacts 256 are closed, the tape 14 is said to be in the backward area, which indicates that if the load-rewind button LR were pressed, the tape would return to load point by going directly into a normal backward operation. When the arm contacts 256 are open, the tape 14 is said to be in the rapid rewind area, which indicates if the tape 14 is in that area at the time of a load-rewind operation, the tape would return to load point by first going into rapid rewind.

Since it takes a certain fixed time to unload the tape, bring the rapid rewind motor 236 up to speed, stop the motor 236, and then load the tape again, there is a point where the amount of tape necessary to be rewound can be rewound faster by a normal backward operation than by a rapid rewind operation. This is the ideal point for the transfer point. It may be necessary, however, to consider the fact that the transfer point is also the point at which the rapid rewind motor 236 is shut off and the light brake applied. Thus the transfer point 258 must also be far enough away from the load point to insure that when the rapid rewind motor 236 is deenergized at its maximum speed, there is enough time left so that the tape stops before getting to load point. It is to be noted here, that during a rapid rewind operation, the load point and tape indicator point lights 228 and 230 respectively, are disabled in a manner to be presently described.

To insure that the rapid rewind motor 236 has come to a stop before the tape is loaded in preparation for the normal backward operation, a reset timer TMA (Fig. 28), which is a commercial type adjustable type reset timer, is energized by the closing of arm contacts 256 (Fig. 26) by circuits to be described later. The reset timer TMA, when energized, begins to rotate an arm 260 counterclockwise against the urging of a spring 262. Arm 260 continues to rotate, as long as it is energized, until it enters into engagement with a member 264 which carries one of the contacts of reset timer contacts TMA—1 thereby closing said contacts TMA—1 to start the low speed motor 114 in a manner to be presently described. Contacts TMA—1 are held in the closed position until reset timer TMA is deenergized, at which time, arm 260 returns to its original position (shown in Fig. 28) under the influence of spring 262.

*Feeding tape into and out of columns*

Figure 19:
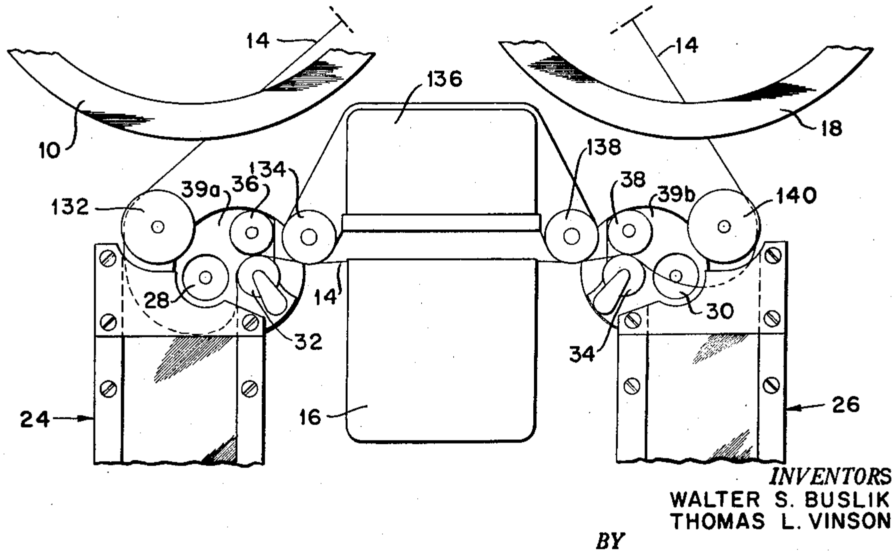
Fig. 19 is a view similar to that of Fig. 18 showing the relation of the tape to the idlers, capstans and pulleys when the tape has just entered a column during a load operation.

As previously described in unloading and loading, it is necessary to be able to respectively take tape out of, and feed tape into, the vacuum columns 24 and 26. To feed tape into the vacuum columns from the unload position shown in Fig. 18, means have been described for rotating the gear plates 100 and 101 (Figs. 3 and 4) clockwise and counterclockwise respectively by energizing the low speed motor 114. Energizing the brakes 42 and 48 then causes the reels 10 and 18 to rotate clockwise and counterclockwise respectively as previously described. As the reels rotate, they slowly feed tape, and a flow of air from the columns aided somewhat by gravity urges the tape down towards the columns, causing a loop to be formed over each column. Since the amount of tape on each reel is rarely the same, the amount of tape fed by the reel with the most tape will be greater. As an example, Fig. 18 shows a condition where there is more tape on reel 10 than on reel 18. Fig. 19 then represents the same condition as Fig. 18, i.e. that there is more tape wound around reel 10 than reel 18. Since more tape is around reel 10, one revolution of the reels will cause more tape to be fed by reel 10 than reel 18. Thus, the tape under reel 10 in Fig. 18, will enter the column 24 before the tape under reel 18 enters column 26. Fig. 19 illustrates the point at which the tape has entered column 24 stopping the flow of air in column 24. Even though the flow of air stops, there is a vacuum created in the column 24 which exerts a greater downward force on the tape and tends to pull all the tape from one column into the other. However, at the same time that the tape enters the column 24, a flapper valve (to be presently described) is actuated, operating a circuit for placing the pulleys 32 and 34 into the previously described stop position of Fig. 17 to prevent the tape from being pulled away from column 26. The low speed motor 114 continues to feed tape into both columns, and when the tape enters column 26, the flow of air in that column is stopped. When the head cover 136 comes down, the low speed motor 114 stops, the drive capstans 28 and 30 come out, and then the tape goes into normal backward, looking for load point, all in a manner to be described hereinafter.

As previously mentioned, flapper valves are provided to operate a circuit for preventing all the tape from entering one column. These flapper valves also act to indicate when the tape has entered a column, to indicate a break in the tape during normal operation and to provide for a limited flow of air for pulling the tape into the columns during a loading operation.

Figure 10:
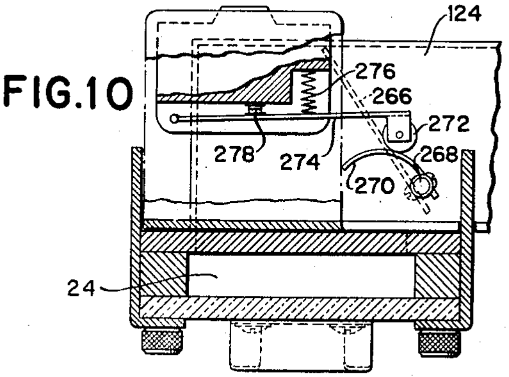
Fig. 10 is a plan view of a flapper valve within the header and used in connection with the vacuum columns of Figs. 6 and 7, wherein the flapper valve is shown in its closed position.

In Figs 6 and 10, a flapper 266 is shown fixed to a shaft 268 rotatably mounted within the header 124. The shaft 268 extends above the header 124 (Fig. 6) where a curved member 270 is affixed thereto. Curved member 270 cooperates with a roller 272 affixed to a contact arm 274 which is biased by a spring 276 so that roller 272 is held against curved member 270. On the arm 274 is one contact of left flapper contacts 278. When the tape is out of the columns 24 and the vacuum pump motor VPM is energized, column flapper 266 is pulled into position shown in Fig. 10 by the suction of the vacuum pump, with its free end against the rear of the header 124. In this position, the curved member 270 bears against the roller 272 of arm 278 closing the left flapper contacts 278 to indicate the existence of a vacuum and no tape in the column. In Fig. 6 it can be observed that there is a slight clearance between the top and bottom edges of the flapper 266 and the inside top and bottom surfaces of header 124. This permits the limited flow of air previously described as being utilized for pulling the tape into the column during loading.

Figure 11:
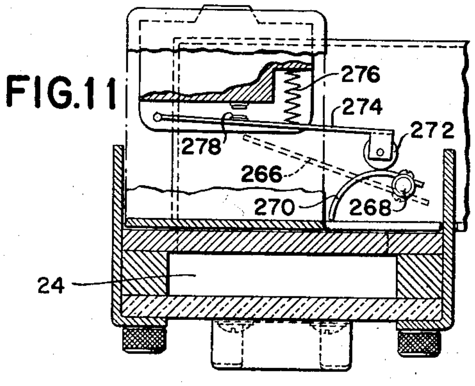
Fig. 11 is a view similar to that of Fig. 10 wherein the flapper valve is shown in its open position.

When the tape enters a column, the flow of air through the column is shut off creating a vacuum in the column, equalizing the pressure on both surfaces of the flapper 266. The force of the spring 276 against the arm 274 is now greater than that created by the vacuum pump motor VPM against the flapper 266, causing the arm 274 to be rotated counterclockwise. The roller 272 on the arm 274 therefore urges the curved member 270 counterclockwise rotating it to a position shown in Fig. 11 allowing the left flapper contacts 278 to open. Since the flapper 266 is on the same shaft 268 as the curved member 270, it too is rotated, counterclockwise to the position shown in Fig. 11.

Another flapper is located under the right column 26 having associated right flapper contacts 280 (not physically shown in the drawings) which act to indicate tape in the right column 26.

*Tape break*

It can be understood at this point, that if the tape should break while it being fed in a normal forward or backward operation, the tape will come out of the columns, which will cause the flapper to operate to close the flapper contacts 278 and 280. It will be shown hereinafter that the flapper contacts are in a circuit which is broken by the opening of the flapper contacts, to stop the feeding of tape and prevent tape from unreeling onto the floor.

During a rapid rewind operation, the tape is out of the columns and some other method must be used to detect a tape break. In Fig. 27, a block 282 carrying a lamp holder 284 is shown under the photocells in the tape cover. A tape break light 286 (shown schematically in Fig. 31A) is located within the lamp holder 284 so that its light rays are directed through an opening 288 (Fig. 27) onto the tape indicator point photocell 232, when the head cover 136 is in its raised position. If the tape breaks, the tape break light 286 will shine directly into tape indicator point photocell 232 to energize a tape break relay circuit which will stop the feeding of the tape.

*Raising the head cover*

The tape head 16 contains a read/write magnetic head unit 289 (Fig. 12) comprising seven parallel read/write magnetic heads which read from and write on the tape, in a manner to be presently described. The tape break light 286 is also contained within the tape head unit 16. The tape head unit 16 has a head cover 136 which is movable in a vertical path in the main plate 13 of the machine and which is under control of the low speed motor 114. The head cover 136 supports an erase head 290 (to be presently described) and the photosensing blocks 214 and 216.

Immediately to the rear of the tape head 16 and slightly thereabove are two apertures 291 and 292 (see particularly Figs. 20 to 22) through the face panel 13, axially aligned with two apertures 294 and 296, respectively, through the frame member 41, said apertures providing passage for two rearwardly projecting extensions 298 and 300 respectively from the head cover 136. The extensions 298 and 300 are fixed to a bracket 302 and an internally threaded block 304. The head cover 136 can thus be raised and lowered by moving the block 304 up and down. An externally threaded shaft 306 cooperates with the internal threads of block 304. The shaft 306 is rotatable, but is restrained axially by snap rings 308 and 310 which fix the shaft 306 in relation to the inner race of a ball bearing 312. The outer race of the ball bearing 312 rests on a shoulder of a housing 314, and the outer diameter of the outer race is staked to the housing 314 which in turn is fastened to the main plate 13. Since the housing 314 and bearing 312 are thus fixed, rotation of the shaft 306 will effect the raising and lowering of the block 304, and therefore the head cover 136 and the bracket 302.

Rotation of the shaft 306 is accomplished through a slip clutch 315 by a chain 316 which engages the teeth of a sprocket 318 on the shaft 306. The chain 316 also engages the teeth of a sprocket 320 on the shaft 106 (see Fig. 3) which has been previously described as being rotatable by the low speed motor 114. Thus, energization of the low speed motor 114 will cause shaft 106 to rotate, and via chain 316, will rotate shaft 306. A clockwise rotation of shaft 306 will raise, and a counterclockwise rotation of shaft 306 will lower the bracket 302 and head cover 136.

It is important to return the head cover 136 to the same relative position with respect to the read/write head unit 16 each time the head cover 136 is lowered. A bottom stop arm 322 is fixed to rotate with shaft 306. A stud 324 at one end of arm 322 is adjustably set so that said stud will contact the lower left rear surface of bracket 302 to stop the lowering of head cover 136 after a counterclockwise rotation of shaft 306. A stud 326 at one end of a top stop arm 328 is also fixed to rotate with shaft 306 so that stud 326 will contact the upper right rear surface of bracket 302 to stop the raising of head cover 136 after a clockwise rotation of shaft 306.

To give added accuracy to the positioning of the head cover 136, two studs 330 and 332 are fixed to the housing 314. Fastened to the studs 330 and 332 respectively, are the top ends of tension springs 334 and 336, the other ends of which are connected to the bracket 302. The bracket 302 and therefore the head cover 136 are thus urged upwardly so as to always ride directly in contact with the lower surface of the threads of the shaft 306.

To indicate the position of the head cover 136, a pair of switches are provided for operating electrical circuits to be described hereinafter. When the head cover 136 and the bracket 302 are raised, the upper left surface of the bracket 302 (Fig. 20) engages a projection 338 to effect a closing of the contacts of a normally open head cover up switch 340. When the head cover 136 is lowered, the lower left surface of the bracket 302 engages a projection 342 to effect an opening of the contacts of a normally closed head cover down switch 344.

*Retracting the drive capstans*

Figures 20, 21, 22:
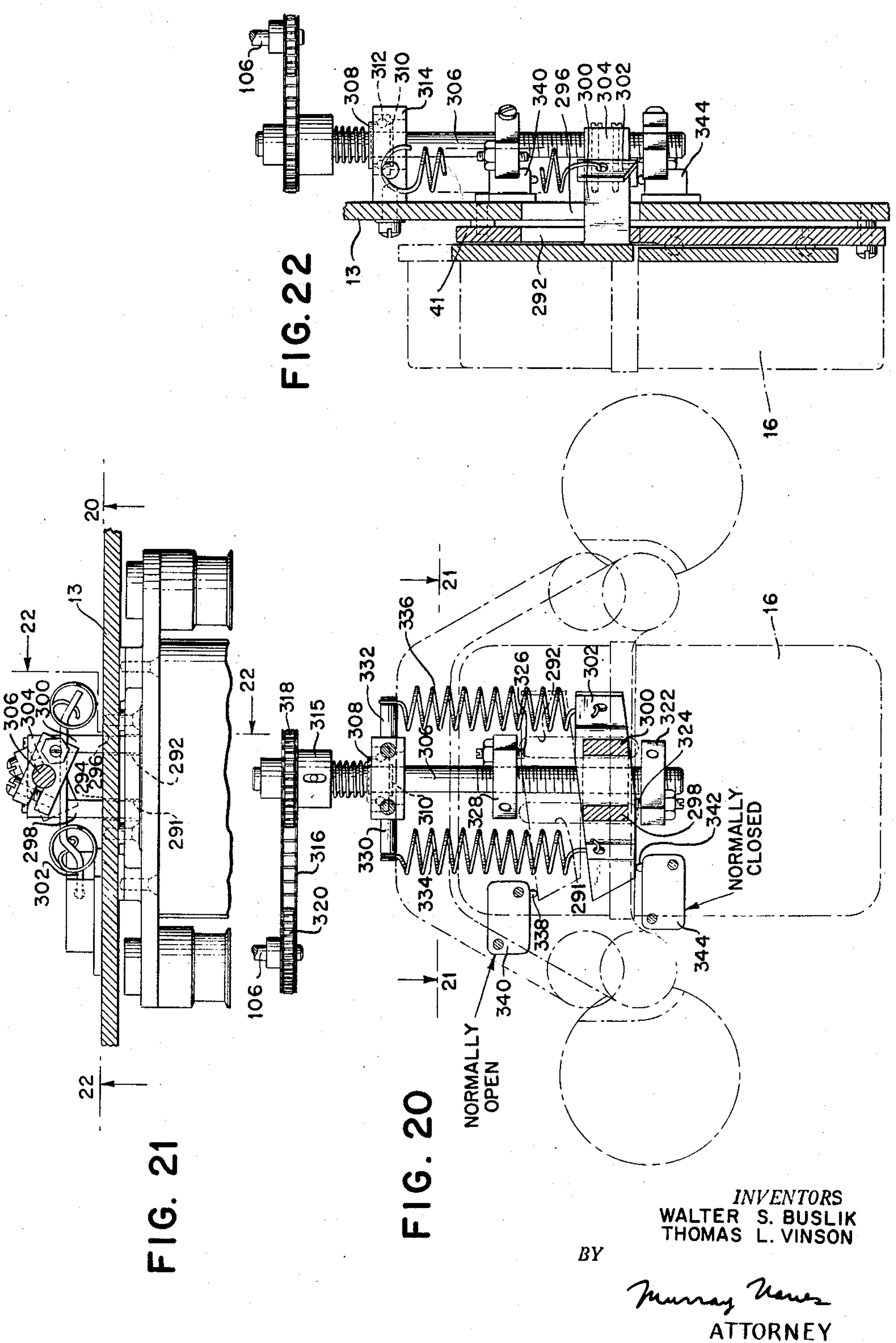
Fig. 20 is an elevational view taken on line 20—20 of Fig. 21 showing the mechanism for raising the head cover above the tape reading head whereby relative separation between the head in phantom and is covered in phantom is effected, with the cover shown in both its raised and lowered position.
Fig. 21 is a top view of the head cover raising mechanism on line 21—21 of Fig. 20.
Fig. 22 is a view on line 22—22 of Fig. 21.
Figures 23, 24, 25:
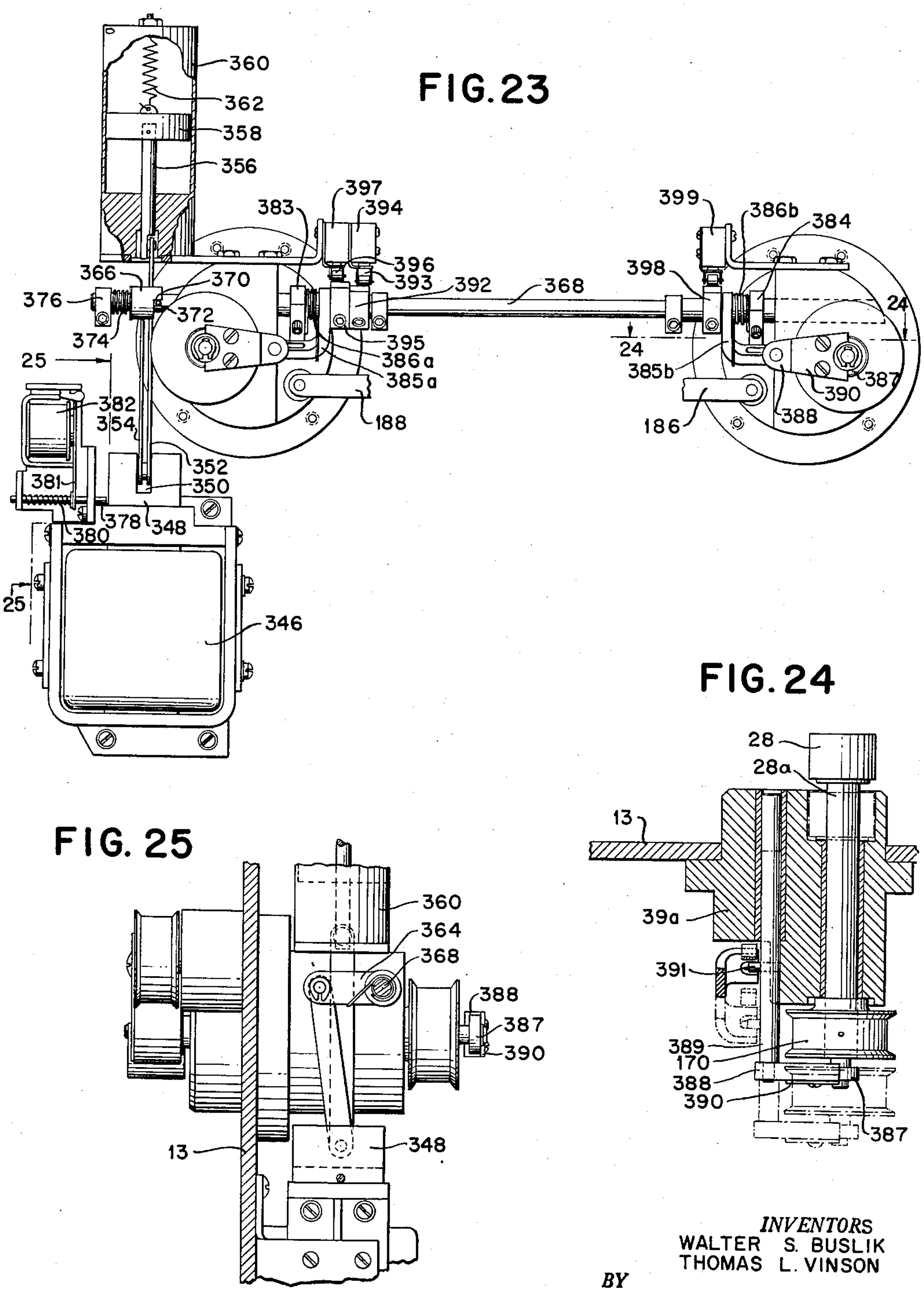
Fig. 23 is a rear elevational view of a mechanism for retracting the drive capstans during load, unload, and rapid rewind operations.
Fig. 24 is a sectional view on line 24—24 of Fig. 23.
Fig. 25 is a side elevational view on line 25—25 of Fig. 23.

Figs. 22, 23 and 24 of the drawings illustrate the structure of the capstan retracting mechanism. As will presently be described, to retract the drive capstans 28 and 30, a retract solenoid 346 (Fig. 23) must be energized. The retract solenoid 346 is fixed to the main plate 13 and it has a plunger 348 which is adapted to be drawn into the retract solenoid 346 when said solenoid is energized. Pivotally mounted within a slot 350 at the top of the plunger 348 are the ends of two links 352 and 354. The top end of link 352 is connected to piston rod 356 which is fastened to a piston 358 which in turn is mounted with the cylindrical unit 360. The piston 358 is urged upwardly by a spring 362 fastened to the top of the cylinder 360 and to the piston 358. The top end of link 354 is pivotally connected to one end of a short link 364, the other end of which is rigidly fixed to an overthrow coupling 366 loosely mounted on a shaft 368. A shoulder 370 on the coupling 366 is urged clockwise (Fig. 23) against a pin 372 on the shaft 367 by a spring 374 fastened to the coupling 366. The spring 374 has its other end fastened to a clamp 376 which is fixed to shaft 368.

Energizing retract solenoid 346 attracts the plunger 348 downwardly against the urging of spring 362 and the plunger 348 pulls link 354, rocking short lever 364 and coupling 366 counterclockwise. The action of the spring 374 causes the counterclockwise rotation of coupling 366 to effect a rotation of the clamp 376 and the shaft 368 to which the clamp 376 is fastened. It will presently be shown that a counterclockwise rocking of shaft 368 caused by the energization of retract solenoid 346 effects a retracting of the drive capstans. The overthrow coupling 366 is provided so that even if the drive capstans 28 and 30 are in the retracted position, the plunger 348 can be pulled down still further to a position where a latch 378 biased to the right (Fig. 23) by a spring 380 will latch the plunger 348 down. The latch 378 is fastened to the end of an armature arm 381 of a solenoid latch magnet 382. Energizing solenoid latch magnet 382 attracts armature arm 382 rocking it clockwise and moving latch 378 to the left. If retract solenoid 346 is deenergized, the spring 362 in the cylinder 360 will pull on link 352 and cause the unlatched plunger 348 to move upwardly. The upward movement of plunger 348 causes link 354 to be elevated thereby rocking short link 364 and coupling 366 clockwise (Fig. 25). The shoulder 370 of coupling 366 bears against pin 372 effecting a clockwise rotation of shaft 368 which as will be described presently, causes the return of the drive capstans 28 and 30 to their normally forward position.

Fastened to the shaft 368 are clamps 383 and 384 which bear against forked arms **385*a* and 385*b* respectively. Forked arms 385*a* and 385*b* are loosely mounted on shaft 368 and are held against clamps 383 and 384 respectively by springs 386*a* and 386*b* respectively. Movement of the forked arms 385*a* and 385*b* will move drive capstans 30 and 28 respectively in and out, but a description will be given of the forked arm 386 and capstan 28, which will serve as a description of the means for retracting both capstans. As previously described, the drive capstan 28 (Fig. 24), is fixed to the shaft 28*a* which is journalled for rotation in the cylinder 39*a* in the main plate 13 of the machine, and the shaft 28*a* extends through the rear cylinder 39*a* where its diameter is reduced. Affixed to the reduced diameter of shaft 28*a* is a ball bearing 387 which is partially enveloped by a forklike member 388 which is grooved at one end to accommodate the outer race of ball bearing 387. Member 388 is fixed at its other end to a shaft 389 which is slidably mounted in cylinder 39*a*. A plate member 390 is screwed to form members 388 and bears against the rear of ball bearing 387. The combination of the fork and plate members 388 and 390 permits the shaft 28*a* to rotate but can effect a movement of the shaft 28 in and out of the frame. Movement of fork member 388 towards the rear of the machine will cause the ball bearing 387 to move rearwardly, thereby retracting capstan 28. In moving forward, the plate member 390 bears against ball bearing 387 to move the capstan 28 forward. The shaft 389 carries a pin 391** (Fig. 24) which cooperates with the forked arm 385*b*. Energizing the retract solenoid 346 effects a rotation of shaft 368 clockwise (Fig. 23) which will cause the clamp 384 to act against forked arm 385*b* (Fig. 23) which in turn is moved rearwardly (down in Fig. 23). The forked arm 385*a* acts on pin 391 to move shaft 389 back, effecting a retracting of the capstan 28. At the same time, clamp 383 acts on forked arm 385*a* to retract capstan 30 in a similar manner.

A high dwell on a cam 392 fixed to shaft 368 will rotate to the position where it will bear against roller 393 of a capstan in switch 394 to indicate that the capstans are in.

The retract solenoid 346 remains energized only for a short while, so that if the latch magnet 382 is energized, to release plunger 378, the shaft 368 will be rotated counterclockwise (as previously described), turning the clamps 383 and 384 away from the forked arms 385*a* and 385*b* respectively. The springs 386*a* and 386*b* tend to make the forked arms 385*a* and 385*b* respectively rotate with the clamps 383 and 384 respectively to rotate shaft 368 and return the capstans 28 and 30 respectively to their normal forward position. The springs 386*a* and 386*b* act as an overtravel device which insures that both capstans 28 and 30 are returned to their maximum out position where they are properly aligned for feeding the tape, even though the plunger 348 has reached the limit of its upward travel.

Since the capstans 28 and 30 are not moved out by direct coupling, but rather depend on the action of the springs 386*a* and 386*b*, two separate switches are provided to indicate a capstan out condition. A high dwell on a cam 395 fixed to the forked arm 385*a* will rotate to the position where it will bear against roller 396 of a right capstan out switch 397, while a high dwell on a cam 398 affixed to forked arm 385*b* will operate a left capstan out switch 399.

*General relay circuit*

The tape feed machine is put in operation by closure of the line switch LS (Fig. 29) which supplies 208 volt A.C. transformers T (only digrammatically indicated) from which are derived the +48 volt power supply and the high voltage power supply. Most of the relays, such as those shown in Figs. 31A, 31B, and 31C are connected across the +48 volt power supply line, while the high voltage supply provides the various plate voltages, bias voltages, etc. required by the several electronic units. To insure that the high voltages in the power supply are built up to their operating values, a reset timer TMB (not physically shown) is energized by the 208 volt A.C. This reset timer operates in a manner similar to that described for reset timer TMA (Fig. 28) to provide a delay long enough to allow the high voltages to build up. At the end of the time delay, contacts TMB—1 (Fig. 31A) close to complete a circuit from +48 volts, through contacts TMB—1 to energize a power on relay R17. The appearance of voltage on the +48 volt line also causes a photolight relay R14 (Fig. 31A) to be energized through normally closed unload relay contacts R22—1, normally closed rewind status relay contacts R35—4, normally closed load-rewind relay contacts R3—AU, the load point light 228, and the tape indicator light 230. The number or letters following the dash (—) after a relay designation (such as R22—1) and (R3—AU) is a reference to one of the sets of contacts of the particular relay R22 and R3 respectively.

The tape break light 286 is connected between the blade of the unload relay contacts R22—1 and the blade of the load-rewind relay contacts R3—AU. During an unload operation, unload relay contacts R22—1 open to activate the tape break light 286 by removing the short circuit from across the tape break light 286. During a load-rewind operation, load-rewind relay contacts R3—AU transfer, to activate the tape break light 286 by removing the short circuit from across it. At the same time, the transfer of load-rewind relay contacts R3—AU deactivates the load point light 228 and tape indicator light 230 by shunting the two lights with a 33 ohm resistor which is an effective short. The 33 ohm resistor is used instead of a no resistance circuit to keep just enough current going through the lights to allow them to come on rapidly when the shunt is removed.

The appearance of +48 volts also causes a vacuum pump motor relay HD4 (Fig. 31A) to be picked up through normally closed contacts unload stop relay contacts R26P—1. With relay HD4 energized, its normally open contacts HD4—1 (Fig. 29) are closed, energizing the vacuum pump motor 126. When the vacuum pump motor 126 comes up to speed, the bellows 128 (Fig. 7) collapse, closing vacuum supply switch contacts 130, as previously described. Assuming for the purpose of description, that the machine is being started with the tape already in the columns, thus forming an air seal between the upper and lower vacuum switches, the operation of the vacuum pump motor 126 will create a vacuum in the columns, and open the left flapper contacts 278 (Figs. 6 and 10) and the right flapper contacts 280, as previously described. In Fig. 31A, it can be observed that the opening of left flapper contacts 278 prevents the energization of a left column relay R9 by opening a circuit from the +48 volts, via contacts 278, relay R9, to ground. When right flapper contacts 280 open, right column relay R10 is prevented from being energized.

A circuit is now completed to energize run relays R1 and R18 from the +48 volts, through the now closed vacuum supply switch 130, the normally closed left column switch contacts R9—AL, normally closed right column switch contacts R10—AL, now closed photolight contacts R14—AL, now closed power on contacts R17—1, normally closed tape break relay contacts R41P—1, and run relays R1 and R18 in parallel, to ground.

When the run relay R—1 is energized, its associated point R1—AL closes, completing a circuit for energizing a relay HD1, from +48 volts via run relay contacts R1—AL and motors relay HD1. Energization of the motors relay HD1 causes its HD1—1 contacts (Fig. 29) to close. It can be observed from Fig. 29 that closure of motors relay contacts HD1—1 closes a circuit to energize the forward and backward motors 22 and 23 which rotate continuously during normal operation as previously described.

In the position assumed for the purpose of description (i.e. with the tape in the columns), the drive capstans 28 and 30 are out and the head cover 136 is down. Referring again to Fig. 31A, since the drive capstans are out, capstan in switch 394 is open as previously described in regard to Fig. 23, and a circuit is not completed to energize a capstan in relay R7 from +48 volts via switch 394 and relay R7 to ground. Since the head cover 136 is down, the head not down switch 344 opens as previously described, in regard to Fig. 20. A head not down relay R8 (Fig. 31A) is in a circuit from the +48 volt line via the parallel combination of the head not down switch 344, the normally open left column relay contacts R9—BU and normally open right column relay contacts R10—BU, in series with the head not down relay R8, to ground. Since contacts R9—BU, contacts R10—BU and head not down switch 344 are open, the application of +48 volts will not energize the head not down relay R8. The capstan motor relay DP2 (Fig. 31A) is thus energized by a circuit from +48 volts normally closed head not down relay contacts R8—AU (Fig. 31A), through lead 400, via relay DP2 to ground. Head not down relay contacts R8—AU are closed because relay R8 has remained unenergized. Energization of capstan motor relay DP2 closes the DP2—1 contacts in Fig. 29 to complete a circuit for energizing capstan motor 164 from the upper line of the 208 volt A.C. line via the now closed motor relay contacts HD1—1, the capstan motor relay contacts DP2—1, and capstan motor 164, to the lower 208 volt A.C. line.

Figure 29:
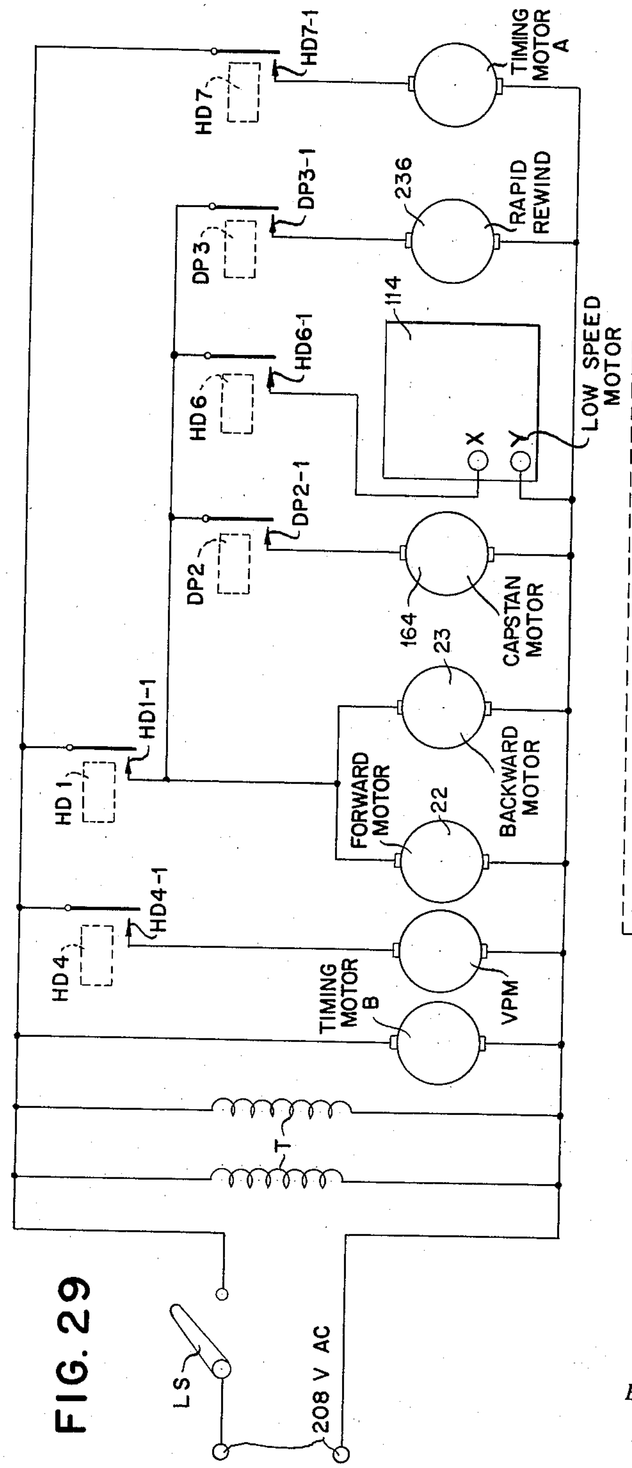
Fig. 29 is a diagram of the motor control and power supply circuit.

Thus, it has been shown that closing the line switch LS in Fig. 29 with the tape in the columns, will start the vacuum pump motor 126, the forward and backward motors 23 and 22, and the capstan motor 164.

*Block diagrams*

Referring generally to Figs. 32, 34A, 34B and 34C of the drawings, it will be seen that the different elements comprising the circuit of the invention are represented by blocks, whose contents are illustrated in other figures of the drawings, the inputs and outputs only being indicated in Figs. 32, 34A, 34B and 34C.

Before proceeding with a description of the tape drive circuitry, a detailed description of the related elements such as the trigger, single shot multivibrator, AND circuits, OR circuits, cathode followers, grounded grid amplifiers and inverters will be given. The contents of the relative blocks and the relative block representations are shown in Figs. 42 to 58 inclusive.

Wherever shown, unless otherwise indicated in the drawings, the values of the various resistors, condensers, and inductances are in thousands of ohms, micro-micro-farads and microhenrys respectively. For example, a resistor labeled 200 indicates a 200K (200,000) ohm resistor; a condenser labeled 100 indicates a 100 micro-microfarad condenser; and an inductance labeled 750 indicates a 750 microhenry inductance.

The terms "positive" and "negative" potentials used in the discussion of the circuit refer to relative values rather than values with respect to ground.

*Trigger*

Referring to Fig. 42 the detail of an electronic trigger is shown, designated T–1 which is commonly known as the Eccles-Jordan type trigger. It comprises two cross-coupled triodes (which may be included in one envelope, such as, for example, a type 6211 tube) in which a plate P1 of a left-hand triode is coupled by means of an 82K ohm resistor in series with a 150 ohm resistor, to the grid G2 of a right-hand triode, and plate P2 of the right-hand triode is likewise coupled to the grid G1 of the left-hand triode by an 82K ohm resistor in series with a 150 ohm resistor, each of these 82K ohm resistors being shunted by a 15 micro-microfarad condenser, as shown. Grid G1 is connected via the 150 ohm resistor in series with a 62K ohm resistor and a 47K ohm resistor to a source of −130 volts. An input terminal "5" is connected to the junction of the 62K ohm resistor and the 47K ohm resistor. Grid G2 is connected by identical circuitry to an input terminal "4". An input terminal "6" is connected to the anode of a diode D1, the cathode of which is connected to the junction of the 150 ohm resistor and the 62K ohm resistor in the circuit of grid G1. Grid G2 is connected by identical circuitry via a diode D2 to an input terminal "3". Plate P1 is connected to a +140 volt supply via a 750 microhenry inductance in series with a 3.9K ohm resistor. Plate P1 is connected via a 390K ohm resistor in series with a 470K ohm resistor to a source of −130 volts. The 390K ohm resistor is shunted by an 8.2 micro-microfarad condenser. An output terminal "2" is connected to the junction of the 390K ohm and 470K ohm resistors. An output terminal "1" is connected directly to the plate P1. Plate P2 is connected by identical circuitry to output terminals "7" and "8". The cathodes of K1 and K2 are commonly connected and grounded.

As is now well-known in the art, the trigger described has two conditions of stability. When the left-hand triode of the trigger is conducting, the voltage at plate P1, with the circuit values indicated, is lowered from approximately +125 volts to approximately +55 volts, which, through the coupling previously described, maintains the grid G2 relatively negative, so that the right-hand triode is blocked when the left-hand triode conducts. Thus, if the left-hand triode is conducting, then plate P1 and its corresponding output are negative, and plate P2 and its corresponding output are positive. This comprises one state of stability of the trigger and will hereinafter be designated as the On condition. In a similar manner, if the right-hand triode is conducting, the reduction in voltage on the plate P2 is applied by the coupling connection, previously described, to the grid G1, to thus block the left-hand triode so that plate P1 and its corresponding left-hand output now becomes positive and this condition will hereinafter be designated as the Off condition.

If for example, the right-hand triode is conducting, (trigger Off) a negative applied to its grid G2 via input terminal "3" will flip the trigger On, by blocking the right-hand triode and thus render the left-hand side conductive. Likewise, if the left-hand triode is conducting, (trigger On) a negative voltage applied to its grid G1, via input terminal "6", for example, blocks the left-hand side of the tube thus flipping the trigger Off. The above two methods are normally used for flipping the triggers On and Off.

Another method known as "plate pullover" may be employed to flip a trigger On. This consists of applying a −70 volt pulse, directly to the plate P1 of a trigger. Since plate P1 is coupled to grid G2, this acts to apply a negative pulse to G2 and thus render the right-hand triode non-conducting thus flipping the trigger On.

In the operation of the invention, it is required that some of the triggers be reset On and others reset Off, before the start of an operation. To reset a trigger On, a sufficiently positive voltage is applied to grid G1 to cause the left-hand side of the 6211 tube to conduct. By applying a positive voltage conductively through terminal "5" or "4" and through the corresponding resistor to one of the grids, the trigger will be flipped. In triggers which are to be reset On, a positive pulse is applied to terminal "4". In triggers, which are to be reset Off, it is the terminal "5" which is made positive.

*Single shot multivibrator*

A single shot multivibrator resembles a trigger circuit in that it may be flipped into a certain state, but it differs in that it then returns to its previous state after a predetermined time without being pulsed from an external source. Its normal state may be referred to as its stable state, and its abnormal state may be referred to as its quasi-stable state, for it remains stable in its quasi-stable state until its predetermined time period has elapsed. In the stable state the left triode is cut off, and the right triode is conducting heavily. The most common method for firing a single shot multivibrator is plate pull-over. When using plate pull-over, the left plate of the single shot multivibrator is connected to the plate of a pull-over inverter, the load resistors for the left plate also acting as the load resistors for the pull-over inverter. The duration of the single shot multivibrator output pulse is largely dependent upon the discharging of a capacitor connected between the +140 volts supply and the right grid through a resistance. The resistance and capacitor may be varied to determine the duration of the pulse, and therefore they are referred to as the timing resistor and the timing capacitor. The larger the timing resistor and capacitor the more time is required for the right grid voltage to rise.

Fig. 43 is the detailed circuit diagram of a single shot multivibrator, the block symbol of which is SS–20, and which may utilize the two triodes of a 6211 type tube. Plate P2 of the right-hand triode is coupled by means of a 220K ohm resistor in series with a 150 ohm resistor to the grid G1 of the left-hand triode; the 220K ohm resistor being shunted by a 15 micro-microfarad condenser. Grid G1 is connected via the 150 ohm resistor in series with a 270K ohm resistor to −130 volts. Plate P1 which is connected to a +140 volt supply via a 750 microhenry inductance in series with a 3.9K ohm and a 4.3K ohm resistor. Plate P1 is connected via a 390K ohm resistor in series with a 430K ohm resistor a source of −130 volts. The 390K ohm resistor is shunted by an 8.2 microfarad condenser. An output terminal "2" is connected to the junction of the 390K ohm and 430K ohm resistors. An output terminal "1" is connected directly to the plate P1. Plate P2 is connected to +140 volts via a 5.1K ohm and a 15K ohm resistor. The junction of these resistors is connected through a 430K ohm resistor shunted by a 10 micro-microfarad condenser, both in series with a 470K ohm resistor to −130 volts. An output terminal "8" is connected to the junction of the 430K ohm and the 470K ohm resistors as shown. Grid G2 of the right-hand triode is connected via a 150 ohm resistor to an input terminal "3" which is connected via a 47 micro-microfarad condenser to the junction of the 4.3K ohm and 3.9K ohm resistors in the plate circuit of the left-hand triode. The timing condenser and resistor have the values 0.02 microfarad and 2.2 megohms respectively and are connected in parallel between the +140 volt supply and input terminal "3." The value of the timing condenser and resistor of an SS–20 is chosen to produce an output pulse of 20 milliseconds duration.

*AND circuits*

An AND circuit requires a coincidence of two inputs to obtain one output. This invention makes use of positive AND circuits which act to produce a positive output signal, only upon a coincidence of two positive inputs. When the anodes of two diodes have a common anode resistor the combined circuits can be an AND circuit as shown in Figs. 44 and 45.

AND circuit &–1 (Fig. 44) comprises three diodes, the anodes of which are commonly connected through a one megohm resistor to a source of +140 volts. The cathodes are connected to input terminals "4," "5" and "6," and the commonly connected anodes are connected to an output terminal "7." All cathodes must go positive in order to cut off the diodes and obtain a positive output. Where only two diodes are used, the two cathodes must go positive to obtain an output.

With all cathodes at +140 volts, there is no conduction in the diodes and the anodes are at the same potential as the +140 volt supply, which means there is a positive output. The value of the anode resistor is high in comparison with the resistance of the conducting diodes. Therefore, if any or all of the cathodes are negative, allowing conduction, the voltage drop across the diodes is small compared to that across the anode resistance and the anodes fall effectively to the voltage at the negative cathode, and the output at the anodes will be negative. Thus only if all cathodes are positive will the output be positive.

AND circuit &–2 (Fig. 45) is similar to AND circuit &–1, except that the resistor in the anode circuit is 180K ohms instead of 1 megohm.

*OR circuits*

An OR circuit is used where there are two or more inputs which must be isolated from each other but which must operate in such a way that any one or more than one input will produce an output.

The OR circuit shown in Fig. 46 is the type in which either or both inputs must go positive in order to obtain a positive output. This OR circuit is an OR–1 type and comprises two diodes using a common cathode resistor of one megohm tied to a −130 volt supply. An output terminal "7" is tied to the cathode. An input terminal "4" is tied to one of the anodes and an input terminal "6" is tied to the other anode.

When the cathodes of two diodes, the anodes of which are normally held at the same potential as the cathodes, have a common cathode resistor, the combined circuit can be an OR circuit. With both anodes at −130 volts, there is no conduction in the diodes and the cathodes are at the same potential as the −130 volt supply. The value of the cathode resistor is chosen so that it is high in comparison with the resistance of the conducting diodes. Therefore, if either or both anodes go positive, causing conduction, the voltage drop across the diodes is small compared to that across the cathode resistance and the cathodes rise effectively to the voltage at the positive anode, creating a positive shift at output terminal "7".

*Cathode followers*

Referring to Figs. 47 to 50 inclusive, there are illustrated therein types of cathode followers whose block symbols are labeled CF–1, CF–2, CF–3 and CF–5, respectively.

Cathode followers CF–1, CF–2, and CF–3 comprise single triodes which may actually be one of the triodes only, of a dual triode 5965, 5687 or 6211 depending on current carrying considerations. Cathode follower CF–5 comprises two sets of dual triode 5687 type tubes.

A cathode follower may be defined as a vacuum tube circuit in which the input signal is applied to the control grid, but the output, instead of being taken from the plate, is taken from between the cathode and the cathode load circuit, which may comprise its own resistor or a resistor in another circuit for example. The cathode follower has a high input impedance but a low output impedance and is capable of producing a power gain, without a voltage inversion.

The grid of cathode follower CF–1 (Fig. 47) is connected through a 150 ohm resistor to an input terminal "5". The plate is connected directly to a source of +140 volts, while the cathode is connected via a 10K ohm resistor to a −160 volt supply. An output terminal "4" is connected directly to the cathode.

Cathode follower CF–2 (Fig. 48) is similar to cathode follower CF–1 except that its grid is connected via a 150 ohm and a 5.1K ohm resistor to a junction which is connected to an integrating circuit comprised of a 130K ohm resistor connected to an input terminal "5" and a condenser connected from the junction to ground. A −60 volt supply is connected via two 300K ohm resistors to ground. The junction of the two 300K ohm resistors is coupled to the junction of the 5.1K ohm resistor and the integrating circuit.

Cathode follower CF–3 (Fig. 49) has its plate connected to +150 volts and its grid connected via a 150 ohm resistor to an input terminal "5." The cathode is connected to an output terminal "4" which may then be connected to a cathode resistor of another unit which then acts as the common cathode resistor.

Cathode follower CF–5 (Fig. 50) comprises four triodes in parallel, the grids of which are commonly connected through a 150 ohm resistor to an input terminal "5". The cathodes are commonly connected to an output terminal "4" in the plates, and the plates are jointly coupled to a +140 supply. This cathode follower has four triodes connected in parallel to provide increased current carrying capacity.

*Inverters*

Inverter circuits, designated I–1 to I–7, are illustrated respectively in Figs. 51 to 57 inclusive. The function of an inverter is to take a positive voltage supplied to its input terminal and produce a negative voltage at its output terminal. Conversely negative inputs produce positive outputs.

Inverters I–1 to I–3 comprise one-half of the dual triode Type 5695 tube, and inverters I–6 and I–7 comprise one-half of a dual triode Type 5687 tube. Inverters I–4 and I–5 employ both halves of the dual triode 5687 tube.

In inverters I–1 (Fig. 51), the grid is coupled via a 150 ohm resistor in series with a 22K ohm resistor, shunted by a 47 micro-microfarad condenser to an input terminal "5". The cathode is connected to ground as shown. The plate is connected to +140 volt power supply through a 15K ohm resistor in series with a 430K ohm resistor to a −130 volt power supply. The 390K ohm resistor is shunted by a 15 micro-microfarad condenser. An output terminal "6" is connected to the plate, while a tapped output terminal "7" is connected to the junction of the 390K ohm resistor and the 430K ohm resistor.

In inverter I–2 (Fig. 52) the grid is connected via a 0.05 microfarad condenser to an input terminal "5" and via a 470K ohm resistor to ground. The connections to the plate and cathode of I–2 are the same as that of I–1 except that there is no 15 micro-microfarad condenser across the 390K ohm resistor and there is a 100 micro-microfarad condenser across the 430K ohm resistor.

Inverter I–3 (Fig. 53) is the same as inverter I–1, except that it has no connections to the plate other than output terminal "6". This inverter has its plate connected in the circuit in such a manner that it received its plate voltage from other units in the circuit.

In inverter I–4 (Fig. 54), the common grids of the two 5687 tubes are connected via a 0.1 microfarad condenser to an input terminal "5". A −270 volt source is applied to one end of a 220K ohm resistor connected at its other end to a 330K ohm resistor which in turn is connected to ground. The junction of the 220K ohm resistor and the 330K ohm resistor is connected to the common grids. The cathodes are commonly connected to a source of −130 volts and the plates are commonly connected to an output terminal "6". The triodes are thus effectively connected in parallel to provide for increased current carrying capacity.

Inverter I–5 (Fig. 55) has an input terminal "5" which is coupled to the grid of the commonly connected 5687 triodes through a 150 ohm resistor. The cathodes are commonly connected to ground and the plates which are connected to an output terminal "6" are also coupled via a 900 ohm resistor to a terminal "7". The positive voltage supply for the plate of this unit is provided from some other part of the circuit.

Inverter I–6 (Fig. 56) has its grid connected directly to an input terminal "5", its plate connected directly to an output terminal "6", and its cathode connected directly to ground. It too receives its positive power from other parts of the circuit.

Inverter I–7 (Fig. 57) is similar to I–3 except that its grid is connected directly to input terminal "5".

*Grounded grid amplifier*

A grounded grid amplifier is used when it is desired to amplify an input signal without changing its sign.

Grounded grid amplifier GA–1 is shown in Fig. 58 and comprises two 5965 type triodes. The cathodes K1 and K2 of the triodes are commonly connected via a 4.3K ohm and a 4.7K ohm resistor in series with a 3.0K ohm resistor to a source of −130 volts. Grid G1 of the left-hand triode is connected via a 150 ohm resistor to an input terminal "5". The grid G2 of the right-hand triode is connected to the junction of a 1.5K ohm and a 30K ohm resistor. The 1.5K ohm resistor is connected to ground and the 30K ohm resistor is coupled to a source of −60 volts. Plate P1 is connected directly to +140 volts and plate P2 is connected via a 1.5K ohm resistor, a 750 microhenry inductance, a 4.7K ohm resistor, and a 4.3K ohm resistor, to +140 volts. The junction of the 500 microhenry inductance and the 1.5K ohm resistor is connected, via a 390K ohm resistor shunted by a 8.2 micro-microfarad condenser, in series with a 430K ohm resistor to a source of −130 volts. The junction of the 390K ohm resistor and the 430K ohm resistor is connected to an output terminal "7".

The grounded grid amplifier is designed so that a positive shift applied to its input terminal "5" is amplified and appears as a larger positive shift at the output terminal "7".

While specific tube types and values of resistors, condensers, and inductances have been defined in connection with the trigger, single shot multivibrator, AND circuits, OR circuit, cathode followers, inverters and grounded grid amplifiers, these are to be taken as exemplary only, and the tube type and values may be varied in accordance with the knowledge of those skilled in the art, without departing from the spirit of the invention.

*Forward and backward circuits*

As previously described in relation to Figs. 12 to 17, energizing the forward control magnet 196a and the backward control magnet 196b places the machine in a forward and backward status, respectively, and if the circuit in which both magnets are in is opened, the machine is in a neutral status. The circuit for controlling the forward control magnet 196a and backward control magnet 196b is shown in Fig. 32.

Closing of the backward relay contacts R33—2, in a manner to be presently described, places the +48 volt supply on the grid of a CF–2 type cathode follower 404, the output of which goes positive and is transmitted to one input of an OR–1 type OR circuit 406. When any of the inputs of an OR circuit goes positive, the output also goes positive, and this positive voltage is applied to the input of a CF–1 type cathode follower 408, the output of which goes positive, causing the voltage on the grid of an I–6 type inverter 410 to go up. With the grid of the inverter 410 up, the inverter conducts through the backward control magnet 196b, and the normally closed neutral status relay contacts R13—1. This will condition the tape moving idler pulley 32 for driving engagement with the backward drive capstan 28.

Opening backward relay contacts R33—2 removes the +48 volt supply from the grid of cathode follower 404 causing, by way of OR circuit 406 and cathode follower 408, a negative shift on the grid of the inverter 410, which stops conducting. At the same time, the voltage at the tapped output terminal "7" of inverter 410 goes up, and this positive voltage is applied to the grid of an I–7 type inverter 412 which conducts through the forward control magnet 196a and the normally closed neutral status relay contacts R13—1. This will condition the tape moving idler pulley 34 for driving engagement with the forward drive capstan 30.

Since the normally closed neutral status relay contacts R13—1 are in a circuit which energizes both the forward and backward control magnets 196a and 196b, both magnets can be deenergized, to put the machine in a neutral status as in Figs. 16 and 17 by opening neutral status relay contacts R13—1.

To accomplish this, a path is completed through relay R—13 (Fig. 32) from the +48 volt supply through either load-rewind relay contacts R3—BU or R11—BU to ground. As will presently be described, load rewind relay R3 is energized to close contacts R3—BU only during a load-rewind operation, and unload relay R11 is energized to close contacts R11—BU only during an unload operation.

A three position manual switch 414 is shown in Fig. 32, which permits manual control of the forward and backward operations. If it is desired to feed tape forward from the file reel 10 to the machine reel 18, the manual switch 414 is pushed counterclockwise. If backward feed from the machine reel 18 to file reel 10 is required, the manual switch 414 is pushed clockwise, and the tape can be stopped by placing the switch 414 in its center position. Rotating the manual switch 414 counterclockwise energizes a drive relay R34 by completing a circuit from the +48 volts through the now closed run contacts R18—2, normally closed load-rewind relay contacts R31—2, the normally closed side of rewind status relay contacts R35—2, the closed manual switch 414, and drive relay R34 to ground. Contacts R18—2 were closed when run relay R18 was energized at the start of operation, as previously described. Energizing drive relay R34 has no effect on backward relay contacts R33—2 so they remain open. With drive relay R34 energized and neutral status relay R13 unenergized the machine is placed in the forward status. Actual tape feeding in the forward direction is started by the closing of the forward relay contacts R34—1 (Fig. 34C) in a manner to be presently described.

Manually rotating the manual switch 414 clockwise, energizes a backward relay R33 (Fig. 32) by completing a circuit similar to that which energized R34 through the new clockwise manual switch 414 and backward relay R33. Energizing relay R33, closes backward relay contacts R33—2 which puts the machine in a backward status, as previously described, and also closes backward relay contacts R33—1 to energize the drive relay R34 by completing a circuit from the +48 volts through contacts R33—1 through the drive relay R34 to ground. Energizing drive relay R34 closes previously mentioned drive relay contacts R34—1 (Fig. 34C) to start actual tape feeding in a backward direction, as will presently be described.

*Drive-stop circuit*

As previously described, in relation to Figs. 12 to 17, current passing through moving coil 200, in one direction, puts the machine in a drive status, and current in the other direction, puts the machine in the stop status. The circuit for controlling the reversals of current through the moving coil 200 is shown in Figs. 34A, 34B and 34C. The voltage condition on the output terminal "4" of a CF–1 type drive-stop cathode follower 420 (Fig. 34C) acts to select the direction of current through moving coil 200. The output terminal of drive-stop cathode follower 420 is connected via a drive lead 422, and a lead 426 to an I–3 type inverter 428, and cathode follower 420 is also connected via drive lead 422, and a lead 430 to an I–1 type inverter 432. When the voltage at the output of the cathode follower 420 is negative, the inverters 428 and 432 go non-conductive, swinging their outputs positive. This positive swing of inverter 428 renders a CF–5 type cathode follower 434 conductive, and the positive swing of inverter 432 renders an I–4 type inverter 436 and I–5 type inverter 438 conductive. A surge of current passes through the path formed by inverters 436 and 438 in parallel, moving coil 200, and cathode follower 434. This surge attracts the moving coil 200 toward the permanent magnet 202, thereby delivering a downward thrust to the rod 208 which projects the moving idler pulleys 32 and 34 into a stop status. Inverter 436 has a condenser input (see Fig. 54) which differentiates the positive input voltage so that eventually inverter 436 returns to its non-conductive state. A smaller amount of current then flows through the moving coil 200, but this smaller amount is sufficient to keep the moving coil 200 energized so that the machine remains in a stop status. The initial surge through inverter 436 is used only to give a rapid starting action to the tape drive linkage.

The output terminal "4" of drive-stop cathode follower 420 is also connected via drive lead 422, and a lead 440 to an I–1 type inverter 442, the output of which is connected to a CF–1 type cathode follower 444. The output of the cathode follower 444 is connected to a circuit, similar to that described for placing the machine in the stop status, except that since the voltage at the output of drive-stop cathode follower 420 is inverted by inverter 442, the voltage at the output of cathode follower 444 will cause current to pass through the moving coil 200 in a direction opposite to that for stopping the tape, and place the machine in a drive status at a time when the voltage at the output of the drive-stop cathode follower 420 is positive. This rapid drive action is obtained because cathode follower 444 controls inverters 446 and 448 to force a surge of current through inverters 450 and 452 in parallel, the moving coil 200, and a cathode follower 454. Thereafter, the discharge of the condenser in the input circuit of inverter 450 limits the current passing through the moving coil 200 in a manner similar to the operation of inverter 436.

The drive-stop cathode follower 420 may be controlled by the load point photocell circuit, a relay contact network, and signals from the control circuit of a data processing machine, all as illustrated in Figs. 34A, 34B and 34C.

The drive relay contacts R34—1 have been previously described as closed whenever the manual switch 414 in Fig. 32 is in either the forward or the backward position. In Fig. 34C, the closing of drive relay contacts R34—1 completes a circuit from +48 volts, through drive relay contacts R34—1 to the input terminal of a CF–2 type cathode follower 456. The output terminal of cathode follower 456 thus goes positive, and this positive shift is applied to the input terminal "4" of an &–2 type AND circuit 458, the input terminal "6" of which is connected to a not arriving at load point line 460 which is normally positive as will be more fully described hereinafter. The output terminal of AND circuit 458 thus shifts positive, and this positive potential is fed via a a lead 462 to input terminal "6" of an OR–1 type OR circuit 464, creating a positive shift at its output terminal "7." The positive shift at output terminal "7" of OR circuit 464 is fed to the input terminal "5" of the drive-stop cathode follower 420, shifting its output at drive lead 422 positive and causing the machine to go into the drive status as hereinbefore described.

The operation of the drive-stop circuits by the other relay contacts of Fig. 34C will be described hereinafter in conjunction with the unload and load-rewind operations.

As previously mentioned the subject tape feeding machine may be an adjunct to a data processing machine Figs. 34A, 34B and 34C indicate circuitry utilized by the tape feeding unit so that it may be controlled from the control unit of a data processing machine. Lines connected to terminal hubs on the left side of Figs. 34A, 34B and 34C represent inputs to the tape feeding unit from the data processing machine control unit, and lines connected to terminal hubs on the right side represent outputs developed or modified in the tape feeding machine, and for use by the data processing machine.

When the operator is ready to operate the tape feeding machine under control of the data processing machine, the start button ST (Figs. 1 and 31B) is actuated, completing a circuit (Fig. 31B) from the +48 volt line via the start button ST, the normally closed reset relay contacts R30—1, the normally closed unload relay contacts R21—1, and the start relay R20 to ground. The energization of start relay R20, effects the closing of start relay contacts R20—1 to short out the start button ST and act as a holding circuit for start relay R20. The closing of start relay contacts R20—2 (Fig. 34A) completes a circuit from +48 volts via the normally closed contacts of rewind status relay contacts R36—1, the now closed run relay contacts R18—3, the now closed start relay contacts R20—2, to the input of a CF–2 type cathode follower 466. The +48 volt positive shift at the input of cathode follower 466 appears, at its output, as a positive shift which is applied to the line 468 as an indication that the tape drive unit is mechanically ready. The closing of start relay contacts R20—4 (Fig. 34A) completes a circuit for energizing a ready light 469 from +48 volts via the normally closed rewind status relay contacts R36—4, the now closed run relay contacts R18—4, the now closed start relay contacts R20—4, the ready light 469 to ground. The ready light 469 is on the front panel of the tape feed unit (see Fig. 1). The positive shift on the ready line 468 is applied to input terminal "6" of an &–1 type AND circuit 470. Input terminal "5" of AND circuit 470 is connected to the not arriving at load point line 460 which is positive except during the twenty milliseconds that the tape is arriving at load point, the significance of which will be described hereinafter. The input terminal "4" of AND circuit 470 is connected to a select line which goes positive when the particular tape feed unit is selected as will now be described. The tape feed machine being described may be only one of a group of tape machines used in conjunction with the data processing machine. A select switch 472 is provided for each unit and allows for the connection of ten tape feed machines to the data processing machine control circuit. A manual switch arm 474 may be made to any ten contact points, each of which is connected to a different input terminal, numbered from 0 to 9. In Fig. 34A, the switch arm 474 is set to a contact which is connected to select switch terminal 0. The data processing machine may select the subject tape feed machine by applying a positive voltage to select switch terminal 0. This positive voltage is transmitted through a GA–1 type grounded grid amplifier 476 and a CF–1 type cathode follower 478 to a select line 480. The positive potential on the select line 480 is applied to input terminal "4" of the AND circuit 470. The coincidence of the positive signals on the three inputs of AND circuit 470 create a positive output, indicative of select, ready and not arriving at load point. This positive signal is transmitted through grounded grid amplifier 482 and cathode follower 484 to a line 486 which is known as the select and ready line. The positive signal on select lead 480 is also fed to the grid of an I–7 type inverter 487, causing it to conduct through a 900 ohm resistor and a select light 488 which can be observed on the front panel of the tape feed unit (see Fig. 1).

*Load point circuits*

When the tape is rewinding, it will stop when the load point aluminum strip 212 is sensed by the load point photocell 226. Load point photocell 226 (Fig. 34B) which, as hereinbefore described, may be considered a variable resistance device, has its anode connected to a 240K ohm resistor 489, and its cathode connected to ground. Photocell 226 and resistor 489, in series, are connected in parallel with a 150K ohm resistor 490 and the parallel combination is connected via a 150K ohm resistor 492 to +140 volts. The arrival of the load point aluminum strip 212 under photocell 226 will increase the light intensity and decrease the resistance of the photocell 226, as previously mentioned. A decreased resistance results in decreased positive voltage across the photocell 226, and this negative shift is applied from the anode of the photocell to the input terminal of an I–2 type inverter 494 producing a positive potential on its output terminal. This positive potential is fed to an I–3 type inverter 496 where it is inverted and fed as a negative voltage to turn On, by plate pullover, a single shot multivibrator 498 for twenty milliseconds. This twenty millisecond period is considered as the time that the tape is arriving at load point. A twenty millisecond negative pulse is fed from the output terminal "2" of single shot multivibrator 498 through a CF–1 type cathode follower 500 to the line 460. This line has been referred to as the not arriving at load point line 460, because it is only negative during the time that the tape is arriving at load point.

A twenty millisecond positive pulse is fed from the output terminal "8" of single shot multivibrator 498 through a CF–1 type cathode follower 502 to a line 504 which is positive when the tape is arriving at load point. The positive pulse is fed via a 20K ohm resistor to the input of an I–7 type inverter 505 which is caused to conduct and energize load point relay R42P connected in its cathode circuit. Load point relay R42P, by circuits to be described hereinafter, effects a stopping of the tape.

The twenty millisecond positive pulse on this arriving at load point line 504 is also fed to input terminal "4" of an OR circuit 506. The input terminal "6" of OR circuit 506 is fed from a lead 508 at the output of a cathode follower 510, the input of which is connected via load point relay contacts R42P—2 to +48 volts. When load point relay R42P is energized by the tape arriving at load point, contacts R42P—2 close, to apply a positive potential through cathode follower 510 to input terminal "6" or OR circuit 506. Since input terminal "4" goes positive at the beginning of arriving at load point, and input terminal "6" goes positive after the time it takes to energize the load point relay R42P and to close contacts R42P—2, the output of OR circuit 506 is positive from the start of arriving at load point to the time that load point relay R42P is deenergized. This positive output indicates the at load point condition and is fed to input terminal "4" of an AND circuit 512. The input terminal "6" of AND circuit 512 is connected to the select line 480, and thus the output of AND circuit 512 which is fed through a cathode follower 514 is a select and at load point line 516 which may be fed to the control unit of a data processing machine, for indicating a select and at load point condition.

The at load point line 508 is also connected to the input terminal "4" of an AND circuit 518. Input terminal "6" of AND circuit 518 is connected to the drive lead 422 which has been described as going positive when the tape is in the drive status. Thus when the tape is at load point and in the drive status, the output of AND circuit 518 will go positive, and this positive potential is fed through an OR circuit 520 to the input of an inverter 522 which starts to conduct and energizes load point latch trip relay R42LT. The energization of relay R42LT releases the plunger of load point relay R42P, to allow it to return to its unenergized position, to permit it to be picked up when load point is reached after a rewind operation. It is also possible to energize load point latch trip relay R42LT by causing a lead 524 which is connected to the OR circuit 520 to go positive. Lead 524 is connected to output of cathode follower 526, the input of which is connected via the parallel connected reset relay contacts R30—3 and unload contacts R22—5 to +48 volts. The closing of contacts R30—3 or R22—5 during a reset or unload operation respectively, applies a positive potential via cathode follower 526 to lead 524, which effects the energization of load point latch trip relay R42LT.

*Control from data processing machine*

The forward-backward circuits and the drive-stop circuits may be controlled from the control unit of a data processing machine. A backward lead 528 (Fig. 34C) from a data processing machine is connected to one input of an AND circuit 530, the other input of which is connected to the select line 486. When both inputs go positive, the output at select and backward lead 532 goes positive. This lead is connected to one of the inputs of OR circuit 406 which, as previously described, puts the machine in a backward status when one of its inputs goes positive.

A go lead 534 (Fig. 34C) from a data processing machine is connected to one input of an AND circuit 536, the other input of which is also connected to the select line 486. When both inputs go positive, the output at select and go lead 538 goes positive. This lead is connected to one of the inputs of OR circuit 464, which, as previously described, drives the tape when one of its inputs goes poistive. Thus the tape can be fed in a forward direction by the data processing machine by making the go lead 534 positive and leaving the backward lead 528 negative. By making both the go lead 534 and the backward lead positive, the tape will be fed backward.

*Vacuum switches circuit*

During the time that the tape 14 is actually being fed past the tape head unit 16, it is under the control of the vacuum switches LUV, LLV, RUV and RLV (Fig. 33).

As explained heretofore, these switches are sensitive to the vacuum within the columns 24 and 26, and control the brake and clutch mechanism shown in Figs. 4 and 5 of the drawings.

Whenever the tape reels 10 or 18 are at rest, they are under control of their respective brakes 42 and 48. These brake circuits are energized as soon as power appears on the +48 volt power line and even before the transfer of the contacts of the run relay R1. The brake magnet 42*a* is energized from the +48 volt line through the untransferred R1—AU point (Fig. 33), the normally closed left reel release contact LRC, the normally closed brake clutch relay contacts R4—AL through the brake magnet 42*a* to ground. The brake magnet 48*a* is energized by a circuit from the +48 volt supply line, through the untransferred run relay R1—BU point through the right reel release contacts RRC, the normally closed brake clutch relay contacts R4—BL, the brake magnet 48*a* to ground.

When the run relay R—1 is energized, it transfers its R1—AU and R1—BU points. Thereafter, the energizing circuit for the brake magnets 42*a* and 48*a* is through the respective vacuum switch structures. Let it be assumed that the tape loops now occupy a normal, relatively stable position between the vacuum switches LUV and LLV in column 24 and RUV and RLV in column 26, and that a vacuum exists in the columns below the tape loops. Under these conditions the brake magnet 42*a* will be energized by current from the +48 volt supply line, through the now transferred run relay point R1—AU through the normally closed clutch neutral status relay contacts R13—AL, through the normally closed point LUV—1 of the upper vacuum switch LUV, through the transferred point LLV—2 of the left lower vacuum switch LLV which is now subject to the vacuum within the column 24, through the left reel release contact LRC, the brake magnet 42*a* and ground.

Energization of the brake magnet 48*a* under these same conditions is effected from the +48 volt power line, through the transferred run relay contact R1—BU through the normally closed clutch neutral status relay contacts R13—BL, the normally closed RUV—1 contact of the right upper vacuum switch RUV, through the transferred point RLV—2 of the right lower vacuum switch RLV (the vacuum switch RLV now being subject to the rarified atmosphere in the vacuum column 26), through the normally closed right reel release contact RRC, the brake magnet 48*a* and ground.

Should the tape loop in the vacuum column 24 rise above the left upper vacuum switch LUV, that switch will be subjected to the rarified atmosphere in the vacuum column 24 with the result that its LUV—1 point will be opened and its LUV—2 point will be closed. The energizing circuit to the brake magnet 42*a* is broken when the LUV—1 point opens and the circuit to the unreeling clutch magnet 46*a* is closed. The magnet 46*a* will be energized from the power line, through the transferred R1—AU point, and the now closed LUV—2 point of the left upper vacuum switch LUV will provide a circuit for the energization of the unreeling clutch magnet 46*a*.

When the tape loop in the vacuum column 24 drops below the left lower vacuum switch LLV, that switch will be subjected to atmospheric pressure on both sides thereof, with the result that its contact LLV—2 will open and its contact LLV—1 will close. The first effect of this operation is to break the circuit for the brake magnet 42*a* which is through the LLV—2 point of the switch. Thereafter, upon closure of the LLV—1 point of the left lower vacuum switch, a circuit provided for the reeling clutch magnet 44*a*, this circuit being from the positive side of the line through the transferred run relay R1—AU point, the normally closed neutral status relay contacts R13—AL, the normally closed LUV—1 point of the left upper vacuum switch LUV, through the now closed normally closed point LLV—1 of the left lower vacuum switch LLV to the clutch magnet 44*a* and to ground.

The function of the vacuum switches RUV and RLV in the vacuum column 26 is precisely the same as that described in connection with the switches in the vacuum column 24. It is believed that the description thereof need not be labored in this specification, since an understanding of the operation should be clear from the specific description given in connection with the vacuum switches in the vacuum column 24. It suffices to say that as the tape loops in the respective columns rise, the upper vacuum switches LUV and RUV will be subject to rarified atmosphere in the column which will cause atmospheric pressure to transfer the points thereof, whereby the unreeling clutch magnets 46*a* and 50*a* are energized to supply tape to the vacuum column. By the same token, when the tape loops drop below the lower vacuum switches LLV and RLV, these switches which have been subjected to vacuum within the respective columns 24 and 26, will transfer their points to establish an energizing circuit for the reeling clutch magnets 44*a* and 52*a*. At such times that the reeling or unreeling clutch magnets are deenergized, the circuit is such, as pointed out hereinbefore, that the brake magnets 42*a* and 48*a* are energized to lock the reels 10 and 18 respectively against rotation. It remains to be noted, however, that the reels 10 and 18 may be selectively released from the influence of their brakes by breaking their energizing circuits through the opening of the reel release contact LRC which is provided for the control of the brake magnets 42*a* or the right reel release contact RRC which is provided for the control of the brake magnet 48*a*.

When it is desired to remove either of the reels 10 or 18, related reel release contacts LRC and RRC are opened. The reel release contact LRC is in the circuit of the brake 42, while the reel release contact RRC is in the circuit of the brake 48. Consequently, opening of the contact LRC will deenergize the brake 42, while opening of the contact RRC will deenergize the brake 48. This will permit free manual turning of either of the reels so released.

During a load-rewind or an unload operation, it is necessary to disable the vacuum switches and thereby disable the clutch magnets so that the tape can be moved in and out of the columns as desired. Neutral status relay R13 has been previously described in relation to Fig. 32. Neutral status relay contacts R13—AL and R13—BL are transferred all during the load-rewind and unload operations. Under these conditions, the vacuum switches LUV and LLV are bypassed and brake magnet 42*a* is energized from the +48 volt supply through the transferred run relay contacts R1—AU through the left reel release contact LRC, the normally closed brake clutch relay contacts R4—AL, the brake magnet 42*a* to ground. The vacuum switches RUV and RLV are bypassed and brake magnet 48*a* is energized by a circuit from the +48 volt line, through the transferred R1—BU point, through the right reel release contact RRC, the normally closed brake clutch relay contacts R4—BL, the brake magnet 48*a* to ground.

As previously described, when R13 is energized, the forward-backward control is in its neutral position, and with the drive-stop circuit in the stop position, the machine is in the position of Fig. 17. This position is necessary during loading because otherwise increased suction caused by the transfer of the flapper valve in the column in which the first tape loop completely enters, would pull the tape out of the other column.

During the loading portion of the load-rewind operation, when the drive capstans are in, a brake clutch relay R4 will be energized as hereinafter described to transfer its brake clutch relay contacts R4—AL and R4—BL, and lightly energize brake magnets 42*a* and 48*a* respectively.

Brake magnet 42a is energized by completing a path from a source of +48 volts via a lead 540, through a 1K ohm resistor, normally closed rewind start relay contacts R12—AL, the now transferred brake clutch relay contacts R4—AL, and brake magnet 42a to ground. Brake magnet 48a is lightly energized by a circuit from the +48 volts through a lead 542, a 1K ohm resistor, normally closed rewind start relay contacts R12—BL, the now transferred brake clutch relay contacts R4—BL, and brake magnet 48a to ground. This energization of the brakes is necessary during loading to allow the reels to be rotated in such a direction as to feed tape into the vacuum columns and still not be of such force as to tear and break tape if malfunction of equipment causes the tape to stop. The 1K ohm resistor is in the circuit so as to energize the brakes lightly and allow some slippage of the tape to prevent tearage when the idlers 32 and 34 come down.

Going into the rapid rewind portion of a load-rewind operation, the brake clutch relay contacts R4—AL and R4—BL will transfer as soon as the capstans are in; and at the start of rewind, a rewind start relay R12 must be energized, in a manner to be made clear later, to transfer its rewind start relay contacts R12—AU, R12—AL, and R12—BL. The transfer of normally closed contacts R12—AL and R12—BL which are in the circuits that apply the light brakes, open the braking circuits. At the same time, the transfer of rewind start relay contacts R12—AU completes a circuit to lightly energize clutch magnet 44a from the +48 volt line through a lead 544, a 1K ohm resistor, the now transferred contacts R12—AU, the clutch magnet 44a to ground. This light energization of the clutch magnet 44a is used to permit slippage of the clutch as the rapid rewind motor 236 comes up to speed, thus preventing tearage of the tape.

*Read/write circuits*

Since the function of the tape feed machine is to feed tape past the read/write head, an explanation of the read/write circuits and the method of recording will now be given.

In the apparatus of this invention, characters are manifested or recorded in the binary system of notation. In the binary notation, only two digits are employed, i.e., 0 and 1. The decimal digit 0 is represented by a binary digit 0, and the decimal digit 1 is represented by a binary digit 1. These binary digits are referred to as bits. The digital position or orders in a binary number, reading from right to left, correspond in value to $2^0$, $2^1$, $2^2$, $2^3$, $2^4$, etc., or decimal digits 1, 2, 4, 8, 16 etc., respectively. For example, a binary number 1001 represents the decimal digit 9, which is determined by the addition of the decimal digits 1 and 8, indicated by a binary 1, in the extreme right and the extreme left binary positions, respectively. Hence, by using binary bits or pulses in groups of four, any decimal digit from 0 to 9 inclusive, may be written in the pure binary notation.

The apparatus of the data processing machine for which the circuits of this tape feed machine have been adapted, uses a seven bit code for each character. The first four bits are used for numeric representation, the fifth and sixth bits for zoning (to expand the code to include alphabetic and special characters), and the seventh bit for checking errors. The zoning portion comprises the fifth and sixth bits, called A and B bits (Fig. 39), which may be used, in combination with the numeric portion to expand the code to include alphabetic and special characters. The seventh bit called the C bit, is used for checking purposes which need not be described further.

Reference to Fig. 39 shows that the recording on the tape is of a multiple channel variety, more specifically seven channels of recording per width of tape. As indicated, there are seven bits of information corresponding respectively to the seven channels at each of the intervals on the tape. Seven bits across the tape comprise a character, a group of characters comprise a word, a group of words comprise a record, and each tape reel may contain many records.

Referring to Fig. 38, a U-shaped magnetic head 544 is shown for example, as being provided with a pair of windings 546 and 548. The head 544 may be of any conventional type, having an air gap in close proximity to the tape 550, which is moved past the read/write head, from the file reel 552 to the machine reel 554. The windings 546 and 548 are arranged to be connected in common to ground; the other connection to winding 546 being from point R90B, while the other connection to winding 548 is point R90A. The points R90A and R90B of a relay R90, in combination with the battery B are used to simulate, for purposes of explanation only, the action of electronic circuits which are hereinafter described in detail.

Briefly, when the writing current flows through winding 546, a magnetic flux of one direction flows across the air gap of the head 544 but when the writing current flows through winding 548, a magnetic flux is generated across the air gap of the head 544 in the opposite direction. Current flows through the coil 546 to generate flux in one direction when the switch R90 is closed to the point R90B; a circuit then being closed from the battery B through point R90B and the coil 546 to ground. Flux is generated in the opposite direction when the switch R90 is switched to point R90A, as shown, a circuit then being closed from the battery B through the points R90A and coil 548 to ground. While only one head 544 is shown in Fig. 38, it is understood that there are six other identical heads adjacent to one another in a direction perpendicular to the line of travel of the tape. These seven heads act independently of one another and it is the combination of the information stored upon the tape by these seven heads which, according to the code used, can represent certain characters. The seven heads are actually the read/write head unit 289 of Fig. 12.

Referring to Fig. 37, particularly to the uppermost curves thereof, there is represented the writing pattern upon one section of tape for the tracks designated as 1, 2, 3, 4, 8, A, B and C. The writing is done, for example, at intervals N, P, Q, S, T, U and V. Let it be assumed that current flow through a coil for the head of track #1 is already in a direction causing a positive flux. At the interval N, it is desired to record a binary —1— on track 1. Circuits to be described below, cause a change to be produced in the direction of the flux so that the flux in the head of track 1 is now negative. After the reversal of magnetic flux occurs, the tape continues to be magnetized in the new direction, in this case negative, through the intervals of P and Q until another point arrives at which a binary —1— is to be stored. The fact that there was no flux change in track 1 at intervals P and Q, is an indication of the storage of binary 0's. At the intervals S and T there are further reversals of flux in track 1 indicating binary 1's stored in both those intervals. After the reversal, at interval T, there is no flux change in track 1 for the intervals U and V, hence, it is an indication that binary 0's are stored at those points. Similar recordations are made by the write currents in tracks 2, 4, 8, A, B and C. Referring to the lower curve of Fig. 37, the corresponding read signals obtained by passing the tape over the read/write head is shown. Through operation circuits, to be described below, positive signals are obtained at each flux reversal, regardless of the direction of flux change. It should be noted that track #1 thus produces positive signals at intervals N, S, and T, which correspond to recordings of binary 1's, while at the intervals P, Q, U and V, there is no pulse output, hence, binary 0's are read at those points.

The read and write circuits for the entire seven channels are shown in block diagram form in Fig. 35. The details for the "C" bit channel, which is representative of all channels are shown in Fig. 36.

Before describing the circuits of Figs. 35 and 36, a description will be given of the read/write circuits of Fig. 34A which indicate what inputs to the tape feed machine are required from the control unit of a data processing machine to control the read/write circuits of Fig. 35. When it is desired to place the tape feed machine in a write status, a set write lead 556 from the data processing machine is shifted positive. The coincidence of the positive voltage on the set write lead 556 at one terminal of an AND circuit 558 with a positive voltage on the select and ready lead 486 at the other terminal of AND circuit 558, provides a positive output which is fed to the left-hand input of a read/write status trigger 560, turning it on, as an indication of a write status. When it is desired to place the tape feed unit in a read status, a set read lead 562 from the data processing machine is shifted positive. The coincidence of the positive voltage on the set read lead 562 at one terminal of an AND circuit 563 with a positive voltage on the select and ready lead 486 at the other terminal of AND circuit 563, provides a positive output which is fed to the right-hand input of a read/write status trigger 560, turning it off, as an indication of a read status.

When the read/write status trigger 560 is in the write status, its right-hand output terminal goes positive. This positive potential is transmitted via a cathode follower 564, a grounded grid amplifier 565, a lead 566, and a cathode follower 567 to a write status lead 568. This write status lead 568 is utilized by the read/write circuits of Fig. 35 in a manner to be presently described. The positive output of grounded grid amplifier 565 is also transmitted via a lead 569, and a cathode follower 570 to one input of an AND circuit 571. The other input of AND circuit 571 is connected to the select and ready lead 486 which is positive during select and ready. The output of AND circuit 571 then goes positive and is transmitted via a lead 572, and the cathode follower 573 to a select, ready and write lead 574. Select, ready and write lead 574 may be connected to a data processing machine to inform it that a particular tape unit is ready to write. The positive potential on the lead 572 which is also indicative of select, ready and write, is fed via a cathode follower 576 to a select, ready and write lead 578 which is utilized by the tape feed machine itself in a manner to be described. Select, ready and write lead 578 is connected to one input of an AND circuit 580, the other input of which is connected to a write pulse lead 582. Write pulse lead 582 may come from the data processing machine and be used for setting the exact time of writing. A positive potential on the two inputs of AND circuit 580 will cause a positive voltage to be transmitted from the output of AND circuit 580 via a cathode follower 584 to gated write pulses lead 586. This gate write pulses lead 586 is utilized by the read/write circuits of Fig. 34.

When the read/write status trigger 560 is in the read status, its left-hand output terminal goes positive. This positive potential is applied via a cathode follower 588 to a read status lead 590. Read status lead 590 is applied to one input of an AND circuit 592, the other input of which is connected to the select and ready lead 486. When both inputs of AND circuit 592 go positive, its output goes positive and is applied via a grounded grid amplifier 594, a lead 596 and a cathode follower 598 to a select, ready and read line 600. The select, ready and read line 600 may be connected to the data processing machine. The output of the grounded grid amplifier 594 is also connected via a cathode follower 602 to a gate read pulses lead 604. This gate read pulses lead 604 is utilized by the read/write circuits of Fig. 35.

As protection against the possibility of accidentally writing on the tape, input terminal "4" of read/write status trigger 560 is connected via the parallel connected normally closed start relay contacts R20—3 and the normally open rewind status relay contacts R36—3 to ground. Ground potential on the terminal "4" of trigger 560 will keep the trigger 560 off and in its read status. Thus, since start relay contacts R20—3 are closed until the start button (to be described later) is actuated, the tape feed machine will be held in a read status until the start of operation. Rewind status relay contacts R36—3 close during a rewind operation to prevent accidentally writing on the tape during rewind.

Now that it has been indicated how and when the write status lead 568, the gated write pulses lead 586, and the gate read pulses lead 604 go positive, a description will be given of the read/write and erase circuits of Fig. 35. Since the blocks of Fig. 34 are special and are not used in other parts of the description the elements of the blocks are shown in Fig. 36, and a description of Fig. 36 will be given following the description of Fig. 35.

Assume, for example, that the tape feed machine is in a write status. During every write operation, all recording in all seven tracks, which may have been previously recorded on the tape, is erased. This erase operation is accomplished by the circuits shown at the bottom of Fig. 35 which operate as follows. When the selected tape feed machine is in a write status, the lead write status 568 (from Fig. 34A) is positive. This positive signal passes through an inverter 606, the plate circuit of which contains the erase head 608, so that when the inverter 606 receives a positive input, it conducts, and current flows through the erase head 608. Therefore, when the selected tape feed machine goes into a write status, current flows through each erase head to erase all seven tracks of the tape. The erase head which is in a more forwardly position than the read/write head, is energized at any time that the tape feed machine is in a write status.

Inverter 606 comprises two triodes of a 5687 type tube, the grid G1 of which is connected via a 150 ohm resistor to a 100K ohm resistor and the grid G2 of which is connected to the junction of the 150 ohm and 100K ohm resistors. The other end of the 100K ohm resistor is connected via a 220K ohm resistor to −270 volts and the junction of the 100K ohm resistor and the 220K ohm resistor is connected via a 390K ohm resistor to the write status lead 568.

While there are seven tracks of information, the circuitry for each track is identical, and the explanation of the "C" bit will apply to all other tracks. At the start of recording, assume all write triggers, for example, trigger 610 (Fig. 35) of the "C" bit track is in a reset or off condition. The outputs of this trigger 610 feed to two inputs of the write inverter 612 and cause one-half of the latter to conduct, and therefore, current to flow through the one-half of the write coil 614, that is, through either section 616 or section 618, provided the write status inverter 620 is not conducting. The write status inverter 620 is conducting when the write satus lead 568 is positive, meaning that the particular tape feed machine is in the write status. When the input to the write status inverter 620 is positive, such a potential is applied to the cathode, that neither half of the write inverter 612 may conduct, regardless of the inputs from the trigger 610. However, when the line write status goes negative, the write status inverter 620 allows control of the write inverter 612 to be taken over by the write trigger 610. When the trigger 610 is off, current flow is through the write coil section 618 and when trigger 610 is on, current flow is through the coil section 616.

If it is desired to write under control of a data processing machine, write signals from the data processing machine are fed to the seven write busses 622 to 628 inclusive and then a pulse is fed to the gated write pulses line 586. Under the assumed conditions, that is, the start of recording, the write trigger 610 is off, and thus current flows through the coil section 618. Positive write signals occurring on the "C" bit write bus 622 are fed to the resistance input of a diode gate 630. This diode gate is of a type shown in Fig. 28 of the L. R. Harper patent application Serial No. 404,278 filed on December 12, 1953, wherein it is fully described. It need only be understood for the purposes of explanation that the operation of a diode gate is such that a negative pulse will occur at its condenser output only at the time when its resistance input is held initially positive and its diode input goes negative. With the write signals on the resistance input, a negative pulse on the gated write pulses line 586, is fed to the individual diode inputs and where a positive write signal exists, a negative output will be transmitted to flip the trigger 610. The signal on write status line 586, for each bit, in this case, the "C" bit, remains negative if a binary —0— is being recorded, but a positive pulse occurs if a binary —1— is being recorded. Assume that the tape is moving past the head and that current flow is through the coil section 618 as the write bus "C" bit receives a positive signal. Now the positive signal gated write pulses is added to the positive signal of the write bus "C" bit and passes through the diode gate 630 to shift the write trigger 610. As trigger 610 shifts, it acts via the write inverter 612 so that current flow is shifted from the coil section 618 to the coil section 616 and thereby a binary —1— is recorded in this particular channel, that is the "C" bit channel. Recordation of the binary —1— is indicated by a change in the direction of the flux.

At the time that the second character is being recorded, assume that the "C" bit is to be a binary —0—. At this interval, since no pulse occurs on the "C" bit write bus 622, when the gated write pulse occurs, the inverter switch 612 remains cut off and the trigger 610 remains in its existing condition, in this instance, the on condition. Flow of current therefore continues through the coil section 616. At this time, there is no reversal of flux so that, in effect, a binary —0— is recorded.

For the purpose of checking in data processing machines using the tape feed machine, an output is fed from the inverter 612 via a lead 632, an inverter 634, and a cathode follower 636 to the write echo bus "C" line 638. There is one write echo bus line for each of the seven channels and they are referred to as 638 to 644 inclusive.

During read operations, the tape is fed past the read/write coil 614 (Fig. 35) and upon reaching a point where a binary —1— is recorded, the flux changes and a signal is thereby generated and fed through three stages of amplification, i.e., the amplifiers 646, 648, and 650. The output of the amplifier 650 is fed to a cathode follower 652, the output of which is a positive pulse each time a binary —1— is read. This cathode follower 652 has another input from the gate read pulse line 604 shown in Fig. 34A. It is necessary for both inputs to be positive in order for the positive signals to pass through the output of the cathode follower 652 to the "C" bit input bus line read sync bus "C" 654. There is one read sync bus lead for each of the seven channels indicated by reference numerals 654 to 660 inclusive. The "C" bit circuits just described, are included within a block 645 (Fig. 35). Indentical circuitry represented by blocks 662 through 668 inclusive, are for the "B", "A", "8", "4", "2" and "1" bits, respectively. Writing on, or reading from the tape is relatively simultaneous in all seven channels.

Referring again to Fig. 36, in which are shown the details of the circuitries used in the representative "C" bit track, the typical values of the components indicated pertain to all other track circuits. However, it will be apparent to those skilled in the art that various other combinations and types may be employed. Wherever shown, in Fig. 36, unless otherwise indicated, the values of the various resistors, condensers, and inductances are in thousands of ohms, micromicrofarads, and microhenrys respectively. As usual, the terms positive and negative, used in relationship to signals refer to relative values rather than values with respect to ground.

Referring to the diode gate 630 (Fig. 36) designated DG, this gate utilizes a diode D1, a 39K ohm resistor and a 68 micromicrofarad condenser commonly connected. The gated write pulses line is connected to the cathode of the diode and the write bus line is connected to the 39K ohm resistor. As previously indicated, this diode gate operates in a manner fully described in said L. R. Harper application to effect a negative output from the 68 micromicrofarad condenser if there is a positive write signal on the write bus 622 followed by a negative pulse on the gated write pulses line 586. This 68 micromicrofarad condenser is connected to the junction of a 39K and a 330K ohm resistor. The other end of of the 39K ohm resistor is connected to +140 volts and the other end of the 300K ohm resistor is connected to ground. The tapped output from the junction of the 39K and 330K ohm resistors passes to the trigger 610. Thus, when the tape unit is in the select and write status, positive signals occurring on the write busses pass through the diode gate to the trigger 610. The write trigger 610 comprises two cross-coupled triodes (which may be included in one envelope as in a 6211 type tube) in which the plate P1 is coupled by an 82K ohm resistor to the grid G2 and a plate P2 is likewise coupled to the grid G1 by an 82K ohm resistor. Each of these 82K ohm resistors is shunted by a 15 micromicrofarad condenser as shown. The grid G1 is connected via a 110K ohm resistor and a 47K ohm resistor to a power supply of −130 volts and the grid G2 is connected by an identical resistor to the same power supply. The cathodes K1 and K2 are connected to ground. Plate P1 is connected through a 750 microhenry inductance, a 3.9K ohm and a 4.3K ohm resistor to +140 volts, and plate P2 is similarly connected to +140 volts.

Grid G1 is connected via a 22 micromicrofarad condenser in series with a 22K ohm resistor to the junction of the 43K ohm resistor and the 3.9K ohm resistor in the P2 plate circuit. The junction of the 22 micromicrofarad condenser and the 22K ohm resistor is connected to the anode of a diode D2. Grid G1 is similarly connected to the P1 plate circuit and in a similar manner to the anode of a diode D3. The cathodes of diodes D2 and D3 are commonly connected to the diode gate 630. Plate P1 is connected via a 270K ohm resistor, an 82K ohm resistor and a 230K ohm resistor to −130 volts. A 39 micromicrofarad condenser is connected from plate P1 to the junction of the 82K ohm resistor and the 230K ohm resistor. The junction of the 270K ohm resistor and the 82K ohm resistor is connected to the anode of a diode D4, the cathode of which is connected to ground. The junction of the 82K ohm resistor and the 230K ohm resistor is connected to the left-hand triode of inverter 612. A circuit similar to that described for plate P1 is connected to plate P2 and the junction between the 82K ohm resistor and the 23K ohm resistor in this plate circuit is connected to the right-hand triode of inverter 612. Grid G1 is connected via a 110K ohm resistor and a 47K ohm resistor to −130 volts. The junction of the 110K ohm resistor and 47K ohm resistor is connected to a lead 670 which comes from the write check character circuit, to be presently described. Grid G2 is connected via a 110K ohm and a 47K ohm resistor to −130 volts. Grid G1 is also connected to the cathode of a diode D5 the anode of which is connected to −12 volts.

A positive pulse on lead 670 will be applied to the grid G1 of write trigger 610 to turn it off. This pulse comes from the output of cathode follower 672 (Fig. 35), the input of which is connected to a write check character lead 674 which may be connected to a data processing machine. The write check character line is fed a positive pulse by the data processing machine at the end of a record, for turning off the write trigger 610. If the write trigger 610 is already off, no —1— is written, but if it is on, a —1— is written. This insures that each channel of each record has an even number of 1's, a fact which provides for further checking utility.

Cathode follower 672 comprises two triodes of a 5965 type tube, the plates of which are commonly connected to +140 volts. The cathodes are commonly connected to the anode of a diode D9, the cathode of which is connected to ground. The commonly connected cathodes are connected via a 15K ohm resistor to −60 volts and also to lead 670. The grid G2 is connected via a 150 ohm resistor and a 300K ohm resistor to −60 volts. The junction of the 150 ohm and 300K ohm resistors is connected via a 100K ohm resistor to ground and also via a 0.01 microfarad condenser to ground. The grid G1 is connected via a 10K ohm resistor to the write check character lead 674. Returning to Fig. 36, a negative signal output from the diode gate 630 passes through a diode D2 or a diode D3 to the grid G1 or the grid G2 respectively, and causes the trigger to be shifted from one stable condition to the other so that for each negative output of diode gate 630, the trigger 610 is shifted from an on to an off condition or from an off to an on condition.

The write inverter 612 is comprised of a dual triode which may be of the 5687 type tube with the grid G1 connected via a 100K ohm resistor to the left-hand output of trigger 610, and the grid G2 is connected by identical circuitry to the right-hand output of the trigger 610.

The cathodes K1 and K2 are connected via a 5.6K ohm resistor to the plate of the write status inverter 620 and also via the same 5.6K ohm resistor through a 75K resistor shunted by a 0.02 microfarad condenser to ground. The plate P1 of the write inverter 612 is connected to the coil winding 616 to ground, while the plate P2 is connected through the coil winding 618 to ground. If the plate of the write status inverter 620 is positive, there will be no conduction in either side of the write inverter 612, regardless of the condition of the trigger 620. The potentials of the cathodes K1 and K2 of the write inverter is thus controlled by the write status inverter 612. This inverter has a cathode connected via a 100 ohm resistor to a source of −130 volts. Its grid is connected to the write status line 568 via a 120K ohm resistor in series with a 390K ohm resistor. The junction of the 390K ohm resistor and the 120K ohm resistor is connected through a 0.01 microfarad condenser to ground and also a 220K ohm resistor to the −270 volt supply. If the write status line 568 is positive as it is when the particular tape unit is in a write status, the triode of the write status inverter 620 conducts and the plate goes relatively negative. This is the negative potential which conditions the write inverter 612 for conduction. With its cathode K1 and K2 at a relatively negative potential, if the trigger 610 is on, the potential of its plate P2 is positive and therefore drives the grid G1 of the write inverter 612 positive so that current then flows from ground through the coil 616 and the left half of the write inverter 612 to the cathode of the write status inverter 620 and thus to the minus 130 volt source. As explained above, when curernt flows through the coil 616, it causes recording on the tape in one direction to saturation. If the condition of the trigger 610 is now reversed, its plate P2 goes negative and thus stops conduction through the left side of the write inverter 612. However, the plate P1 of the trigger is now positive and causes conduction through the right half of the write inverter 612. Current flow will then be from ground, through the coil section 618, the right half of the write inverter 612, to the cathode of the write status inverter 620, to the −130 volt source. Thus, by shifting the condition of the trigger 610, the direction of magnetization of the tape is reversed, and, therefore in this instance, that of the "C" track is reversed.

For the purpose of checking in data processing machines using the tape feed machine, an output is fed from the cathodes of the inverter 612 via a lead 632 to the input of an inverter 634. Lead 632 is connected via a 0.001 microfarad condenser, a 10K ohm resistor and a 150 ohm resistor to the grid of inverter 634 which may be one triode of a 6211 type tube. The junction of the 10K ohm resistor and the 150 ohm resistor is connected to the anode of a diode D11, the cathode of which is connected to ground. The same junction is also connected via a 430K ohm resistor and a 220K ohm resistor to +140 volts, the junction of these two resistors being connected via a 0.01 microfarad condenser to ground. The plate is connected via a 3K ohm resistor, a 3.3K ohm resistor and a 250 microhenry inductance to +140 volts. The plate is also connected via a 390K ohm resistor and a 430K ohm resistor to −130 volts, the 390K ohm resistor being shunted by an 8.2 micromicrofarad condenser. The junction of the 390K ohm resistor and 430K ohm resistor is connected to the cathode follower 636 and the output of the inverter 634 is fed from this junction via a 150 ohm resistor to the grid of cathode follower 636 which may be one triode of a 6211 type tube. The plate of cathode follower 636 is connected to +140 volts and the cathode is connected via a 200 ohm resistor to the write echo bus line 638 which may be fed into the control unit of the data processing machine where a cathode resistor of approximately 10K ohms connected to ground is required for the cathode resistance.

During read operations, after the tape passes the read/write coil 614 and changes of flux occur, potentials are generated in both halves 616 and 618 of this coil, but only the potential generated in coil 616 is utilized, and this potential is fed to the first stage of amplification, that is, to the amplifier 646 designated as A1. Amplifier 646 is one triode of a 12AY7 type tube, the grid of which is connected via a 47K ohm resistor to the read/write head 614. The plate of amplifier 646 is connected via a 51K ohm resistor, a 10K ohm resistor, and a 2K ohm resistor to a source of +270 volts. The junction of the 51K ohm resistor and 10K ohm resistor is connected via a 0.1 microfarad condenser to ground and the junction of the 10K and 2K ohm resistors is connected via a 0.01 microfarad condenser to ground. The cathode of amplifier 646 is connected through a 330 ohm resistor in series with a 50 ohm potentiometer and a 20 ohm resistor to ground. The output directly at the plate is fed through a 0.0025 microfarad condenser to a 150 ohm resistor, the other end of which is connected to the grid of a second stage of amplification A2, amplifier 648. The plate of amplifier 648 is connected via a 51K ohm resistor to the junction of the 10K ohm and 2K ohm resistors in the plate circuit of amplifier 646. The cathode is connected via a 330 ohm resistor to ground. The output directly at the plate is also fed through a 0.0025 microfarad condenser to a 150 ohm resistor, the other end of which is connected to the grid of the third stage of amplification, amplifier 650. This amplifier 650, designated A3 is one triode of a 6211 type tube, the plate of which is connected via a 27K ohm resistor to a +270 volt source. The plate is also connected via a 68 micromicrofarad condenser to ground, and the cathode is connected via a 330 ohm resistor to the tap on the 50 ohm potentiometer in the cathode circuit of amplifier 646. This connection is a well-known type of negative feedback which increases the stability of the circuit. The output from the plate of amplifier 650 may be fed through a 0.0025 microfarad condenser and a 150 ohm resistor to the grid of a cathode follower 652. The junction of the 0.0025 microfarad condenser and the 150 ohm resistor is connected via a 470K ohm resistor to a gate read pulse line 604 which may have one of two voltage levels developed in a manner previously described. When the gate read pulse line 604 is positive, the negative and positive signals from amplifier 650 appear at the cathode of the cathode follower 652, but if the gate read pulse line 604 is negative, the grid of amplifier 650 is held negative and neither the positive nor negative signals from amplifier 650 will appear at the cathode of the cathode follower 652. The plate of cathode follower 652 is connected via a 750 ohm resistor to +140 volts, and also via a 0.01 microfarad condenser to ground. The cathode of cathode follower 652 is connected via a 180 ohm resistor to read sync bus lead 654 from which the read pulses can be fed into the control of the data processing machine. The read sync bus lead 654 may be connected to the control unit of the data processing machine via a 6.6K ohm resistor to ground, the 6.6K ohm resistor acting as the common cathode resistor for the different tape units.

*Tape indicator circuits*

As previously described, when the tape indicator strip 210 on the tape is reached, it will be sensed by a tape indicator photocell 232, and signals will be developed which are transmitted to so inform the data processing machine. The data processing machine will finish the record it is writing on the tape, write a special tape mark character, and then signal the tape feed machine to stop feeding tape. If the tape feed machine is reading, the sensing of the tape mark character, which is at the end of each reel of tape, is utilized to cause the data processing machine to make go lead 534 (Fig. 34C) go negative and stop the tape feed. The tape indicator photocell 232 (Fig. 34B) is a variable resistance device with a resistor network similar to that associated with the load point photocell 226. The arrival of the tape indicator aluminum strip 210 will thus cause a negative shift to appear at the anode of photocell 232, and this negative shift is applied to the input of an inverter 676, producing a positive potential at its output terminal. This positive potential is fed via grounded grid amplifier 678, and cathode follower 680 to a tape indicator lead 682. Tape indicator lead 682 is connected to input terminal "4" of an AND circuit 684, the input terminal "6" of which is connected to the select, ready and write lead 578. When the two input terminals of AND circuit 684 go positive, its output goes positive and this positive shift is fed to the input of an inverter 686, the output of which shifts negative. This negative shift is fed to terminal "1" of a T–1 type tape indicator trigger 688, turning the trigger on by plate pullover. Output terminal "7" of tape indicator trigger 688 is thus shifted positive and the positive shift is fed via a cathode follower 690 and a lead 691 to one input of an AND circuit 692, the other input of which is connected to the select lead 480. The coincidence of the positive select signal and the positive tape indicator on signal causes a positive shift at the output terminal of AND circuit 692 to be fed via a cathode follower 694 to a select and tape indicator on line 696 which may be connected to a data processing machine. In a similar manner, the negative shift at output terminal "2" of tape indicator trigger 688 is fed via a cathode follower 696 to an AND circuit 698 where it is "anded" with select. Since one of the input terminals of AND circuit 698 goes negative, its output will be negative and this negative shift will be fed via a cathode follower 700 to a select and tape indicator off lead 701 which may be connected to a data processing machine. The select and tape indicator on lead 694 in its positive state and the select and tape indicator off lead 701 in its negative state indicate to the data processing machine that the tape indicator strip 210 has been reached. The fact that the tape indicator trigger 688 is on, can be observed on the front panel of the tape feed machine by lighting a tape indicator light 702 (Figs. 1 and 34B). This light 702 is energized by the positive shift from the left-hand output of tape indicator trigger 680 fed via cathode follower 690, lead 691, and a lead 703 to the grid of inverter 704 causing it to conduct through tape indicator light 702. The data processing machine will now finish writing the record and then transmit a positive pulse to a turn off tape indicator lead 705 (Fig. 34B) which is fed to an AND circuit 706 where it is "anded" with the select signal on select lead 480 and the resultant positive shift at the output is fed to input terminal "3" of the tape indicator trigger 688, turning it off. Turning tape indicator trigger 688 off, results in the select and tape indicator off lead 701 going positive and the select and tape indicator on lead 696 going negative.

Provisions have been made for turning on the tape indicator trigger 688 from the data processing machine. A turn on tape indicator lead 708 is fed to an AND circuit 710, where it is "anded" with the select signal on select lead 480, the resultant positive signal at the output of AND circuit 710 being fed to input terminal "6" of tape indicator trigger 688, turning it on.

To insure that the tape indicator trigger 688 is reset off at the start of operations, its input terminal "4" is connected via normally closed power on relay contacts R17—3 to ground via normally open unload relay contacts R22—4 to ground. As previously described, when the line switch LS (Fig. 31A) is thrown, the D.C. voltages go on and then after a delay power on relay R17 is energized. Thus, when line switch LS is closed, power on relay contacts are closed when the D.C. voltages are applied to trigger 688, and the ground potential applied via closed contacts R17—3 will insure that trigger 688 is started in the off condition. When power on relay R17 is energized, ground potential is removed, but this has no effect on trigger 688. When unloading, unload relay contacts R22—4 will close to reset the tape indicator trigger 688 off by applying ground potential to input terminal "4".

*Tape break circuits*

As previously described, if the tape should break during a rapid rewind operation, the tape break light 286 will shine directly into the tape indicator photocell 232 to operate a relay circuit and stop the machine. Referring to Fig. 34B, when the tape indicator photocell 232 senses the arrival of the tape indicator strip 210, the tape indicator lead 682 goes positive. This positive potential is applied via a lead 714 to one input of an AND circuit where it is "anded" with a voltage from a rapid rewind status lead 716 connected to the other input of the AND circuit 714. Rapid rewind status lead 716 comes from the output of a cathode follower 718 (Fig. 34C) the input of which is connected via a lead 720 (Fig. 34C, 34B and 34A) and a normally open rewind status relay contact R36—1 to +48 volts. The energization of the rewind status relay R36 occurs during rewind, and its contacts R36—1 transfers to apply a positive potential via cathode follower 718 to AND circuit 714. When the two inputs of AND circuit 714 go positive, its output goes positive and this positive shift is fed via a cathode follower 722 to the grid of an inverter 724, causing the inverter 724 to conduct and energize a tape break relay R41P in its plate circuit. The energizing of tape break relay R41P effects the opening of its normally closed R41P—1 contacts (Fig. 31A) in the circuit of the run relays R1 and R18. Run relay R1 is deenergized, and its contacts R1—AL in the circuit of motor relay HD1 opens to deenergize relay HD1, the HD1—1 contacts of which are shown in Fig. 29. When motor relay contacts HD1—1 open all the motors including the forward motor 22, the backward motor 23 and the rapid rewind motor 266 are deenergized. This will prevent tape from being unreeled onto the floor.

The tape break relay R41P is reset during an unload operation by a circuit which is provided for energizing a tape break latch trip relay R41LT (Fig. 31C) from +48 volts via unload assist relay contacts R22—6 (closed during an unload operation), now closed tape break relay contacts R41P—2 and relay R41LT.

*Unload*

To perform an unload operation, it is only necessary to press an unload button to effect a retraction of the drive capstans 28 and 30, a withdrawal of the tape from the columns, and a raising of the head cover 136. In this unloaded position, it is very easy to manually remove the tape from the machine as previously described.

The unload circuits are shown in Figs. 31A, 31B and 31C, and the timing diagram of the unload operation is shown in Fig. 40. Fig. 40 is a plot of the operations of relays and other controls plotted against time, with the lower position of each line representing the unenergized or inoperative condition, and the upper position representing the energized or operative position. The time represented in Fig. 40 is from the time of the manual operation of the unload button U until the time the machine is in the unloaded position. Each shift in each line is labeled by the relay or contacts which caused the shift.

When the unload button U (Fig. 31B) is actuated, a circuit for energizing unload pick relay R21P is completed from the ground through relay R21P, the now closed unload button U, the normally closed contacts of start relay R20—1, to +48 volts. The contacts of unload pick relay R21P are transferred mechanically and latched in the transferred position so that removal of the operator's finger from the manual unload button U will remove the energization from unload relay R21P, but its contacts will remain transferred. Normally open unload pick relay contacts R21P—4 (Fig. 31B) close to complete a circuit for energizing unload assist relays R11 and R22, from +48 volts via the closed unload pick relay contacts R21—4, the relays R11 and R22 in parallel to ground. Normally open unload assist relay contacts R11—AL (Fig. 31A) close to shunt the series connected relay contacts R9—AL, R10—AL and R14—AL and provide a path for keeping run relays R1 and R18 energized even though one of the sets of contacts R9—AL, R10—AL or R14—AL opens during unload, as will be made clear later.

Normally open unload assist relay contacts R11—BU (Fig. 32) close to energize neutral status magnet R13 which puts the machine in a neutral status so that the idler pulleys 32 and 34 can either be in the position of Fig. 16 or that of Fig. 17, as previously described.

The closing of unload assist relay contacts R22—4 (Fig. 34B), completes a circuit from ground via its contacts R22—4 to the input terminal "4" of the tape indicator trigger 688, to reset it off.

The closing of unload assist relay contacts R22—5 (Fig. 34B) energizes load point trip relay R42—LT which acts to trip the latch and allow the contacts of load point relay R42P to return to their normal untransferred position.

The closing of the normally open unload assist relay contacts R11—BL (Fig. 31C) completes a circuit for energizing the capstan retract relays HD8, from the +48 volt line via a lead 726 (Fig. 31C), the normally closed capstan-in relay contacts R7—AU, a lead 728, the normally closed not fast rewind relay contacts R6—AU, a lead 730, the now closed unload assist relay contacts R11—BL, the normally closed tape break relay contacts R41P—3, through capstan retract relay HD8 to ground. Capstan retract relay HD8 is parallel with a series connected 100 ohms resistor and a 100 microfarad condenser which act as a delay network for delaying the drop out of voltage across relay HD8 for a purpose to be made clear later. The energization of relay HD8 closes capstan retract relay contacts HD8—1 (Fig. 31C) which completes a circuit for energizing retract solenoid 346, from the +48 volt line via the closed contacts HD8—1 and the retract solenoid 346 to ground. Energizing retract solenoid 346 causes the retraction of the drive capstans 28 and 30 as previously described in relation to Figs. 23 to 25.

As previously described in relation to Fig. 23, when the drive capstans 28 and 30 start to retract, the high dwell on the cams 395 and 398 allow the contacts on the left capstan-out switch 397 and the right capstan-out switch 399 to close. Fig. 40 indicates that capstan-out switches 397 and 399 close practically simultaneously because of the direct coupling described previously in relation to Fig. 23.

When the drive capstans are fully retracted, the high dwell on cam 392 (Fig. 23) closes the contacts on the single capstans-in switch 394 which completes a circuit for energizing the capstans-in relay R7 (Fig. 31A) from the +48 volt line through the closed capstans-in switch 394, the capstans-in relay R7 to ground. Energizing capstans-in relay R7 will initiate the stopping of the capstan motor 164, apply a light brake to the tape, and start the low speed motor 114, by effecting the energization of low speed motor relay HD6, brake clutch relay R4, and the brake magnets **42*a* and 48*a***, all as indicated in Fig. 40.

Figure 30:
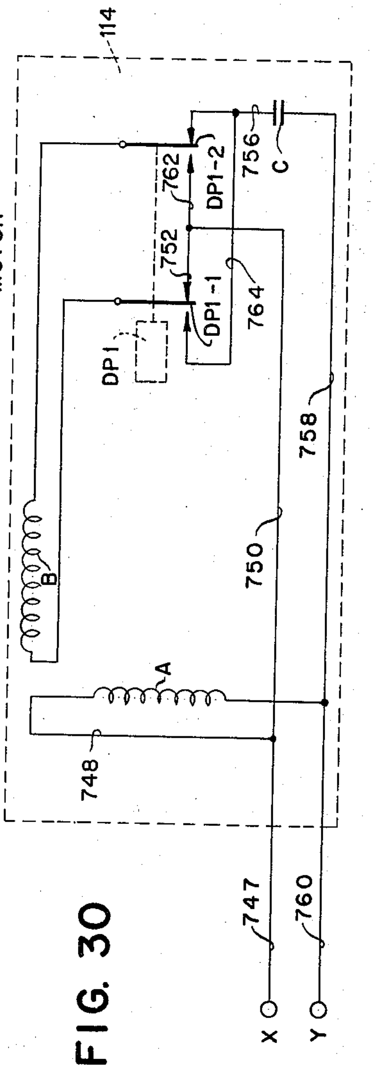
Fig. 30 is a diagrammatic view of a double pole switch for use in conjunction with the low speed motor.

The closing of normally open capstan-in relay contacts R7—AL (Fig. 31B) completes a circuit for energizing brake clutch relay R4, from +48 volts, via a lead 732, the closed contacts of transferred unload relay R21—2, a lead 734, the now closed capstan-in relay contacts R7—AL, the closed run relay contacts R1—BL, brake clutch relay R4 to ground. The energization of brake clutch relay R4, results in the light energization of the brakes **42*a* and 48*a* as previously described in relation to Fig. 33. The transfer of capstan-in relay contacts R7—AU (Fig. 34C) opens the circuit which energized the capstan retract relay HD8, said circuit previously described as closed by the closing of unload assist relay contacts R11—BL. The 100 ohm resistor and 100 microfarad condenser comprising the delay network across capstan retract relay HD8, are used to delay the deenergization of relay HD8, until the retract solenoid 346 is latched. This delay is indicated on Fig. 40. The transfer of capstan-in relay contacts R7—AU also completes a circuit for energizing the low speed motor relay HD6, from +48 volts via lead 726, the now closed normally open capstan-in relay contacts R7—AU, a lead 735, a lead 736, the normally closed not rapid rewind relay contacts R6—BL, a lead 738, a lead 740, a lead 742 in series with the normally closed not rapid rewind relay contacts R5—AU, a lead 744, a lead 745, normally closed unload stop relay contacts R26P—2, normally closed rapid start relay contacts R12—BU, via the low speed motor relay HD6 to ground. Energizing the low speed motor relay HD6 closes a set of low speed motor relay contacts HD6—1 (Fig. 29) to complete a circuit from the upper 208 volt A.C. line via motor relay contacts HD1—1, low speed motor relay contacts HD6—1 to an input X of a low speed motor unit 114, the input Y of which is connected to the lower 208 volt A.C. line. The windings, capacitor and relay contacts comprising the low speed motor unit 114 are shown in Fig. 30. The low speed motor is a capacitor start, capacitor run induction motor comprising a winding A, a winding B and a phase shifting capacitor C. Terminal X is connected via a lead 747, a lead 748, winding A, and a lead 760 to terminal Y. Terminal X is also connected via lead 747, lead 750, lead 752, the normally closed low speed motor reverse relay contacts DP1—1, winding B, the normally closed low speed motor reverse relay contacts DP1—2, lead 754, lead 756, capacitor C, lead 758, and lead 760** to terminal Y.

With the low speed motor reverse relay contacts DP1 in their unenergized position, the low speed motor 114 acts as a take-up motor, i.e. it unloads tape by rotating in a direction so as to lift the head cover and take tape out of the columns. To reverse the direction of the motor in order to be able to load tape by lowering the head cover and feeding tape into the columns, it is necessary to reverse the connections of the input leads to winding B. This is accomplished by energizing the low speed motor reverse relay DP1, in a manner to be presently described, to transfer its contacts DP1—1 and DP1—2. A circuit is now completed from terminal X via lead 747, lead 750, a lead 762, the now closed normally open DP1—2 contacts, winding B, the now closed normally open DP1—1 contacts, lead 764, lead 756, capacitor C, leads 758 and 760 to terminal Y. The energization of low speed motor reverse relay DP1 thus effects a 180° phase shift across winding B, which causes the capacitor run induction motor 114 to reverse its direction of rotation.

The low speed motor 114 will ordinarily rotate in the direction which lifts the head cover 136 and takes tape out of the columns unless the low speed motor reverse relay DP1 (Fig. 34C) is energized. It will be described hereinafter that low speed motor reverse relay DP1 can only be energized during a load-rewind operation; therefore during an unload operation the low speed motor always acts as a take-up motor.

When the head cover 136 leaves its down position, it allows the normally open head cover down switch 344 to close as hereinbefore described in relation to Fig. 20, and the head cover not down relay R8 is energized by a circuit completed from the +48 volt line through the now closed head cover down switch 344 and the head cover not down relay R8 to ground. Energizing head cover not down relay R8 results in the stopping of the capstan motor 164 through the transfer of the head cover not down relay contacts R8—AU (Fig. 31A) which open the circuit from +48 volts via lead 746, the now open normally closed contacts of transferred head cover not down relay R8—AU, capstan motor relay DP2 to ground. The other path for energizing capstan motor relay DP2, from +48 volts via unload assist relay contacts R22—8, capstan-in relay contacts R7—BU, capstan motor relay DP2 to ground, has been opened, when the capstans were retracted, by the opening of the normally closed capstan-in relay contacts R7—BU. Energizing head cover not down relay R8 also results in the placing of the moving coil 200 in the drive status, which means that since the neutral status relay R13 has been previously energized to place the machine in the neutral status, the idler pulleys 32 and 34 will be in the position of Fig. 16, to permit the tape to be removed easily. This is accomplished by the closing of the head cover not down relay contacts R8—BL (Fig. 34C) which completes a circuit from +48 volts via a lead 766, the now closed unload relay contacts R22—3, a lead 768, a lead 770, normally closed not rapid rewind relay contacts R6—BU, a lead 772, now closed head cover not down relay contacts R8—BL, to the input of cathode follower 456. The +48 volts on the grid of cathode follower 456 puts the moving coil 200 in the drive status in a manner previously described.

The next event in sequence is the closing of the head cover up switch 340 to indicate that the head cover 136 has reached its maximum UP position. Thereafter, the tape which is being raised begins to leave the columns. For the purpose of easy description, it will be assumed that the tape leaves the right column first, and when it does, the right flapper contacts 280 (Fig. 31A) are closed to complete a circuit for energizing a right column relay R10 from the +48 volt supply, through the now closed right flapper contacts 280, right column relay R10 to ground. Likewise when the tape leaves the left column, a circuit for energizing a left column relay R9 is completed from the +48 volt supply, through the now closed left flapper contacts 278, left column relay R9 to ground. The normally closed left column relay contacts R9—AL (Fig. 31A) and the normally closed right column relay contacts R10—AL open, but the R1 and R18 run relay circuit is not deenergized because contacts R9—AL and R10—AL are shunted by unload assist relay contacts R11—AL. With the head cover up switch 340 closed, and the right and left column relays R9 and R10 energized, a path is completed for energizing the unload stop relay R26P (Fig. 31C) from +48 volts via lead 726, the now closed normally open contacts of transferred capstans-in relay R7—AU, lead 736, the normally closed not rapid rewind relay contacts R6—BL, lead 738, lead 740, a lead 774, the normally closed not rapid rewind relay contacts R5—BL, in series with the now closed left column relay contacts R9—AU, the now closed right column relay contacts R10—AU, the now closed head cover up switch 340, the now closed normally open unload relay contacts R11—AU, and unload stop relay R26P to ground. At the energizing of unload stop relay R26P—2 (Fig. 31C), which were previously mentioned as being in the circuit for energizing low speed motor relay HD6, open to deenergize relay HD6 and effect a stopping of the low speed motor 114. Contacts R26P—1 (Fig. 31A) previously mentioned as being in the circuit for energizing vacuum motor relay HD4, open to deenergize relay HD4 and effect a stopping of the vacuum pump motor 126.

From Fig. 40, it is seen that when the vacuum pump motor 126 is deenergized, the vacuum is not instantaneously dissipated. As soon as the vacuum is dissipated, the vacuum supply switch 130 (Fig. 31A) previously mentioned as being in the circuit for energizing run relays R1 and R18, opens to deenergize the run relays. Run relay contacts R18—3 (Fig. 34A) then open to disable the ready circuit.

Run relay contacts R1—AL (Fig. 31A) which are in the circuit of motors relay HD1, open to deenergize motors relay HD1, the HD1—1 (Fig. 29) contacts of which open to deenergize the forward motor 22 and backward motor 23. Run relay contacts R1—BL (Fig. 31B), in the circuit of brake clutch relay R4, open to deenergize the brake clutch relay R4 transferring the contacts R4—AL and R4—BL (Fig. 33) to their untransferred position. The transfer of the run relay contacts R1—AU (Fig. 33) thus completes a circuit for fully energizing the brake magnet **42*a* from the +48 volts via run relay contacts R1—AU, the left reel release LRC, the normally closed contacts of now untransferred brake clutch relay R4—AL, via brake magnet 42*a* to ground. Likewise, the transfer of run relay contacts R1—BU and brake clutch relay contacts R4—BL complete a circuit for transferring the brake magnet 48*a*** from a lightly energized condition to a fully energized condition.

The dissipation of the vacuum also causes the right and left flappers to return to the position where the flapper contacts 278 and 288 are open, and therefore deenergize respectively the left column relay R9 and right column relay R10.

The tape is now in the unloaded position of Fig. 16 ready to be manually removed from the tape feed machine.

*Load-rewind*

It can be understood at this point, that at the start of a load-rewind operation, it is possible for the tape to be in four different situations requiring four different sequences of operation. The first load-rewind situation graphically represented in Fig. 41A is "Tape in the Loaded Position and in the Backward Area." In this situation, the load-rewind button LR is pressed in order to initiate a movement of the tape back to its load point. The machine makes a determination that it is unfeasible to go into a rapid rewind operation and the tape is moved towards the load point by going into a normal backward operation.

The second load-rewind situation, graphically represented in Fig. 41B, is "Tape in the Unloaded Position and in the Backward Area." In this situation, the load-rewind button LR is pressed to effect a loading of the tape, and then to return the tape to its load point. The machine makes a determination that it is unfeasible to go into rapid rewind and it first loads the tape into the machine, after which, tape moves toward the load point by going into a normal backward operation.

The third load-rewind situation graphically represented in Fig. 41C is "Tape in the Unloaded Position and in the Rapid Rewind Area." In this situation the machine makes a determination that it is feasible to go into rapid rewind. Rapid rewind then starts immediately, and when it is over the tape is loaded into the machine. The tape is then moved toward the load point by going into normal backward.

The fourth load-rewind situation graphically represented in Fig. 41D is "Tape in the Loaded Position and in the Rapid Rewind Area." In this situation, after the machine makes a determination that it is feasible to go into rapid rewind, the tape is unloaded, rapid rewind is performed, the tape is then reloaded, and then the tape is moved toward the load point by going into normal backward.

The pressing of the load-rewind button LR (Fig. 34C) completes a circuit from +48 volts via the closed load-rewind button LR to the input of a cathode follower 780. The positive shift on the output of cathode follower 780 is fed to the input terminal "4" of an AND circuit 782, the input terminal "6" of which is connected to the read status lead 590. The load-rewind condition is "anded" with the read status condition to insure that the tape feed machine will not rewind during the write status, or new information might accidentally be written over old information already on the tape, thereby destroying it. When both inputs to AND circuit 782 are positive, the output shifts positive, and this positive shift is applied via an OR circuit 786 and a cathode follower 788 to the grid of an inverter 790. The positive voltage on its grid causes inverter 790 to conduct through the normally closed load point relay contacts R42P—3, and a load-rewind relay R40, to thereby energize relay R40. The energization of load-rewind relay R40 initiates the load-rewind operation as will be described.

To signal the data processing machine that the tape feeding machine has been selected and is in a rewind status, an AND circuit 800 (Fig. 34C) has its input terminal "4" connected to the rewind status lead 716 and its input terminal "6" to the select lead 480. When both inputs are positive, the output of AND circuit 800 goes positive, and this positive potential is fed via a cathode follower 802 to a select and rewind status lead 804, from where it can be fed to the data processing machine to indicate that the selected tape feed machine is in the rewind status.

*Loaded condition—backward area*

In the first load-rewind situation shown in Fig. 41A, when the load-rewind relay R40 is energized, its R40—1 contacts (Fig. 31B) close to complete a circuit from the +48 volt line through the now closed photolight relay contacts R14—BU, the now closed load-rewind relay contacts R40—1, through the load-rewind assist relays R2 and R3 in parallel, to ground. Energizing load-rewind assist relay R2 transfers its relay contacts, and the closing of load-rewind assist relay contacts R2—BL (Fig. 31B) completes a circuit from the +48 volt line via the load-rewind assist relay contacts R2—BL and the parallel connected relays, unload latch trip relay R21LT, unload stop latch trip relay R26LT, and load-rewind relay R31 to ground. Since the operation is started in the loaded condition, unload latch trip relay R21LT and unload stop latch trip relay R26LT have no effect. The contacts which are closed by the energization of load-rewind relay R31 will be presently described.

The energization of load-rewind assist relay R2 causes the closing of its contacts R2—AU in the circuit of the three parallel relays, not rapid rewind relays R5 and R6, and timing motor relay HD7. These three relays may be energized by one of two paths. One of the two paths is from ground via the three relays R5, R6 and HD7 in parallel, the now closed load-rewind assist relay contacts R2—AU, a lead 780, arm switch contacts 256, to +48 volts. The second path is via the load-rewind assist relay contacts R2—AU a lead 782, a lead 784, normally open reset relay contacts R30—2, and a lead 786 to +48 volts. The second path will only be closed during a reset operation as will be described later. Under the assumed conditions of the first load-rewind situation, i.e., with the tape in the backward area, the arm switch contacts 256 will be closed as previously described in regard to Fig. 26. Since the arm switch contacts 256 are closed, the three relays R5, R6 and HD7 will be energized, and the not rapid rewind relay contacts R5—AL will transfer completing a holding circuit from ground, via the three parallel relays R5, R6 and HD7, the now closed load-rewind assist relay R2—AU, lead 782, a lead 788, the now closed normally open contacts of not rapid rewind relay R5—AL, and lead 786, to +48 volts.

When the operator's finger is removed from the load-rewind button LR, its contacts will open, to open the circuit which energized load-rewind relay R40. The load-rewind relay contacts R40—1 in the circuit for energizing load-rewind assist relays R2 and R3 will also open to deenergize load-rewind assist relays R2 and R3 unless a holding circuit is closed. A holding circuit, from ground via the load-rewind assist relays R2 and R3 in parallel, a lead 790, a lead 792, normally closed unload assist relay contacts R22—7, now closed load-rewind assist relay contacts R2—AL, may be completed to +48 volts via any one of four parallel paths. One path is from the load-rewind assist relay contacts R2—AL, through a lead 794, a lead 796, and normally open head cover not down relay contacts R8—AL to +48 volts. A second path is via lead 784, a lead 798, a lead 800, normally closed left capstan out switch 399, and a lead 802 to +48 volts. A third path is via lead 794, lead 798, a lead 804, right capstan out switch 397, and lead 802 to +48 volts. A fourth path is from the load-rewind assist relay contacts R2—AL via a lead 806, the normally closed contacts of not rapid rewind relay contacts R5—AL, and lead 786 to +48 volts. Under the assumed conditions of load-rewind situation one, i.e., tape loaded and in the backward area, none of the fourth paths of the holding circuit are completed. The head cover not down relay contacts R8—AL are open because the head cover 136 is down. The left and right capstans out switches 397 and 399 of the second and third paths are open because the drive capstans 28 and 30 are out. The fourth path through the not rapid rewind relay contacts R5—AL is open because the not rapid rewind relay R5 is energized. Thus, since there is no holding circuit closed for load-rewind assist relays R2 and R3, they are deenergized when the load-rewind button LR is released, and the load-rewind assist relay contacts R2—AU opens to deenergize the not rapid rewind relays R5 and R6, and the timing motor relay HD7.

Referring to Fig. 29, it can be seen that the timing motor relay contacts HD7—1 are in the circuit for energizing the timing motor A. When timing motor relay HD7 was energized, at the time of the pressing of the load-rewind button LR, the timing motor A started to rotate. Whether or not the button LR is pressed long enough to close the TMA—1 contacts or not, will have no effect on the operation in this first load-rewind situation and when timing motor relay HD7 is deenergized, the timing motor A wlil be deenergized and automatically reset itself, as previously described.

Referring to Fig. 31C, circuits are shown for energizing low speed motor reverse relay DP1, the low speed motor relay HD6, the rapid start relay R12 and a rewind motor relay DP3. The normally open contacts of the capstan in contacts R7—AU are in the circuit of all the four abovementioned relays, as has been previously described for the low speed motor reverse relay DP1 and the low speed motor relay HD6 in the description of the unload circuits, and as will presently be described for the rapid start relay R12 and the rewind motor relay DP3.

As previously described, the closing of load-rewind assist relay contacts R2—BL (Fig. 31B) will energize load-rewind relay R31. The closing of load-rewind relay contacts R31—4 (Fig. 31C) will effect the energization of rewind status relays R35 and R36 by completing a circuit from +48 volts via the normally closed load point relay contacts R42—1, the normally closed reset relay contacts R30—4, a lead 808, the now closed load-rewind relay contacts R31—4, and the parallel connected rewind status relays R35 and R36, to ground. Energization of rewind status relay R35, closes its relay contacts R35—1 which are across the load-rewind relay contacts R31—4 and act as a holding circuit. Rewind status relay contacts R35—2 (Fig. 32) transfer, said contacts R35—2 being in a circuit for energizing the backward relay R33 from +48 volts via the now closed run relay contacts R18—2, the now open normally closed load-rewind relay contacts R31—2, the now closed contacts of transferred rewind status relay R35—2, through the backward relay R33, to ground. When the load-rewind button is released, rewind-status relay contacts R35—2 will remain closed because of the holding circuit energizing rewind status relay R35, and normally open load-rewind relay contacts R31—2 will close to energize backward relay R33. The energization of backward relay R33 has previously been described, and it was shown that it causes a normal backward operation which continues until the load point is reached, at which time, the tape is stopped by picking up the load point relay R42P, the contacts of which then open, to open the circuit energizing the rewind status relays R34 and R36. This causes transfer of the rewind status relay contacts R35—2 to the normal position, and breaks the circuit energizing backward relay R33, thereby stopping the tape at load point.

*Unloaded condition—backward area*

The second load-rewind situation shown in Fig. 41B, differs from the first of Fig. 41A, only in that the operation is started with the tape in the unloaded condition. Fig. 41B illustrates the same relays and other controls as Fig. 41A, with the relay and control notations abbreviated to save space. Just as in the previous situation, the pressing of the load-rewind button LR causes the energization of load-rewind relay R40, the R40—1 contacts of which close to cause the energization of load-rewind assist relays R2 and R3. The load-rewind assist relay contacts R2—BL (Fig. 31B) then close to energize the unload latch trip relay R21LT, the unload stop latch trip relay R26LT, and the load-rewind relay R31. Since the operation is started in the unloaded condition, the energization of the unload latch trip relay R21LT trips the latch to reset unload relay R21P, while the energization of the unload stop latch trip relay R26LT resets unload stop relay R26P. When unload relay R21P is reset, its R21P—4 contacts (Fig. 31B) open to deenergize unload assist relays R11 and R22. When unload relay R26P is reset, its R26P—1 contacts (Fig. 31A) close to effect the energization of the vacuum pump motor relay HD4 which starts building up a vacuum in the header.

In this second situation, the load-rewind assist relays R2 and R3 will be held energized after the load-rewind button LR is released by the holding circuits previously mentioned. The first holding circuit path previously described through the normally open head cover not down relay contacts R8—AL will be closed because the head cover 130 is not down. The second and third holding circuit paths through the normally closed left and right capstan out switches 399 and 397 (abbreviated SW399, 397 in Fig. 41B) are also closed because the drive capstans 28 and 30 are not out.

With the tape in the backward area, the arm switch contacts 256 (abbreviated SW256 in Fig. 41B) will be closed and the not rapid rewind relays R5 and R6 and the timing motor relay HD7 will be energized. Since the load-rewind assist relay contacts R2—AU will now remain closed after the load-rewind button LR is released, the relays R5, R6 and HD7 will remain energized.

The energization of not rapid rewind relay R6 causes its R6—AL contacts (Fig. 31C) to close and energize the solenoid latch relay 382 (abbreviated SL 382 in Fig. 41B) which will permit the retract solenoid 346 to unlatch and cause the drive capstans 28 and 30 to come out. However, even though the latch trips, the capstan retract relay HD8 is energized, and so the net result is that the drive capstans remain in. Capstan retract relay HD8 is energized by a circuit completed from +48 volts via the normally closed contacts of the head cover not down relay R8—AU (Fig. 31A), a lead 810, the now closed normally open not fast rewind contacts R6—AU, lead 730, the now closed load-rewind relay contacts R2—BU, the normally closed tape break relay contacts R41P—3 and capstan retract relay HD8, to ground.

The moving coil 200 (abbreviated MC200 in Fig. 41B) which is in the drive position when the machine is unloaded, will now go into stop because the path from +48 volts via lead 766 (Fig. 34C) unload assist relay contacts R22—3, lead 768, lead 770, not fast rewind relay contacts R6—BU, lead 772, head cover not down relay contacts R8—BL to cathode follower 456, is opened by the opening of unload assist relay contacts R22—3 and the opening of not fast rewind relay contacts R6—BU. Even the closing of the load-rewind relay contacts R31—6, will not complete the path from +48 volts via a lead 812, load-rewind relay contacts R31—6, lead 770, not fast rewind relay contacts R6—BU, lead 772, and head cover not down relay contacts R8—BL, to cathode follower 456, because not fast rewind relay R6 is energized, opening its normally closed R6—BU contacts. Neutral status relay R13 (Fig. 32) which is held energized in the unloaded condition by the closed unload assist relay contacts R11—BU, remains energized even though its contacts R11–BU open. The circuit which energizes neutral status relay R13 is from +48 volts via the now closed load-rewind assist relay contacts R3—BU, the relay R13 to ground. The machine is thus in the neutral-stop position shown in Fig. 17. The energization of not fast rewind relay R6 causes its R6—BL contacts to transfer and complete a path for energizing the low speed motor reverse relay DP1 (Fig. 31C) by a circuit from +48 volts via lead 726, the now closed normally open contacts of capstan-in relay R7—AU, lead 735, lead 736, the now closed normally open contacts of not fast rewind relay R6—BL and low speed motor reverse relay DP1, to ground. With relay DP1 energized, the windings in the low speed motor 114 are connected for feeding tape into the columns but the motor is not yet energized.

The energization of timing motor relay HD7, causes its HD7—1 contacts (Fig. 29) to close, energizing the timing motor A (TMA in Fig. 41B), by placing 208 volts A.C. across it. As previously described, the timing motor A begins to rotate, and its contacts TMA—1 do not close for a predetermined fixed delay time. Since, as will be described, when the timing motor A contacts TMA—1 close, the low speed motor 114 is started. From Fig. 41B, it can be seen that as the vacuum builds up the left and right flappers 278 and 280 (FL278, 280 in Fig. 41B)

start to close. For example, first the right flapper 280 is closed and then the left flapper 278, effecting the respective energization of right column relay R10 and left column relay R9. The flappers 278 and 280 close to allow a small flow of air into the columns. The energizing of the right and left columns relay R10 and R9, close their R10—BL (Fig. 34C) and R9—BL contacts respectively and complete a circuit for putting the moving coil 200 into a drive status. This circuit is from +48 volts via lead 812, the now closed load-rewind relay contacts R31—6, lead 768, the now closed left column relay contacts R9—BL, the now closed right column relay contacts R10—BL, lead 772, the now closed head cover not down relay contacts R8—BL to cathode follower 456.

The building up of the vacuum also gradually moves the vacuum supply switch 130 (Fig. 31A) (abbreviated SW130 in Fig. 41B) closed, to complete a circuit for energizing the run relays R1 and R18 from the +48 volts via the now closed vacuum supply switch 130, the now closed load rewind assist relay contacts R3—AL, the now closed power on relay R17—1, the normally closed tape break relay R41P—1, and the parallel connected run relays R1 and R18, to ground. The energization of run relay R1 causes its R1—AL contacts to close to energize the motors relay HD1 (Fig. 31A) the HD1—1 (Fig. 29) contacts of which close to start the forward motor 22 and the backward motor 23.

The energization of run relay R1 also causes its R1—BL contacts (Fig. 31B) to close and complete the circuit for energizing the brake clutch relay R4 from +48 volts via one of the four paths of the holding circuit for load-rewind assist relays R2 and R3, via now closed load-rewind assist relay contacts R2—AL, normally closed unload assist relay contacts R22—7, lead 792, a lead 814, the normally closed unload relay contacts R21P—2, lead 734, now closed capstan-in relay contacts R7—AL, now closed run relay contacts R1—BL, and brake clutch relay R4, to ground. The energization of brake clutch relay R4 causes its contacts R4—AL (Fig. 33) and R4—BL to transfer, thus changing the fully energized brake clutch magnets 42*a* and 48*a* (abbreviated BM42*a*, 48*a* in Fig. 41B) to a lightly energized condition.

A short time later, the timing motor A contacts TMA—1 (Fig. 29) close to initiate the starting of the low speed motor 114, and because the low speed motor reverse relay DP1 is energized a load operation is started. This is accomplished by the energizing of the low speed motor relay HD6 (Fig. 31C) by a circuit from +48 volts via lead 726, the now closed normally open capstan-in relay contacts R7—AU, lead 735, a lead 816, the now closed timing motor A contacts TMA—1, lead 740, a lead 818, the now closed head cover not down relay contacts R8—BU, lead 745, the normally closed unload stop relay contacts R26P—2, the normally closed rapid start relay contacts R12—BU and the low speed motor relay HD6, to ground. When the low speed motor 114 starts, the head cover 136 starts to come down and the head cover up switch 340 (abbreviated SW340 in Fig. 41B) is opened. When the tape enters the first column (right column 26, for example) flapper contacts 280 (abbreviated R. F. L. 280) open to deenergize right column relay R10. When right column relay R10 is deenergized, the moving coil 200 is placed in stop by opening the R10—BL contacts (Fig. 34C). When the tape enters the left column 24, left flapper contacts 278 open to deenergize left column relay R9.

When head cover 136 reaches its down position, it opens the normally closed head cover down switch 344, to deenergize the head cover not down relay R8. This will cause its head cover not down relay contacts R8—BU (Fig. 31C) to open. Relay contacts R8—BU have just been described as part of the circuit for energizing the low speed motor relay HD6. Thus the low speed motor 114 is stopped.

The deenergization of head cover not down relay R8 also transfers its R8—AU (Fig. 31A) contacts to start the rotation of the capstan motor 164, and then brings the drive capstans 28 and 30 out. The normally closed head cover not down relay contacts R8—AU (Fig. 31A) close to energize the capstan motor relay DP2. The normally open relay contacts R8—AU (which via lead 810 to Fig. 31C is in the circuit for energizing capstan retract relay HD8), open. The deenergization of capstan retract relay HD8 will effect the deenergization of retract solenoid 346, and since the solenoid latch magnet 382 is energized, the drive capstans 28 and 30 will be allowed to come out.

As the drive capstans start out, the capstans-in switch 394 open to deenergize the capstans-in relay R7. The capstans-in relay contacts R7—AU (Fig. 31C) in the circuit of the low speed motor reverse relay DP1 open to return it to its unenergized state. The capstans-in relay contacts R7—AL (Fig. 31B) in the circuit of brake clutch relay R4 open to deenergize R4 and transfer its R4—AL (Fig. 29) and R4—BL contacts, and change the brake magnets 42*a* and 48*a* from the lightly energized to the fully energized condition.

Because the drive capstans are not brought out by a positive action, the right capstan 30 (as an example) will come out first, to open capstan-out switch 399, followed very closely by left capstan 28, which open capstan-out switch 397.

As soon as the second capstan-out switch opens, the backward feed of tape begins. This is accomplished by the fact that when the capstan-out switch 397 opens, it opens the last of the four holding circuit paths for energizing load-rewind relays R2 and R3. This starts a chain of actions which are exactly like that described for the first load-rewind situation of Fig. 41A, ending with the tape at the load point. This can be seen by comparing Figs. 41A and 41B starting at the time labeled "Start Backward."

*Unloaded condition—rapid rewind area*

The third load-rewind situation shown in Fig. 41C, differs from the second situation of Fig. 41B, only in the fact that the operation is started in the rapid rewind area, which means that the arm switch contacts 256 are open. Thus, just as for the second situation, the pressing of the load-rewind button LR leads to the energization of rapid rewind relay R40, which in turn leads to the energization of rapid rewind assist relays R2 and R3, which are held energized, even when the load-rewind button LR is released by the same holding circuits described for the second load-rewind situation. The unload relays are deenergized, and the vacuum pump motor is started. However, since the arm switch contacts 256 are not closed, the not rapid rewind relays R5 and R6, and the timing motor relay HD7 are not energized. Therefore, the capstan-retract relay HD8, the solenoid latch magnet 382, and the low speed motor reverse relay DP1 are not energized at this time and the moving coil 200 remains in the drive status.

As the vacuum builds up, the flapper contacts 280 and 278 are closed to energize right column relay R10 and left column relay R9 respectively, which effect a closing of their contacts R10—AU (Fig. 31C) and R9—AU respectively. This completes a circuit for energizing the rapid start relay R12 (Fig. 31C) and the rewind motor relay DP3, from +48 volts via lead 726, the now closed normally open capstan-in relay contacts R7—AU, lead 735, lead 736, the normally closed contacts of untransferred not rapid rewind relay contacts R6—BL, lead 738, lead 740, lead 774, normally closed not fast rewind contacts R5—BL, now closed left column relay contacts R9—AU, now closed right column relay contacts R10—AU, now closed head cover up switch 340, the normally closed unload assist relay contacts R11—AU, and parallel connected R12 and DP3, to ground. The energizing of rapid rewind motor relay DP3 closes its DP3—1 contacts, but as can be seen in Fig. 29, the rapid rewind motor 236 will not start until the motors relay contacts HD1—1 contacts close. The energizing of rewind start relay R12 opens its R12—AL (Fig. 33) and R12—BL contacts which open the circuit that lightly energized the brake magnets 42*a* and 48*a*. The energization of R12 also causes the transfer of rewind start relay conatcts R12—AU to lightly energize reeling clutch 46*a* to allow slippage of the clutch as previously mentioned. Then the vacuum supply switch 138 is closed by the vacuum to effect the energization of run relays R1 and R18. The run relay contacts R1—BL (Fig. 31B) close to complete a circuit for energizing brake clutch relay R4 from +48 volts via lead 786, the normally closed contacts of not rapid rewind relay R5—AL, lead 806, the now closed load-rewind relay contacts R2—AL, normally closed unload assist relay contacts R22—7, lead 792, lead 814, the normally closed unload relay contacts R21P—2, lead 734, now closed capstan-in relay contacts R7—AL, now closed run relay contacts R1—BL, and brake clutch relay R4, to ground. The energization of brake clutch relay R4 causes its R4—AL (Fig. 33) and R4—BL contacts to close. This removes the brake magnets 42*a* and 48*a* from the fully energized circuit. However, since rapid start relay contacts normally closed R12—AL and normally closed R12—BL are open, the lightly energized circuit is also open. Thus the brake magnets 42*a* and 48*a* are completely deenergized allowing the reels 10 and 18 to rotate freely.

The closing of the run relay contacts R1—AL (Fig. 31A) completes the circuit for energizing the motors relay HD1, and the closing of the HD1—1 contacts (Fig. 29) completes a circuit for energizing the rapid rewind motor 236 from the upper 208 volt A.C. line via the now closed motors relay contacts HD1—1, the now closed rapid rewind motor relay contacts DP3—1, and rapid rewind motor 236, to the lower 208 volt A.C. line. This starts the rapid rewind operation.

When the tape approaches the end of the reel, it will go into the backward area and the arm switch contacts 256 will close. This completes a circuit for energizing the not rapid rewind relays R5 and R6 (Fig. 31B) and the timing motor relay HD7, via the arm switch contacts 256 and the load-rewind assist relay contacts R2—AU. The energizing of not rapid rewind relay R5 opens its normally closed R5—BL contacts (Fig. 31C) which opens the circuit for energizing the rapid start relay R12 and the rapid rewind motor relay DP3. The deenergizing of rapid rewind motor relay DP3 deenergizes the rapid rewind motor 236. The deenergizing of rapid start relay R12 causes its R12—AU contacts to transfer and open the light energization circuit for the reeling clutch 46*a*. The rapid start relay contacts R12—AL and R12—BL close, to apply a light energization to the brake magnets 42*a* and 48*a* respectively. This causes the reels to gradually slow down.

The energizing of not rapid rewind relay R6 effects the energization of the capstan retract relay HD8, the solenoid latch magnet 382, and the low speed motor reverse relay DP1, in a manner similar to that described for the second load-rewind situation of Fig. 41B.

The energization of timing motor relay HD7, starts the timing motor A, which provides a delay long enough to allow the reels to stop rotating before loading the tape. After the reels stop, timing motor A contacts TMA—1 (Fig. 31C) close to complete a circuit for energizing the low speed motor relay HD6 in a manner similar to that described in the second load-rewind situation. This starts a chain of actions which are exactly like that described for the second load-rewind situation of Fig. 41B, ending with the tape at load point. This can be observed by comparing Figs. 41B and 41C starting at the time labeled "Start Low Speed Motor."

*Loaded condition—rapid rewind area*

In the fourth load-rewind situation of Fig. 41D, the tape is in the loaded condition and rapid rewind area.

The tape must first be unloaded, and thereafter the operation will continue in a manner similar to that of the third situation of Fig. 41C.

The pressing of the load-rewind button LR leads to the energization of rapid rewind assist relays R2 and R3. Since the arm switch contacts 256 are open in the rapid rewind area, the not rapid rewind relays R5 and R6, and the timing motor relay HD7 are not energized. Since the not rapid rewind relay R5 remains unenergized, its R5—AL contacts (Fig. 31B) remain untransferred. The normally closed contacts of R5—AL are in the fourth holding circuit path for load-rewind assist relays R2 and R3, and relays R2 and R3 are kept energized. The load-rewind assist relay contacts R3—BU (Fig. 32) close to place the machine in neutral status by energizing the neutral status relay R13. The load-rewind assist relay contact R2—BL (Fig. 31B) closes to energize the unload latch trip relay R21—LT, the unload stop latch trip relay R26—LT, and the load-rewind relay R31, the latter of which causes the energization of rewind status relays R35 and R36. The closing of load-rewind assist relay contacts R2—BU (Fig. 31C) completes a circuit for energizing the capstan retract relay HD8, from +48 volts via lead 726, the normally closed capstan-in relay contacts R7—AU, lead 728, the normally closed not rapid rewind relay contacts R6—AU, lead 730, now closed load-rewind relay contacts R2—BU, normally closed tape break relay contacts R41P—3 and capstan retract relay HD8 to ground.

The energization of capstan retract relay HD8 closes capstan retract relay contacts HD8—1 (Fig. 31C) which completes a circuit for energizing retract solenoid 346, which in turn causes the retraction of the drive capstans 28 and 30. The capstan-out switches 397 and 399 close practically simultaneously because of the direct coupling previously described.

When the drive capstans are fully retracted, the capstan-in switch 394 (Fig. 31A) closes to complete a circuit for energizing the capstan-in relays R7, which will initiate the stopping of the capstan motor 164, apply a light brake to the tape, and start the low speed motor 114, by effecting the energization of low speed motor relay HD6, brake clutch relay R4, and the brake magnets 42*a* and 48*a*, all as indicated in Fig. 41D. The closing of normally open capstan-in relay contacts R7—AL (Fig. 31B) completes a circuit for energizing brake clutch relay R4, from +48 volts, via a lead 732, the closed contacts of transferred unload relay R21—2, a lead 734, the now closed capstan-in relay contacts R7—AL, the closed run relay contacts R1—BL, brake clutch relay R4 to ground. The energization of brake clutch relay R4, results in the light energization of the brakes 42*a* and 48*a* as previously described in relation to Fig. 33. The transfer of capstan-in relay contacts R7—AU (Fig. 34C) opens the circuit which energized the capstan retract relay HD8, said circuit previously described as closed by the closing of load-rewind assist relay contacts R2—BU. The transfer of capstan-in relay contacts R7—AU also completes a circuit for energizing the low speed motor relay HD6, from +48 volts via lead 726, the now closed normally open capstan-in relay contacts R7—AU, a lead 735, a lead 736, the normally closed not rapid rewind relay contacts R6—BL, a lead 738, a lead 740, a lead 742 in series with the normally closed not rapid rewind relay contacts R5—AU, a lead 744, a lead 745, normally closed unload stop relay contacts R26P—2, normally closed rapid start relay contacts R12—BU, via the low speed motor relay HD6, to ground. Energizing the low speed motor relay HD6 closes a set of low speed motor relay contacts HD6—1 (Fig. 29) to energize the low speed motor 114. Since the low speed motor reverse relay contacts DP1 are in their unenergized position, the energization of the low speed motor 114 acts as a takeup motor, by rotating in a direction so as to lift the head cover and take tape out of the columns. When the head cover 136 leaves its down position, it allows the normally open head cover down switch 344 to close and energize the head cover not down relay R8 by a circuit from the +48 volts through the now closed head cover down switch 344 and the head cover not down relay R8 to ground. Energizing head cover not down relay R8 results in the stopping of the capstan motor 164 through the transfer of the head cover not down relay contacts R8—AU (Fig. 31A) which open the circuit from +48 volts via lead 746. The now open normally closed contacts of transferred head not down relay R8—AU, capstan motor relay DP2 to ground. The other path for energizing capstan motor relay DP2 from +48 volts via unload assist relay contacts R22—8, capstan-in relay contacts R7—BU, capstan motor relay DP2 to ground, has been opened, when the capstans were retracted by opening of the normally closed capstan-in relay contacts R7—BU. Energizing head cover not down relay R8, closes its R8—BL contacts (Fig. 34C) to complete a circuit from +48 volts via lead 812, the now closed load-rewind relay contacts R31—6, lead 770, normally closed not rapid rewind contacts R6—BU, lead 772, now closed head cover not down relay contacts R8—BL, to the input of cathode follower 456. The +48 volts on the grid of cathode follower 456 puts the moving coil 200 in a drive status.

The next event in sequence is the closing of the head cover up switch 340 to indicate that the head cover 136 has reached its maximum up position. Thereafter, the tape loops which are being raised begin to leave the columns. It will again be assumed that the tape leaves the right column first, and when it does, the right flapper contacts 280 (Fig. 31A) closes to energize right column relay R10. Likewise when the tape leaves the left column, the now closed left flapper contacts 278 energize left column relay R9.

The energizing of relays R9 and R10 close their respective contacts R9—AU and R10—AU to energize the rapid start relay R12 and the rewind motor relay DP3, by the circuit described in the description of the third load-rewind situation. The energizing of rapid start relay R12 causes its normally closed R12—BU contacts (Fig. 31C) in the circuit for energizing low speed motor relay HD6 to open effecting the deenergization of the low speed motor 114. Referring to Fig. 33, the energizing of rapid start relay R12 also causes the opening of its normally closed R12—AL and R12—BL contacts to open the circuit that lightly energizes the brake magnets 42*a* and 48*a*. Since the brake clutch relay R4 is energized at this time (see Fig. 41D), its R4—AL (Fig. 33) and R4—BL contacts are transferred and so both the circuits for lightly energizing and fully energizing the brake magnets 42*a* and 48*a* are opened, and the reels ride free.

The energizing of rapid rewind motor relay DP3, causes its DP3—1 contacts (Fig. 29) to close and complete a circuit for energizing the rapid rewind motor 236, from the upper 208 volt A.C. line via now closed motor relay contacts HD1—1, now closed rapid-rewind motor 236 to the lower 208 volt A.C. line. This starts the rapid rewind operation, and the operations which follow are exactly like that described for the third load-rewind situation of Fig. 41C, ending with the tape at load point. This can be observed by comparing Fig. 41C and Fig. 41D starting at the time labeled "Start Rapid Rewind."

*Reset*

A multipurpose reset relay R30 (Fig. 31B) has been provided which is energized by the pressing of the reset button R to complete a circuit from +48 volts via the reset button R and the reset relay R30 to ground. The first function of reset relay R30 is to deenergize the start relay R20 and thereby open the ready circuits previously described. This is accomplished by the opening of the reset relay contacts R30—1 (Fig. 31B) which open the circuit energizing start relay R20. It can be remembered that the start relay contacts R20—2 (Fig. 34A) are in the ready circuits.

The second function of reset relay R30 is to stop the tape when it is being moved forward or backward by the data processing machine, or backward during a load-rewind operation.

This is accomplished by the opening of the normally closed reset relay contacts R30—4 in the circuit for energizing rewind status relay R35 and R36. This will return the rewind status relay contacts R35—2 (Fig. 32) to their untransferred position to thereby stop the machine as previously described.

The third function of reset relay R30 is to give a false indication of the closing of the arm switch contacts 256. From Fig. 31B, it can be observed that the reset relay contacts R30—2 are electrically connected across the arm switch contacts 256 and thus closing of contacts R30—2 will give the same results as the closing of the arm switch contacts. If the tape is in the rapid rewind portion of a load-rewind operation, the pressing of the reset button R, will stop the rapid rewind motor 236, slow the reels up, and the machine will then continue the load rewind operation as though the tape were in the backward area. If the reset button R and the load-rewind button are pressed simultaneously, then even if the tape were in the rapid rewind area, it would perform as though it were in the backward area.

There has therefore been described a novel tape feed machine adaptable for use with a data processing machine. This machine is capable of being automatically loaded and unloaded, and contains novel rapid rewind means.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a tape machine, a pair of tape reels, an open ended tape column associated with and mounted in proximity to each reel, a tape running between said reels and outside of said columns, motor means energizable for slackening said tape, means operable to energize said motor means, air flow means for drawing said tape in loops into associated columns, means for disabling said energizing means and said air flow means when said tape has entered the columns, separate means associated with each of said reels and energizable for driving the same in either of two directions, means positioned between said columns and operable when said energizing means and said air flow means are disabled to feed said tape from reel to reel from said loops in the columns, and means under control of the position of the tape loop in said columns and operative for energizing the reel driving means for the associated tape reel to drive the latter in a direction to maintain in said columns an optimum length of tape loop.

2. In a tape machine, a pair of tape reels, an open ended tape column associated with and mounted in proximity to each reel, a tape running between said reels and outside of said columns, motor means energizable for simultaneously driving said reels, means operable to energize said motor means to drive said reels in opposite directions to slacken said tape, air flow means for drawing said slackened tape in a loop into each column, means for disabling said energizing and said air flow means when said tape has entered said columns, separate means associated with each of said reels and energizable for driving the same in either of two directions, means positioned between said columns and operative when said energizing means and air flow means are disabled to feed said tape from reel to reel from said loops in the columns, and means under control of the position of the tape loops in said columns and operative for energizing a reel driving means for an associated tape reel to drive the latter in a direction to maintain in said columns an optimum length of tape loop.

3. In a tape machine, a pair of tape reels, separate means associated with each of said reels and energizable for driving the same in either of two directions, an open ended tape column associated with each reel, means acting on a tape running between said reels for supporting a tape loop in each column, each said tape loop adapted to close the open end of its associated column, means including a vacuum pump for withdrawing air from said column to form a vacuum under the tape, means positioned between said columns operable to feed said tape from reel to reel from said loops in the columns, vacuum means under control of the position of the tape loop in said columns operative for energizing the reel driving means for the associated tape reel to drive the latter in a direction to maintain in said columns an optimum length of tape loop, means operable for withdrawing a tape loop from its associated column, and pressure responsive means in said column for substantially cutting off the vacuum in said column when said tape loop is withdrawn therefrom.

4. In a tape machine, a pair of tape reels, an open ended tape column associated with and mounted in proximity to each reel, a tape running between said reels and outside of said columns, pump means at the closed end of each column for withdrawing air from said columns, a pressure responsive means within each column operative when closed to reduce the amount of air being withdrawn from said columns to produce a slow flow of air into the open end of said columns, load means including a slow air flow operable to draw said tape in loops into said columns to close the open end of said columns and cause said pressure responsive means to open, the open end of said pressure responsive means allowing the pump means to create a vacuum in the columns under the loops, separate means associated with each of said reels and energizable for driving the same in either of two directions, means positioned between said columns and operable to feed said tape from reel to reel from said loops in the columns, means under control of the position of the tape loops in said columns and operative for energizing the reel driving means for the associated tape reel to drive the latter in a direction to maintain in said columns an optimum length of tape loop, unload means operable for drawing said tape loop out of said columns, electrical contacts operated by said pressure responsive means, circuit means including said electrical contacts for indicating the in and out position of the tape loops with respect to the columns, and means including said circuit means for selectively operating said load and unload means.

5. In a tape machine, a pair of tape reels, separate means associated with each of said reels and energizable for driving the same in either of two directions, an open ended tape column associated with each reel, means acting on a tape running between said reels for supporting a tape loop in each column, means positioned between said columns operable to feed said tape from reel to reel at a first speed from said loops in the columns, means under control of the position of the tape loops in said columns operative for energizing the reel driving means for the associated tape reel to drive the latter in a direction to maintain in said columns an optimum length of tape loop, means operable for rendering said energizing means and said tape feeding means ineffective, additional means for simultaneously driving said reels, means operative when said energizing means and said tape feeding means are ineffective for causing said additional means to drive said reels in opposite directions to cause the withdrawal of the tape loops from the columns, means operative when said tape loops have left said columns for disabling said withdrawing means, and means operative when withdrawing means are disabled for driving one of the reels for feeding the withdrawn tape from reel to reel outside the columns at a second speed.

6. In a tape machine, a pair of tape reels, an open ended tape column associated with and mounted in proximity to each reel, a tape running between said reels, first means operable when said tape is outside of the columns for driving one of the reels to feed tape from reel to reel at a first speed, means operable for disabling the first means, motor means energizable for simultaneously driving said reels, means adapted to energize said motor means to drive said reels in opposite directions to slacken said tape, means for inserting said slackened tape in a loop into each column, means operative to disable said motor means when said tape is in the columns, second means positioned between said columns and operable when said motor means are disabled for feeding said tape from reel to reel at a second speed from said loops in the columns, separate means associated with each of said reels and energizable for driving the same in either of two directions, and means under control of the position of the tape loops in said columns and operative for energizing the reel driving means for the associated tape reel to drive the latter in a direction to maintain in said columns an optimum length of tape loop.

7. In a tape machine, a pair of tape reels, separate means associated with each of said reels and energizable for driving the same in either of two directions, an open ended tape column associated with each reel, means acting on a tape running between said reels for supporting a tape loop in each column, first means positioned between said columns operable to feed said tape from reel to reel from said loops in the columns, means under control of the position of the tape loops in said columns operative for energizing the reel driving means for the associated tape reel to drive the latter in a direction to maintain in said columns an optimum length of tape loop, means operable for withdrawing a tape loop from its associated column, means operative when said tape loop has left said column for disabling said withdrawing means, means operable when said withdrawing means are disabled for feeding the withdrawn tape from reel to reel outside the columns, and means under control of the amount of tape wound around one of the reels and operable when the tape loops are in the columns for selecting for operation the first means or the withdrawing means.

8. In a tape machine, a pair of tape reels, an open ended tape column associated with and mounted in proximity to each reel, a tape running between said reels, first means operable when said tape is outside said columns for feeding tape from reel to reel, means operable for disabling said first means, means operable when said first means are disabled for inserting said tape loops into said columns, means operative for disabling said inserting means when said tape has entered the columns, second means positioned between said columns and operable when said inserting means are disabled for feeding tape from reel to reel from said loops in the columns, separate means associated with each of said reels and energizable for driving the same in either of two directions, means under control of the position of the tape loops in said columns and operative for energizing the reel driving means for the associated tape reel to drive the latter in a direction to maintain in said columns an optimum length of tape loop, and means under control of the amount of tape wound around one of the reels and operable when the tape is stationary out of the columns for selecting for operation the first means or the inserting means.

9. In a tape machine, a pair of tape reels, separate means associated with each of said reels and energizable for driving the same in either of two directions, an open ended tape column associated with each reel, means acting on a tape running between said reels for supporting a tape loop in each column, first means positioned between said columns operable to feed said tape from reel to reel from said loops in the columns, means under control of the position of the tape loops in said columns operative for energizing the reel for the associated tape reel to drive the latter in a direction to maintain in said columns an optimum length of tape loop, means operable for withdrawing a tape loop from its associated column, means operative when said tape loop has left said column for disabling said withdrawing means, means operable when said withdrawing means are disabled for feeding the withdrawn tape from reel to reel outside the columns, an arm riding on the tape wound around one of said reels, electrical contacts actuated by said arm when a predetermined amount of tape is wound around said reel, and means operative when said tape loops are in the columns for selecting for operation the first means or the withdrawing means under control of the electrical contacts.

10. In a tape machine, a pair of tape reels, an open ended tape column associated with and mounted in proximity to each reel, a tape running between said reels, first means operable when said tape is outside said columns for feeding tape from reel to reel, means operable for disabling said first means, means operable when said first means are disabled for inserting said tape in loops into said columns, means operative for disabling said inserting means when said tape has entered the columns, second means positioned between said columns and operable when said inserting means are disabled for feeding tape from reel to reel from said loops in the columns, separate means associated with each of said reels and energizable for driving the same in either of two directions, means under control of the position of the tape loop in said columns and operative for energizing the reel driving means for the associated tape reel to drive the latter in a direction to maintain in said columns an optimum length of tape loop, an arm riding on the tape wound around one of said reels, electrical contacts operated by said arm when a predetermined amount of tape is wound around said reel, and means operative when said tape is stationary outside of the columns for selecting for operation the first means or the inserting means under control of the electrical contacts.

11. In a tape machine, a pair of tape reels, separate means associated with each of said reels and energizable for driving the same in either of two directions, an open ended tape column associated with each reel, means acting on a tape running between said reels for supporting a tape loop in each column, each said tape loop adapted to close the open end of its associated column, means including a vacuum pump for withdrawing air from said column to form a vacuum under the tape loop, means positioned between said columns operable to feed said tape from reel to reel from said loops in the columns, vacuum means under control of the position of the tape loop in said columns operative for energizing the reel driving means for the associated tape reel to drive the latter in a direction to maintain in said columns an optimum length of tape loop, pressure responsive valve means positioned at said closed end of a column, said valve means operative to stop the tape feeding and the vacuum pump when said tape breaks in the columns, means operable for rendering said energizing means and said tape feeding means ineffective, means operable when said energizing means and said tape feeding means are ineffective for withdrawing a tape loop from its associated column, said valve means operative to cause an air flow into said columns when said tape loops are withdrawn from said columns, and means operable for slackening the tape running between said reels, said air flow drawing said tape in loops into said columns.

12. In a tape machine, a pair of tape reels, separate means associated with each of said reels and energizable for driving the same in either of two directions, an open ended tape column associated with each reel, means acting on a tape running between said reels for supporting a tape loop in each column, a marking on said tape, a sensing station, sensing means for sensing the presence of the marking at said sensing station, forward means positioned between said columns and operable for feeding the marking in a direction away from said sensing station, backward means positioned between said columns operable for feeding the marking in a direction toward said sensing station, said forward and backward means feeding tape at a first speed from reel to reel from said loops in the columns, means under control of the position of the tape loops in said columns operative for energizing a reel driving means for an associated tape reel to drive the latter in a direction to maintain in said columns an optimum length of tape loop, means operable for withdrawing the tape loops from the columns, means operative when said tape loops have left said columns for disabling said withdrawing means, means operable when said withdrawing means are disabled for feeding the withdrawn tape from reel to reel outside the columns at a second speed, means operable for inserting the tape in loops into said columns, first and second returning means selectively operable when the tape loops are in the columns for returning said marking to the sensing station, means operative for selecting the faster of the two returning means for a distance of the marking from the sensing station, said first returning means operative when selected for operating said backward feed means, said second returning means operative when selected for sequentially operating the withdrawing means, followed by the second speed feeding means, followed by the inserting means, and followed by the backward feed means, and means responsive to the sensing means for stopping the operation of the backward feed means when the tape marking is returned to the sensing station.

13. In a tape machine, a pair of tape reels, an open ended tape column associated with and mounted in proximity to each reel, a tape running between said reels, a marking on said tape, a sensing station sensing means for sensing the presence of the marking at said station, means operable for feeding the withdrawn tape from reel to reel outside the columns at a first speed, means operable for inserting said tape in loops into said columns, forward means positioned between said columns and operable for feeding the marking in a direction away from said sensing station, backward means positioned between said columns operable for feeding the marking in a direction toward said sensing station, said forward and backward means feeding tape from reel to reel from said loops in the columns, means operative under control of the position of the tape loop in said columns for energizing a reel driving means for an associated tape reel to drive the latter in a direction to maintain in said columns an optimum length of tape loop, means operable for withdrawing the tape loops from the columns, first and second returning means selectively operable when the tape is out of the columns for returning said marking to the sensing station with the loops in the columns, and means operative for selecting the faster of the two returning means for a distance of the marking from the station, said first returning means operative when selected for sequentially operating said inserting means followed by said backward feed means, said second returning means operative when selected for sequentially operating said second speed feeding means, followed by said inserting means and followed by said backward feed means, and means responsive to the sensing means for stopping the operation of the backward feed means when the tape marking is returned to the sensing station.

14. In a tape machine, a tape supply means, a tape connected to said supply means, a tape chamber associated with said supply means, means for supporting a tape looped into one end of said chamber, means for withdrawing air from the other end of said chamber, said tape loop adapted to substantially close said one end of said chamber so that a partial vacuum is formed which urges said tape loop into the chamber, a tape utilization means, means selectively operable for feeding said tape between said chamber and said utilization means, means controlled in accordance with the position of the tape loop and operative upon said tape supply means when the tape is being fed to maintain in said chamber an optimum length of tape loop, means selectively operable for rendering ineffective said optimum length maintaining means, means operable when said optimum length maintaining means is rendered ineffective for withdrawing the tape loop from the chamber, and pressure responsive means operative to remove the partial vacuum from the chamber when the tape loop leaves the chamber by substantially cutting off the air withdrawing means from the chamber.

15. In a tape machine, a tape supply means, a tape connected to said supply means, a tape chamber associated with said supply means, means adapted for supporting said tape in a loop in said chamber, a tape utilization means, means selectively operable for feeding said tape between said chamber and said utilization means in a first path, means controlled in accordance with the position of the tape loop when the tape is being fed in the first path to maintain in said chamber an optimum length of tape loop, means selectively operable for rendering ineffective said optimum length maintaining means, means operative when said optimum length maintaining means is rendered ineffective for moving the position of the tape loop to a second path, means operative when the position of the tape loop has moved a predetermined amount to the second path for disabling the tape loop position moving means for feeding said tape in the second path between said tape supply means and said utilization means, said second path feeding means being operative when said optimum length maintaining means is ineffective, and means operable when the tape is in the first path to select for operation the first path feeding means or the rendering ineffective means in accordance with the amount of tape in the tape supply means.

16. In a tape machine, a tape supply means, a tape connected to said supply means, a tape chamber associated with said supply means, means adapted for supporting said tape in a loop in said chamber, a tape utilization means, means selectively operable for feeding said tape between said supply means and said tape utilization means through said chamber, means controlled in accordance with the position of the tape loop in the chamber and operative only when the tape is being fed in the chamber to maintain in said chamber an optimum length of tape loop, means selectively operable for withdrawing the tape loop from the chamber, means operative when the tape has been withdrawn from the chamber for feeding the tape between said supply means and said tape utilization means outside the chamber, and means operable when the tape loop is in the chamber to select for operation the through the chamber feeding means or the withdrawing means in accordance with the amount of tape in the supply means.

17. In a tape machine, a tape supply means, a tape connected to said supply means, a tape chamber associated with said supply means and having an open end and a substantially closed end, a tape utilization means, means selectively operable for feeding said tape between said tape supply means and said utilization means outside said chamber, means selectively operable for inserting the tape in a loop into the open end of said chamber, operative when the loop has entered the chamber for feeding said tape between said tape supply means and said utilization means through the chamber, means controlled in accordance with the position of the tape loop in the chamber and operative only when the tape is being fed through the chamber to maintain in said chamber an optimum length of tape loop, and means operable when the tape is stationary outside the chamber to select for operation the outside the chamber feeding means or the inserting means in accordance with the amount of tape in the supply means.

18. In a tape machine, a tape supply means, a tape connected to said supply means, a tape utilization means, first and second feed paths between said supply means and said utilization means, means selectively operable for feeding the tape in a first path, means selectively operable for moving the tape between said first and second paths, means operative when the tape is placed in the second path for feeding the tape, and means operable when the tape is stationary in the first path to select for operation the first path feeding means or the between the paths moving means in accordance with the amount of tape in the supply means.

19. In a tape machine, comprising a machine frame, a shaft rotatably mounted in said frame, motor means, clutch means energizable for rotating said shaft, brake means rotatably mounted on said shaft, means for holding said brake stationary, a tape reel, a tape connected to said tape reel, a tape chamber associated with said tape reel, means to support the tape in a loop in said chamber, a tape utilization means, means selectively operable for feeding said tape between said chamber and said utilization means, means controlled in accordance with the position of the tape loop and operative upon said tape reel to alternately energize said clutch and said stationary brake to maintain in said chamber an optimum length of tape loop, said tape reel being rotated when said clutch is energized and said tape reel being stopped when said stationary brake is energized, means selectively operable for rendering ineffective said optimum length maintaining means, and means operable when said optimum length maintaining means is rendered ineffective for rotating the brake to move the position of the tape loop in the chamber.

20. In a tape machine, comprising a machine frame, a shaft rotatably mounted in said frame, motor means, clutch means energizable for rotating said shaft, brake means rotatably mounted on said shaft, gear means fastened to said brake and operative to hold said brake stationary, a tape reel, a tape connected to said tape reel, a tape chamber associated with said tape reel, means to support the tape in a loop in said chamber, a tape utilization means, means selectively operable for feeding said tape between said chamber and said utilization means, means controlled in accordance with the position of the tape loop and operative upon said tape reel to alternately energize said clutch and said stationary brake to maintain in said chamber an optimum length of tape loop, said tape reel being rotated when said clutch is energized and said tape reel being stopped when said stationary brake is energized, means selectively operable for rendering ineffective said optimum length maintaining means, motor means connected to said gear means, and means for energizing said motor means when said optimum length maintaining means is rendered ineffective to rotate the gear means, the rotation of the gear means causing the rotation of the brake to move the position of the tape loop in the chamber.

21. In a tape machine, comprising a machine frame, a shaft rotatably mounted in said frame, motor means, clutch means energizible for rotating said shaft, brake means rotatably mounted on said shaft, a worm gear for holding said brake stationary, a tape reel, a tape connected to said tape reel, a tape chamber associated with said tape reel, means to support the tape in a loop in said chamber, a tape utilization means, means selectively operable for feeding said tape between said chamber and said utilization means, means controlled in accordance with the position of the tape loop and operative upon said tape reel to alternately energize said clutch and said stationary brake to maintain in said chamber an optimum length of tape loop, said tape reel being rotated when said clutch is energized and said tape reel being stopped when said stationary brake is energized, means selectively operable for rendering ineffective said optimum length maintaining means, motor means connected to said worm gear, and means for energizing said motor means when said optimum length maintaining means is rendered ineffective to rotate said worm gear, the rotation of the worm gear causing the rotation of the brake to slowly move the position of the tape loop in the chamber.

22. In a machine for reeling and unreeling tape, a tape reel, driving means, an activating device associated with the driving means for rendering the reel driving means active to drive the tape reel, braking means, an activating device associated with braking means for rendering the associated braking means active to stop the reel, means under control of the tape connected to said reel for selecting said driving means activating device or said brake means activating device, means for deactivating said selecting means, and means for moving said brake means to rotate said tape reel when said selecting means is deactivated.

23. In a machine for reeling and unreeling tape, a tape reel, driving means, a drive clutch associated with the driving means and operative when energized for rendering the driving means active to drive the tape reel, a frame, gear means rotatable in said frame, a brake clutch associated with the gear means and operative when energized for rendering the stationary gear means active to stop the tape reel, means under control of the tape connected to said reel for selectively energizing said drive clutch or said brake clutch, means for deactivating said selecting means, separate means for energizing said brake clutch, and motor means for rotating said gear means so as to rotate said tape reel when said selecting means is deactivated and said brake clutch is energized by said separate means.

24. In a machine for reeling and unreeling tape, a tape reel, driving means, a drive clutch associated with the driving means and operative when energized for rendering the driving means active to drive the tape reel, a frame, gear means rotatable in said frame, a brake clutch associated with the gear means and operative when energized for rendering the stationary gear means active to stop the tape reel, means under control of the tape connected to said reel for selectively energizing said drive clutch or said brake clutch, means for deactivating said selecting means, separate means for lightly energizing said brake clutch, and motor means for rotating said gear means so as to slowly rotate said tape reel when said selecting means is deactivated and said brake clutch is lightly energized by said separate means.

25. In a tape machine, a tape supply means, a tape connected to said supply means, a tape chamber associated with said supply means, partial vacuum creating means operative on said chamber and adapted for urging said tape in a direction so as to form a tape loop in said chamber, a tape utilization means, means selectively operable for feeding said tape between said chamber and said utilization means, means controlled in accordance with the position of the tape loop and operative upon said tape supply means when the tape is being fed to maintain in said chamber an optimum length of tape loop, means selectively operable for rendering ineffective said optimum length maintaining means, means operable when said optimum length maintaining means is rendered ineffective for moving the position of the tape loop in the chamber, and means operative when the position of the tape loop has moved a predetermined amount for diminishing the strength of the partial vacuum creating means.

References Cited in the file of this patent

UNITED STATES PATENTS

| | | |
|---|---|---|
| 1,653,451 | De Ybarrondo | Dec. 20, 1927 |
| 2,051,036 | Foster et al. | Aug. 18, 1936 |
| 2,051,788 | Foster et al. | Aug. 18, 1936 |
| 2,129,847 | Knodel | Sept. 13, 1938 |
| 2,469,706 | Winther | May 10, 1949 |
| 2,539,540 | Idar et al. | Jan. 30, 1951 |
| 2,656,129 | De Turk et al. | Oct. 20, 1953 |
| 2,670,906 | Daniels et al. | Mar. 2, 1954 |
| 2,678,173 | Phelps | May 11, 1954 |
| 2,683,568 | Lindsay | July 13, 1954 |
| 2,730,309 | Baer | Jan. 10, 1956 |

UNITED STATES PATENT OFFICE

CERTIFICATE OF CORRECTION

Patent No. 2,919,076 December 29, 1959

Walter S. Buslik et al.

It is hereby certified that error appears in the printed specification of the above numbered patent requiring correction and that the said Letters Patent should read as corrected below.

Column 6, line 33, for "Fig. 3" read -- Fig. 4 --; column 18, line 14, for "shaft 367" read -- shaft 368 --; column 20, line 65, for "volts normally" read -- volts via normally --; column 23, line 1, for "resistor a" read -- resistor to a --; column 25, line 5, for "connected to" read -- connected directly to --; column 27, line 11, for "new" read -- now --; column 28, line 24, before "lead" strike out "a"; column 37, line 14, for "output will be" read -- output pulse will be --; column 39, line 35, for "75K resistor" read -- 75K ohm resistor --; column 42, line 19, for "it" read -- in --; column 53, line 7, for "conatcts" read -- contacts --.

Signed and sealed this 18th day of April 1961.

(SEAL)
Attest:

ERNEST W. SWIDER

Attesting Officer

DAVID L. LADD

Commissioner of Patents